United States Patent
Raynaud

(10) Patent No.: US 12,424,117 B2
(45) Date of Patent: Sep. 23, 2025

(54) SYSTEM AND METHOD FOR DUAL MODE PRESENTATION OF CONTENT IN A TARGET LANGUAGE TO IMPROVE LISTENING FLUENCY IN THE TARGET LANGUAGE

(71) Applicant: Jiveworld, SPC, Mill Valley, CA (US)

(72) Inventor: Daniel Paul Raynaud, Austin, TX (US)

(73) Assignee: Jiveworld, SPC, Austin, TX (US)

( * ) Notice: Subject to any disclaimer, the term of this patent is extended or adjusted under 35 U.S.C. 154(b) by 0 days.

(21) Appl. No.: 18/463,534

(22) Filed: Sep. 8, 2023

(65) Prior Publication Data

US 2023/0419847 A1    Dec. 28, 2023

Related U.S. Application Data

(63) Continuation-in-part of application No. 17/962,062, filed on Oct. 7, 2022, now Pat. No. 12,190,752, which
(Continued)

(51) Int. Cl.
| | | |
|---|---|---|
| G09B 5/06 | (2006.01) |
| G09B 19/06 | (2006.01) |
| G10L 21/10 | (2013.01) |
| G09B 19/04 | (2006.01) |
| G10L 15/08 | (2006.01) |

(Continued)

(52) U.S. Cl.
CPC .............. *G09B 5/06* (2013.01); *G09B 19/06* (2013.01); *G10L 21/10* (2013.01); *G09B 19/04* (2013.01); *G10L 15/08* (2013.01); *G10L 2015/088* (2013.01); *G10L 15/26* (2013.01); *H04N 21/4394* (2013.01); *H04N 21/4542* (2013.01)

(58) Field of Classification Search
CPC .......... G09B 5/06; G09B 19/06; G09B 19/04; G10L 21/10; G10L 15/08; G10L 15/26; G10L 2015/088; H04N 21/4394; H04N 21/4542
See application file for complete search history.

(56) References Cited

U.S. PATENT DOCUMENTS

| | | |
|---|---|---|
| 5,336,093 A | 8/1994 | Cox |
| 8,504,369 B1 | 8/2013 | Chigler |

(Continued)

FOREIGN PATENT DOCUMENTS

WO    WO2014084870    6/2014

OTHER PUBLICATIONS

International Preliminary Report on Patentability issued for International PCT Application No. PCT/US2023/073715, mailed Mar. 20, 2025, 7 pages.

(Continued)

*Primary Examiner* — Jack Yip
(74) *Attorney, Agent, or Firm* — Sprinkle IP Law Group

(57) ABSTRACT

Embodiments of a language learning system and method for implementing or assisting in self-study for improving listening fluency in a target language are disclosed. Such embodiments may simultaneously present the same piece of content in an auditory presentation and generate a corresponding visual interface, where the two presentations are adapted to work in tandem to increase the effectiveness of language learning for users.

21 Claims, 42 Drawing Sheets

Related U.S. Application Data is a continuation of application No. 17/132,988, filed on Dec. 23, 2020, now Pat. No. 11,551,568, which is a continuation of application No. 16/844,252, filed on Apr. 9, 2020, now Pat. No. 10,984,667.

(60) Provisional application No. 63/404,991, filed on Sep. 9, 2022, provisional application No. 62/831,380, filed on Apr. 9, 2019.

(51) Int. Cl.
  *G10L 15/26* (2006.01)
  *H04N 21/439* (2011.01)
  *H04N 21/454* (2011.01)

(56) References Cited

U.S. PATENT DOCUMENTS

| | | | |
|---|---|---|---|
| 8,744,855 B1 | 6/2014 | Rausch | |
| 8,887,044 B1 | 11/2014 | Goodspeed | |
| 9,483,532 B1 | 11/2016 | Zhang | |
| 9,666,208 B1 | 5/2017 | Rubin | |
| 9,684,641 B1 | 6/2017 | Hamaker | |
| 10,984,667 B2 | 4/2021 | Raynaud | |
| 11,024,199 B1* | 6/2021 | Treves | G09B 5/02 |
| 11,551,568 B2 | 1/2023 | Raynaud | |
| 12,190,752 B2 | 1/2025 | Raynaud | |
| 2002/0062214 A1* | 5/2002 | Hanson | G10L 13/00 704/E15.04 |
| 2003/0028378 A1 | 2/2003 | August et al. | |
| 2004/0029084 A1 | 2/2004 | Johnson et al. | |
| 2004/0218451 A1 | 11/2004 | Said | |
| 2006/0183087 A1 | 8/2006 | Gleissner et al. | |
| 2007/0030528 A1 | 2/2007 | Quaeler | |
| 2007/0055926 A1 | 3/2007 | Christiansen | |
| 2009/0035733 A1 | 2/2009 | Meitar et al. | |
| 2011/0288861 A1 | 11/2011 | Kurzweil | |
| 2012/0151320 A1* | 6/2012 | McClements, IV | G06Q 10/101 715/230 |
| 2013/0196292 A1 | 8/2013 | Brennan | |
| 2014/0067367 A1 | 3/2014 | Simmons | |
| 2014/0229157 A1 | 8/2014 | Leydon et al. | |
| 2014/0297266 A1 | 10/2014 | Nielson et al. | |
| 2015/0331657 A1 | 11/2015 | Bancroft et al. | |
| 2016/0055145 A1 | 2/2016 | Chauhan et al. | |
| 2016/0307465 A1* | 10/2016 | Tormey | G09B 5/065 |
| 2016/0343272 A1 | 11/2016 | Roche | |
| 2017/0133007 A1 | 5/2017 | Drewes | |
| 2017/0256178 A1 | 9/2017 | Nielson et al. | |
| 2017/0353423 A1 | 12/2017 | Morrison | |
| 2018/0061274 A1* | 3/2018 | Frahling | G06F 40/247 |
| 2018/0067902 A1 | 3/2018 | Nelson | |
| 2018/0158365 A1* | 6/2018 | Roche | G09B 5/067 |
| 2018/0277017 A1 | 9/2018 | Cheung | |
| 2018/0322106 A1* | 11/2018 | Roks | H04L 67/06 |
| 2019/0196675 A1 | 6/2019 | German | |
| 2019/0312973 A1 | 10/2019 | Engelke | |
| 2021/0005109 A1 | 1/2021 | Zhang | |
| 2021/0183260 A1 | 6/2021 | Raynaud | |
| 2022/0155914 A1 | 5/2022 | Roche | |
| 2022/0277715 A1 | 9/2022 | Wirtz et al. | |
| 2023/0048738 A1 | 2/2023 | Raynaud | |

OTHER PUBLICATIONS

Office Action issued by the U.S. Patent and Trademark Office for U.S. Appl. No. 17/962,062, mailed Feb. 23, 2024, 20 pages.

Notice of Allowance issued by the U.S. Patent and Trademark Office for U.S. Appl. No. 17/962,062, mailed Sep. 3, 2024, 9 pages.

International Search Report and Written Opinion issued for PCT Application No. PCT/US2020/027388, mailed Aug. 3, 2020, 11 pages.

Shukla, "Development of a Human-AI Teaming Based Mobile Language Learning Solution for Dual Language Learners in Early and Special Educations," Wright State University, Graduate School, Dec. 6, 2018, [retrieved on Jun. 20, 2020 from <<https://corescholar.libraries.wright.edu/cgi/viewcontent.cgi?article=3356&context=etd_all>, 44 pages.

Office Action for U.S. Appl. No. 16/844,252 mailed Jun. 3, 2020, 16 pgs.

Office Action for U.S. Appl. No. 16/844,252 mailed Sep. 24, 2020, 19 pgs.

Notice of Allowance for U.S. Appl. No. 16/844,252 mailed Jan. 19, 2021, 5 pgs.

International Preliminary Report on Patentatibility issued for International PCT Application No. PCT/US2020/027388, mailed Oct. 21, 2021, 10 pages.

Notice of Allowance issued for U.S. Appl. No. 17/132,988, issued by the U.S. Patent and Trademark Office on Jul. 7, 2022, 8 pages.

European Search Report issued for European Patent Application No. 20787196.3, mailed Nov. 11, 2022, 9 pages.

Beth Skwarecki, "Improving Your Undersantding of Spanish with Lupa," Nov. 7, 2019, 4 pages.

Office Action issued by the U.S. Patent and Trademark Office (USPTO) for U.S. Appl. No. 17/962,062, on Aug. 9, 2023, 15 pages.

International Search Report and Written Opinion issued by the U.S. Patent and Trademark Office as the International Searching Authority (USPTO/ISA) for PCT Application No. PCT/US2023/73715, mailed Dec. 12, 2023, 8 pages.

* cited by examiner

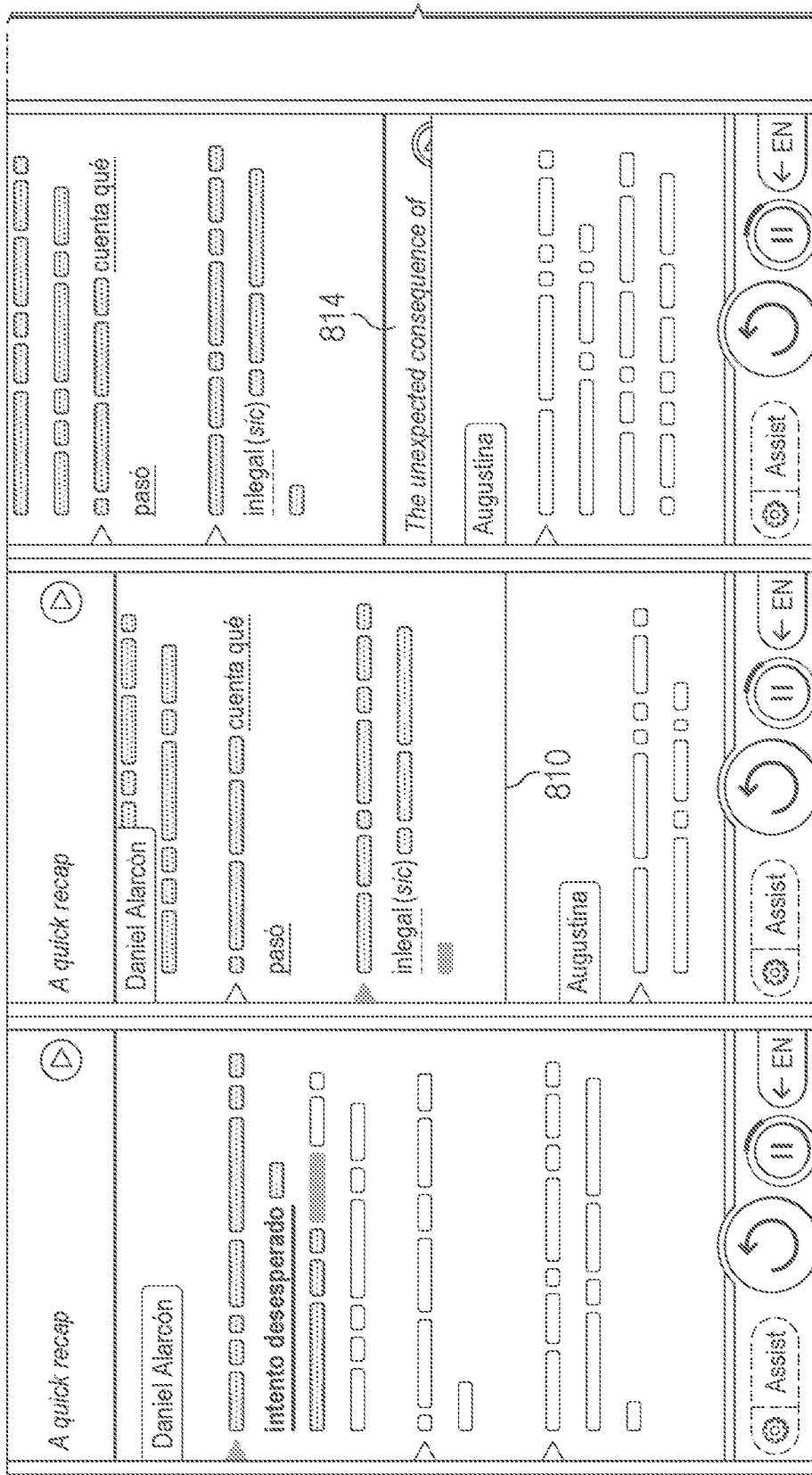

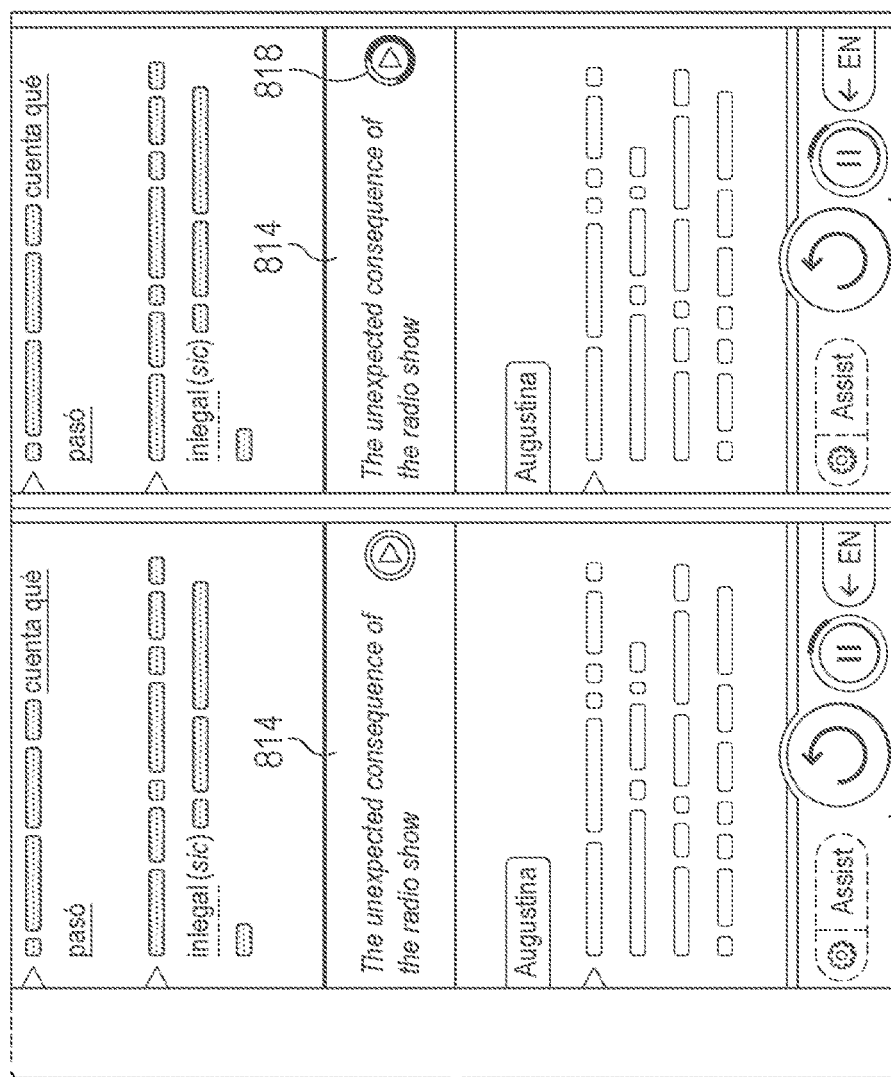
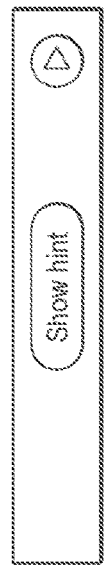
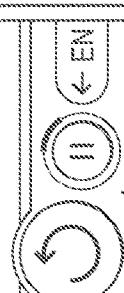
FIG. 8B
FIG. 9

ANOTHER VOCABULARY
GUIDE APPEARS

VOCABULARY GUIDE
DURING PLAYBACK

START OF CHAPTER, FIRST
PASSAGE QUESTION

FIG. 24B
DELAYED PAUSE

FIG. 24A
PLAYING

VOCABULARY DETAIL

PAUSED WITH VOCABULARY LIST

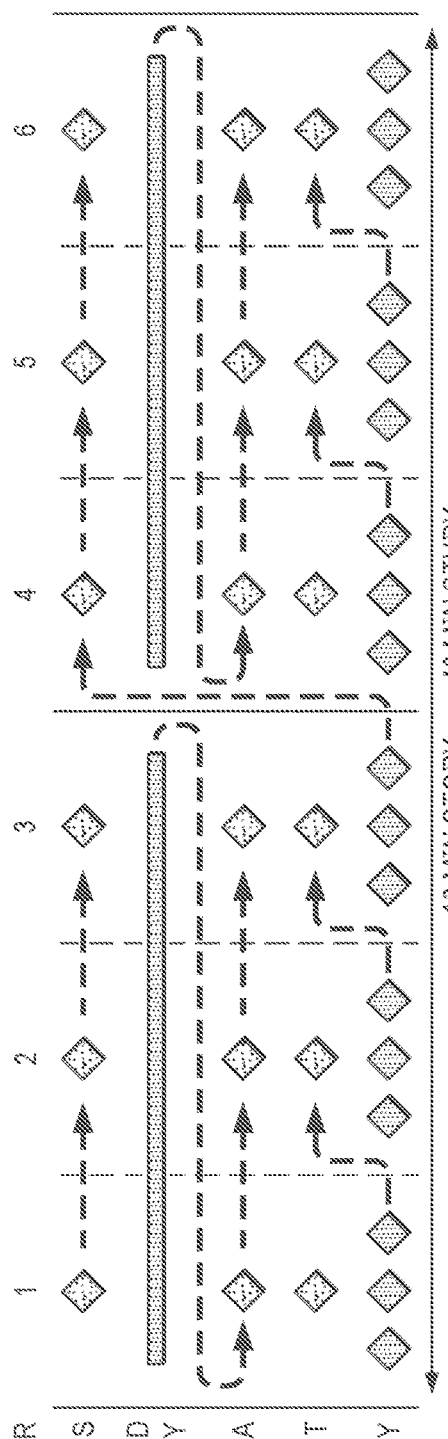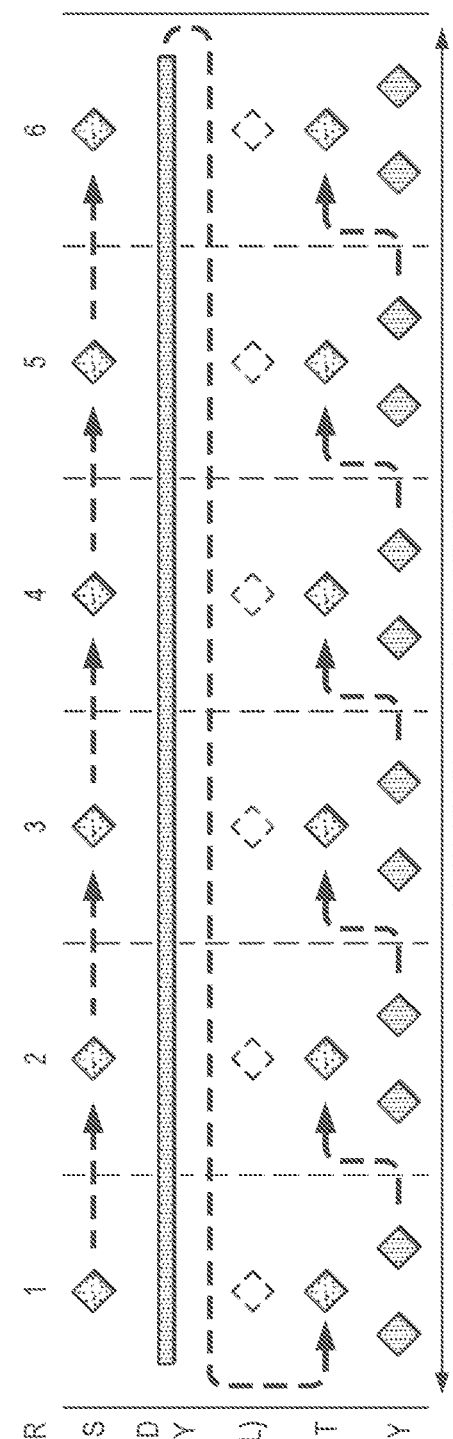

STORY ◇—◇—◆—◇—◆—◇—◆—◇—◇—◇—◆—◆—◇—◇—◆

◇ ORDINARY PASSAGE

◆ PASSAGE WHOSE START CAN BE THE END OF A STUDY CHUNK
  (isStartViableEnd == true)

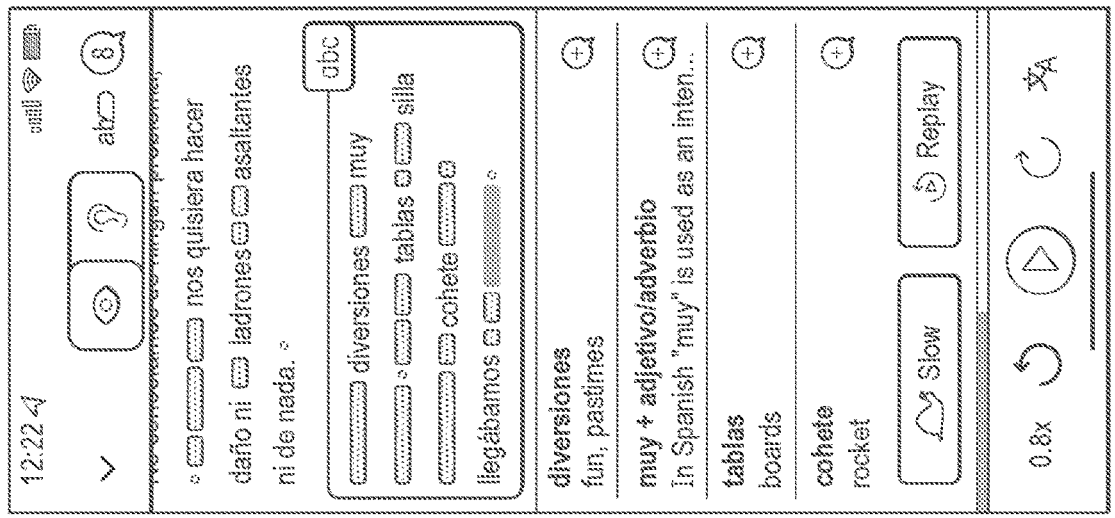
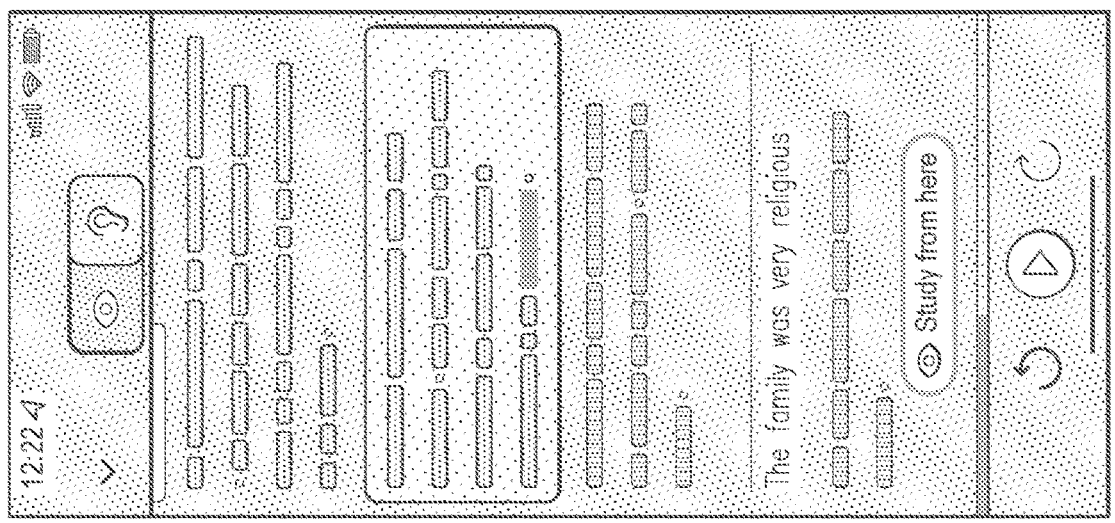
FIG. 34B
FIG. 34A

START OF TASK PROMPT    BEFORE YOU START LISTENING...

CONTINUED TASK PROMPT    YOU'RE PARTWAY THROUGH...

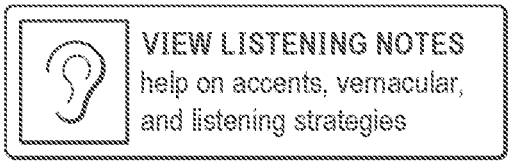    MAYBE LATER

START OF TASK PROMPT    MAKE SURE NOT TO MISS THIS...

CONTINUED TASK PROMPT    YOU'RE PARTWAY THROUGH...

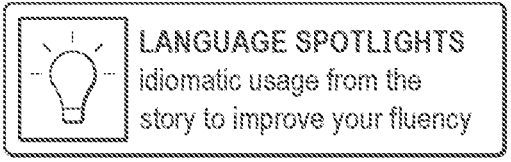    MAYBE LATER

START OF TASK PROMPT    DID YOU UNDERSTAND THIS CHAPTER?

CONTINUED TASK PROMPT    NEARLY THERE! COMPLETE THE QUIZ...

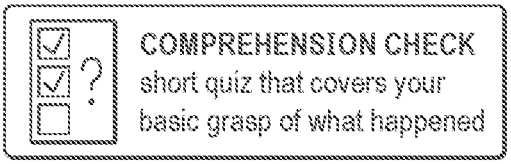    STUDY A BIT MORE

ARE YOU READY TO MOVE ON?

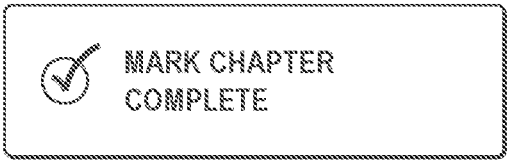    NOT YET, I'LL EXPLORE MORE

FIG. 39

SYSTEM AND METHOD FOR DUAL MODE PRESENTATION OF CONTENT IN A TARGET LANGUAGE TO IMPROVE LISTENING FLUENCY IN THE TARGET LANGUAGE

RELATED APPLICATIONS

This application claims a benefit of priority under 35 U.S.C. § 119 to U.S. Provisional Patent Application No. 63/404,991 filed Sep. 9, 2022, entitled "SYSTEM AND METHOD FOR DUAL MODE PRESENTATION OF CONTENT IN A TARGET LANGUAGE, INCLUDING LEANBACK LISTENING, DELAYED AND PREDETERMINED PAUSES AND ADJUSTED FLOW FOR STUDY LEVELS", by Daniel Paul Raynaud, which is hereby fully incorporated by reference in its entirety. This application is a continuation-in-part of, and claims a benefit of priority under 35 U.S.C. 120 of, U.S. patent application Ser. No. 17/962,062, filed Oct. 7, 2022, issued as U.S. Pat. No. 12,190,752, entitled "SYSTEM AND METHOD FOR DUAL MODE PRESENTATION OF CONTENT IN A TARGET LANGUAGE TO IMPROVE LISTENING FLUENCY IN THE TARGET LANGUAGE", which is a continuation of U.S. patent application Ser. No. 17/132,988, filed Dec. 23, 2020, issued as U.S. Pat. No. 11,551,568, entitled "SYSTEM AND METHOD FOR DUAL MODE PRESENTATION OF CONTENT IN A TARGET LANGUAGE TO IMPROVE LISTENING FLUENCY IN THE TARGET LANGUAGE", which is a continuation of U.S. patent application Ser. No. 16/844,252, filed Apr. 9, 2020, issued as U.S. Pat. No. 10,984,667, entitled "SYSTEM AND METHOD FOR FORMATTING OR PRESENTATION OF CONTENT IN A TARGET LANGUAGE TO IMPROVE LISTENING FLUENCY IN THE TARGET LANGUAGE," which claims a benefit of priority under 35 U.S.C. § 119 to U.S. Provisional Patent Application No. 62/831,380 filed Apr. 9, 2019, entitled "SYSTEM AND METHOD FOR FORMATTING OR PRESENTATION OF CONTENT IN A TARGET LANGUAGE TO IMPROVE LISTENING FLUENCY IN THE TARGET LANGUAGE", which are hereby fully incorporated by reference in their entirety.

TECHNICAL FIELD

The present disclosure relates generally to linguistic learning. More particularly, embodiments of the present disclosure relate to the systems and methods for assisting in the learning of a second or 'target' language. More specifically, embodiments of the present disclosure relate to embodiments of language learning systems and methods that improve listening fluency in the target language through presentation of content in the target language, including aspects of presentation of content in association with the auditory presentation of the same content such as leanback listening, delayed or predetermined pauses in the presentation, or adjusted flows for different study levels.

BACKGROUND

When a learner sets out to acquire a new language (referred to herein generally as a "target language") different from their mother tongue or other language in which they are already fluent, they will typically start with simple grammatical constructions and basic vocabulary (e.g. "I ate the egg") and gradually evolve, over a period of time, to tackle more complex constructions (e.g. "I would've eaten the poached egg, out of sheer politeness, were it not for my severe dairy intolerance"). With perseverance and a well-designed path, the beginner learner can eventually attain a high-functioning level of, or even native-level, fluency in reading, writing, and speaking.

However, the acquisition of "listening fluency" requires a different approach. Many language learners, otherwise highly competent in the target language, struggle to understand native speakers speaking naturally in real-world situations, whether in conversation (especially on phone calls) or watching movies. Their ears cannot process the sound into meaning fast enough to keep up, and sometimes cannot understand anything at all if the speaker's accent is strong or they are speaking quickly and colloquially.

Many language teaching methods and tools fail in this respect because they expose learners to only artificially formal "made-for-study" speech, where the enunciation is slow, and the range of linguistic usage is limited. Both the sound and the content has been simplified to make it digestible to the learner. However, the neural circuitry humans have for decoding speech needs to learn using authentic speech, which has a very different sound from (even if it is symbolically similar to) the made-for-study form.

A different problem arises in most of the language acquisition tools that do expose the learner to sounds of authentic spoken language. This content is, by nature of the situation, too difficult for the learner to understand without some assistance, since repeated listening alone generally does not help. Typically, these tools provide the learner with full transcripts and sometimes full translations so the learner can follow along. Unfortunately, a full transcript or translation offers too much help, and the work of understanding is borne by the learner's eyes rather than their ears. It is no longer listening practice, but rather reading practice with a soundtrack.

The learner then needs a middle ground, where they get enough assistance while listening to authentic spoken language so they are "in the vicinity" of comprehension, while leaving important work for the ears, to achieve actual comprehension. It is only by forcing the ears to listen actively that the appropriate neural circuitry can be trained.

In conjunction with ear training, the learner needs to grapple with real-world idiomatic usage that is typically hard to author in made-for-study materials. Even for learning products that feature authentic spoken audio, the interface provided to learners is one of "select a word and look it up in a dictionary", rather than working with bigger chunks (i.e. groups of words) and translating within the context of passage.

What is desired then, are improved language learning systems and methods.

SUMMARY

To those ends, among others, embodiments of a computer implemented language learning system and method for implementing or assisting in self-study for improving listening fluency in another language (e.g., a second, third, etc. language, generally referred to as a "target" language) are disclosed herein. Such embodiments may simultaneously present the same piece of content in an auditory presentation and a corresponding visual presentation of a transcript of the auditory presentation, where the two presentations are adapted to work in tandem (e.g., are synchronized) to increase the effectiveness of language learning for users.

Embodiments of such a language learning system allow a language learner to practice listening to dialog spoken in a variety of natural accents, styles and speeds, to achieve native-level listening skills to handle many situations in the real world, whether conversational, transactional, or consuming media. In addition to ear training, embodiments help the learner build a robust and practical passive vocabulary.

Certain embodiments may be adapted to focus a user's attention on an aspect of the presentation that may be most conducive to learning the target language and the presentation of the content may be adapted to allow a user to focus primarily on a single aspect of the presentation. For example, embodiments may utilize a visual display where the visual transcript of the auditory content being simultaneously presented may be partially or fully redacted.

In particular, embodiments may include a set of features that work, separately or in combination, to help a second (or other) language learner study with audio content in the target language. While embodiments are effective for learning with any kind of recorded language (including, but not limited to, audiobooks, radio plays, lectures, and music) embodiments may be especially useful with the most challenging material in mind: natural, unscripted speech that is highly idiomatic and distinctive to the age, locale, and cultural background of the speaker.

Thus, embodiments may be focused on how to improve real-world listening skills in a second language with authentic audio content, as opposed to with simplified audio content graded to the learner's proficiency. The advantage of studying with authentic audio content—as mentioned above typically natural or unscripted speech such as radio and podcast shows that are produced for and consumed by native speakers—is that it reflects the real-world spoken language.

The challenge of working with authentic (e.g., versus simplified) content is the inherent complexity: natural speech can be fast, the accents are more varied, vocabulary used is richer, and such content employs a wider range of idioms. A learner should be able to effectively consume a simplified audio content (or "story"—generally used herein to refer to any type of audio content)—one that matches their listening ability and language proficiency—in a standard audio player, but when listening to an authentic audio story they need access to a greater variety of tools to help them bridge the gaps in their linguistic and cultural knowledge, and listening fluency.

As discussed in U.S. Pat. No. 10,984,667 to Raynaud, expressly incorporated herein by reference in its entirety for all purposes, different kinds of assistance that can be offered the learner while they listen, and this assistance could be incorporated in a useful way in an interactive computer application (for example on a mobile phone) including: high level guides to the structure of audio content variable, partial redaction of the transcript, highlighted karaoke-style to track the audio, assistance with vocabulary glosses and other notes, and speed control, involving either timestretch audio and a concept of "audio kerning" where natural gaps and pauses in the speech can be elongated to give more thinking time to the listener, without changing the sounds of the spoken words.

One problem, affecting lower proficiency learners in particular, is that there is still a lot of interrupted playback as the learner stops to look up unfamiliar vocabulary, and as they rewind to relisten to something that isn't clear. Listening in this fragmented way makes it difficult to follow the overall plot of the story. As an analogy, it is like looking at a photograph only through a microscope: you can see every detail, but it is hard to grasp what the whole picture is.

Another problem affects more advanced learners who only need help with the occasional word, but can grasp the plot in their first listen through, without assistance. For them, a second complete listen is unnecessary, and having the first listen in a highly interactive player with assistance they do not generally need is overkill. If this problem can be addressed it widens the audience that can be served using a language learning application to include learners at advanced levels.

Generally then, there is an opportunity to improve flow in various ways for different learners (n.b., "flow" and "fluency" share the same etymology). Specifically, embodiments may provide better flow in the listening itself—less stop-and-start, more continuity. Thus, when the learner does have to pause, the player may stop at a semantically logical place—for example at the end of a sentence—not at an arbitrary place, immediately as a new word is encountered.

Embodiments may also provide a way for learners to easily mark sentences for later study (a feature we refer to as "mark-for-study"), without interrupting their continuous listening, and a way to efficiently process that list of sentences afterwards. Accordingly, a better study flow (i.e. the organization of study tasks performed by the learner on a chapter or section to achieve their learning objectives effectively and efficiently) is provided. These study tasks include listening, but also activities like quizzes, notes, and reviews. In particular, it is desired that embodiments adapt (e.g., the study flow of the application) to different learners' needs, according to their proficiency level.

It is common to talk of being in a "flow state": working in a highly productive way, with good tools and an environment that allows you to focus. The focus of embodiments may thus be on enabling a flow state for listening study with authentic media: less about the assistance itself to fill the knowledge gaps (our previous focus), and more about when and how that assistance appears—guiding rails to help learners complete useful learning tasks with continuity, momentum and efficiency.

Thus, embodiments may include a number of features that may be used alone or in conjunction with other features that are designed to help a learner improve their listening fluency in a target language working with such target language audio recordings. These features may include guided listen; listen and mark-for-study; tri-state play control, with "delayed pause" (which may include automatic latency adjustments); and adaptive study flow and natural listen task tracking.

For example, embodiments may be a system for language learning, comprising a device, including a processor and an application comprising instructions to obtain an audio file and a corresponding transcript and timing file, wherein the transcript and timing file corresponds to the audio file and comprises words of a transcript of content of the audio file and associated word level timestamp for words of the transcript of the content of the audio file. The application may be adapted to auditorily present the content of the audio file using an audio player at the client device, and simultaneously with the auditory presentation of the content of the audio file, the application may dynamically generate an interface using the transcript and timing file, where the interface includes a visual display associated with the content of the audio file in the target language. This application may be adapted to operate in a structural comprehension mode for continuous auditory presentation of the content of the audio file and a detailed comprehension mode adapted for increased interaction with the presentation of the content. A first level of controls can be presented in the structural comprehension mode and a second level of controls presented in the detailed comprehension mode where the second level is greater than the first level (e.g., there are a greater number of controls in the detailed comprehension mode).

In certain cases, the structural comprehension mode is dark themed and the detailed comprehension mode is light themed.

In particular embodiments, in the detailed comprehension mode the interface includes a delayed pause button (also referred to as the tri-state play/pause button), and the application is adapted to, in response to a first interaction with the tri-state play/pause button, continue to auditorily present the content of the audio file until the end of a portion of the content. Such a portion may be defined in the transcript and timing file for the audio content.

In various embodiments, the application is adapted to, in response to a second interaction with the tri-state play/pause button, immediately pause the auditory presentation of the content of the audio file.

In one embodiment, the structural comprehension mode includes a guided listen mode and in the guided listen mode the application is adapted to present a set of guides in the interface by dynamically generating the guides in the interface in synchronization with the auditory presentation of the content.

In a particular embodiment, in the structural comprehension mode the application is adapted to mark a set of portions for study based interaction with the interface without pausing the auditory presentation of the content of the audio file, and in the detailed comprehension mode the application is adapted to iterate over the marked set of portions based on interaction with the interface.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIGS. 4A, 4B, 4C and 4D are depictions of interfaces that may be utilized by embodiments of a language learning system.

FIGS. 5A, 5B and 5C are depictions of interfaces that may be utilized by embodiments of a language learning system.

FIG. 7 is a depiction of an interface that may be utilized by embodiments of a language learning system.

FIGS. 8A and 8B are a depiction of an interface that may be utilized by embodiments of a language learning system.

FIG. 9 is a depiction of a portion of an interface that may be utilized by embodiments of a language learning system.

FIGS. 10A, 10B, 10C and 10D are depictions of interfaces that may be utilized by embodiments of a language learning system.

FIGS. 12E and 12F are example interfaces that may be utilized by embodiments of a language learning system.

FIGS. 23A, 23B and 23C are depictions of interfaces that may be utilized by embodiments of a language learning system.

FIGS. 24A, 24B, 24C and 24D are depictions of interfaces that may be utilized by embodiments of a language learning system.

FIGS. 26A, 26B, 26C and 26D are block diagrams of the operation of embodiments of a language learning system.

FIGS. 34A, 34B and 35 are depictions of interfaces that may be utilized by embodiments of a language learning system.

FIG. 39 depicts one embodiment of non-player tasks.

DETAILED DESCRIPTION

Figure 1B:
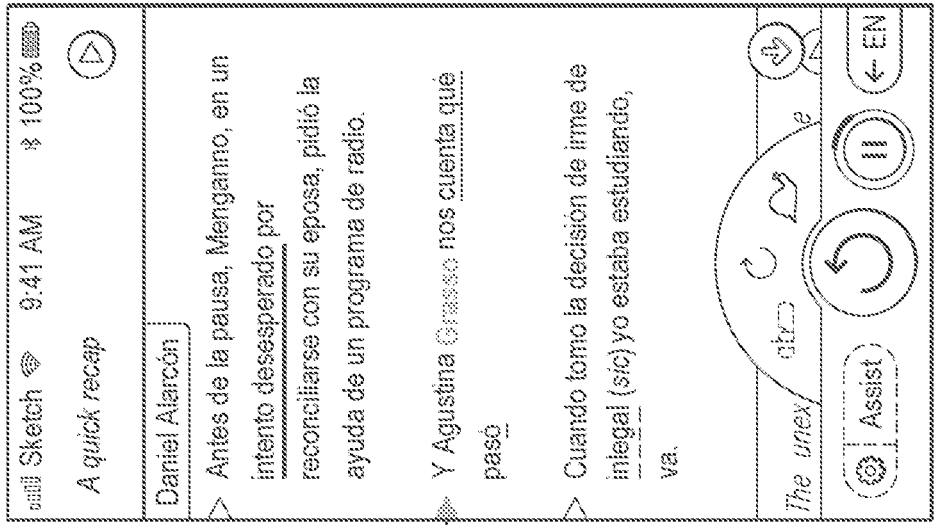
FIGS. 1A and 1B are depictions of interfaces that may be utilized by embodiments of a language learning system.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before delving into more detail regarding the specific embodiments disclosed herein, some context may be helpful. Natural speech is innately hard to understand for most non-native speakers, and direct exposure is important so that they can acquire the skills necessary to have real-world conversations. Reaching a level at which the learner can have real conversations with almost any native speaker of the target language (which is far beyond what is commonly referred to as "conversational ability") is an important milestone in language acquisition. It marks the point where the learner can quickly improve their mastery of the target language by using it, rather than studying it, thereby accelerating to actual robust fluency in the target language.

Simplifying the spoken material itself as a means of training the learner in listening comprehension, so that it is closer to what the learner can understand unaided, is a poor approach. Speaking slowly is not the same as slowing down normal speech. And the process of manicuring conversations for didactic purposes removes the natural warp and weft of the language. It may have the veneer of the real language, rather like vinyl can have the veneer of real wood, but it is far from the same and it cannot be fashioned in the same way.

The challenge then is how to define a method that, over a reasonable time, say months, carries the learner to a level where they can listen and understand natural speech unaided, while using the very material they cannot understand. The learning curve has to be shallow enough to be manageable, but steep enough so there is material upward progress.

Prior solutions are problematic, first, they may offer the learner a full transcript and full translation of the recorded material so they can follow along. As a regular aide these solutions offer too much of the wrong kind of help. Written words are hard not to read, and reading can short-circuit the ears: the learner hears the words after the words are already decoded, without exercising the part of their brain for decoding the native sounds. Prior solutions may also give the learner an interface to select a word in the written transcript and show the dictionary definition for that word. This feature is less useful than it might first seem. Natural spoken language (and the type of rich prose found in audiobooks and other audio presentations) is rich in subtle usages and expressions that are context dependent, not context-free as with a dictionary definition.

Generally then, one problem with these previous types of study applications is that most study applications and methods expose students only to 'designed-for-classroom' speech, where the pronunciation is clear and formal, and which uses limited constructions and vocab. It is a designed speech—designed around a language curriculum. The problem is when the student can understand, say, Spanish when spoken in the designed-for-classroom form, but cannot understand it in its natural forms (e.g., the forms in which it was actually spoken by native speakers in common usage).

Another problem with these language applications is that the presentation of the full visual text or transcript in association with the auditory presentation naturally shifts the emphasis to the visual presentation as opposed to focusing on comprehension of the auditory presentation. For example, the problem with watching foreign language TV as a method of ear training, for most learners, is that without the subtitles it is too hard to follow, and with the subtitles (transcription or translation) in the visual presentation it then becomes a reading exercise, not a listening exercise. Since a goal of language learning is to improve listening fluency it is desired to make sure that the ears are doing enough work so that they are getting trained, while still getting enough help so that the student can get through the challenging audio material.

Active study always benefits from focused attention. This is more so the case for studying listening, since the activity happens in real-time. A person has no control over the sound waves hitting their ears so the listener has to ride those waves and stay on top of the meaning. If a learner finds herself stuck thinking about something said a few seconds ago, they will likely miss what is coming at them right now: they have fallen off their semantic surfboard so to speak, and it can be hard to climb back on. This situation further impedes the ability of a language learner to study the language to improve listening fluency in the target language.

Embodiments of a computer implemented language learning system and method for implementing or assisting in self-study for improving listening fluency in another language (e.g., a second, third, etc. language, generally referred to as a "target" language) are thus disclosed herein. Such embodiments may simultaneously present the same piece of content in an auditory presentation and a corresponding visual presentation of a transcript of the auditory presentation, where the two presentations are adapted to work in tandem to increase the effectiveness of language learning for users.

Embodiments of such a language learning system allow a language learner to practice listening to dialog spoken in a variety of natural accents, styles and speeds, to achieve native level listening skills to handle many situations in the real world, whether conversational, transactional, or consuming media (such as TV shows, movies, radio shows and podcasts). In addition to ear training, the embodiments help the learner build a robust and practical passive vocabulary (e.g., words that are recognized, even if not employed in speech by the learner).

The listening brain is a pattern recognition learning machine. Accordingly, embodiments are based on the thesis that the brain should be fed the real spoken content for it to internalize those patterns. Embodiment may thus include various aspects, including transcript based redaction, speed control or presentation of content, highlighting 'tricky bits' (sections of spoken audio that might be especially hard to understand for non-native ears), notes on unconventional or incorrect usages (malapropisms, grammatical deviations), and general contextual notes on pronunciation.

For this reason, embodiments as disclosed herein (which may also be referred to without loss of generality as the Jiveworld system or application, Jiveworld technology or just Jiveworld) may be especially useful when applied to recordings of language spoken by native speakers for native speakers in a broad range of natural environments, though embodiments may be usefully utilized in other contexts as well. Specifically, while embodiments may be usefully applied with natural spoken audio recordings—for example, radio interviews with native speakers or audio books or magazines—it could also be applied to almost any other content desired like music with lyrics in the target language, or video content.

Certain embodiments may be adapted to focus a user's attention on an aspect of the presentation that may be most conducive to learning the second language and the presentation of the content may be adapted to allow a user to focus primarily on a single aspect of the presentation. In particular, embodiments of the interface have been adapted to give the user (i.e., learner or listener) just one thing at a time to focus on, as one goal of the Jiveworld application is to keep the listener on the "edge of understanding" providing them enough context so they know roughly where they are in the plot of the story, but not too much help that there is no work for their ears and brain to do in following the auditory presentation.

For example, in the Jiveworld system that uses a visual display where the visual transcript of the auditory content being simultaneously presented may be partially or fully redacted. The redaction may take the form of a "lozenge" (e.g., a visual obfuscation of a particular word or set of words) that obscures each redacted word of the transcript (e.g., while any unredacted words may appear as text of the target language). Such a lozenge may be approximately the size (e.g., length or height) of the word being redacted, allowing a user to take in a word boundary without showing the actual word. The length of this boundary may give some hint of the written and spoken length of the word (especially for an alphabetic language), and thus help nudge the learner towards hearing more accurately.

Moreover, either the presented text or the redacting lozenge may be presented in a specific (e.g., contrasting) color. The specific color may be used in the visual presentation to provide a visual indication of something related to the word, or location of the word, which could, for example, be the word currently being spoken (e.g., in a corresponding auditory presentation), or a contextual note or hint used to turn the listeners attention to a change in the subject under discussion in the auditory content being presented.

Thus, the visual presentation may be dynamic, with, for example, the color of the text or lozenge may change based on (and in association with) the auditory presentation of the content. Related to this, in certain embodiments, pauses may (e.g., automatically) be injected into the auditory presentation of the content when such a note or hint is presented in the corresponding visual presentation of the content (e.g., since it is desired to keep the listener from trying to read one thing while listening to something different).

The presentation of the content according to embodiments of a language learning system may also be configured for how humans adapt and learn, and be adapted to manage attention of users accordingly. Rather like training a particular muscle in the gym, there is a natural work and recovery cycle for concentration in studying. If the period of concentration is too long then the concentration is not sustainable, while too short a period impacts learning momentum and listening resilience. Accordingly, embodiments may present content according to such a work and recovery cycle to get sustained progress in ear training.

In particular, embodiments of the Jiveworld language learning system content presentation for listening may be based on 'sprints' of listening effort that cover audio segments that are a certain length (which are referred to as "chapters" without loss of generality). This length may be for example, around 100-250 seconds, though other lengths may be utilized according to need or desire. If, for example, an audio piece is a certain length (e.g., 20 minutes long), the audio segment (and corresponding visual presentation of text) might be divided up into 100-250 second chapters (e.g., around ten chapters when the content is 20 minutes long).

In certain embodiments, the Jiveworld application guides the learner to listen to each of these chapters at least twice in succession (colloquially referred to as 'at least two coats of paint'). A first pass may be done with assistance—this will require more deliberate attention (e.g., akin to cycling uphill) as the material is brand new with new challenges and vocabulary. This presentation will typically take 2 to 4 times the audio length, so a two-minute chapter might take 4-8 minutes of study.

A second pass can then be presented without (or with more limited) assistance. This second presentation may be important to reinforce the new material listening at natural speed without needing to pause to look things up. This requires much less concentration effort (like cycling downhill). This more limited assistance may include, for example, more redactions or fewer visual indicators, etc.

In other embodiments, a user can choose more or fewer iterations. However, embodiments of the interface may encourage this two pass learning. After listening to each chapter (e.g., segment of audio content and corresponding visual transcript) twice, and working through the vocabulary study flow for any words they have selected on the way, the user may be able to listen to the full length of audio in one go with relative ease.

Figure 1A:
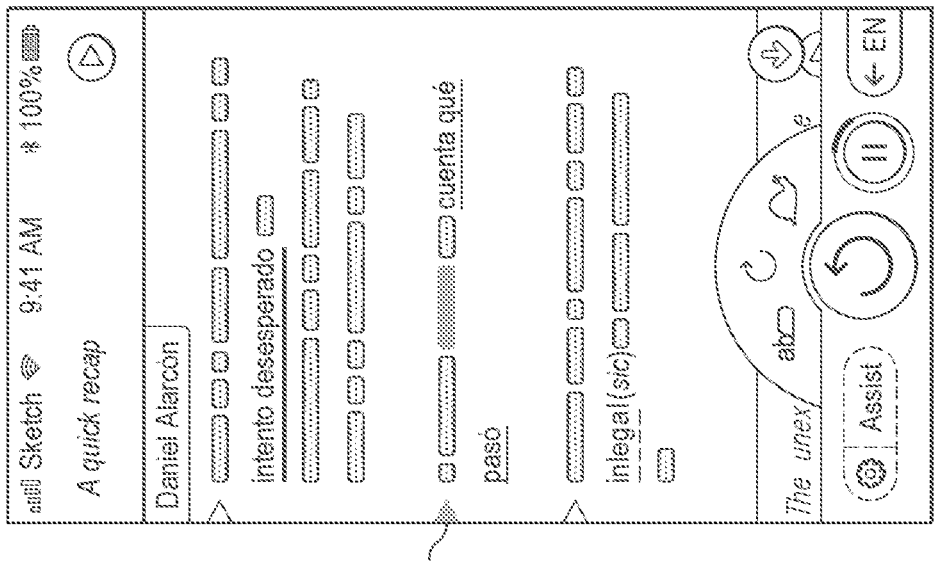

Embodiments of the design and implementation of the Jiveworld application will now be discussed in more detail. Referring first to FIGS. 1A and 1B, embodiments of an interface for the Jiveworld application are depicted. The interfaces show embodiments of a visual presentation of a partially redacted and a fully unredacted transcript (e.g., text that may be displayed in conjunction with a corresponding auditory presentation of the content or as a standalone visual presentation).

As can be seen, embodiments may present a visual transcript that is a representation of the simultaneously presented spoken transcript that allows individual words of the transcript to be either shown or obscured ('redacted'). Moreover, as will be discussed, embodiments may also have a pointer 110 (e.g., in a particular color such as teal) in the left margin indicating the current sentence (e.g., being presented in the corresponding auditory presentation).

FIG. 1A shows a spoken passage with most of the words redacted, replaced by solid bars (referred to as "lozenges"). FIG. 1B shows the same passage completely unredacted. Note that according to embodiments the visual presentation is dynamic. Thus, the current word (redacted or not) that the listener is hearing in a corresponding audio presentation of the content (e.g., in the audio track) being presented is highlighted (e.g., in teal, or another color corresponding to a currently presented word) in real time. In other words, if the current word being presented in the auditory presentation is redacted, the lozenge redacting that word in the visual presentation may be highlighted, while if the current word being presented in the auditory presentation is not redacted, the text for that word in the visual presentation may be highlighted.

Having these redacted words in the visual presentation may serve many purposes. Among others, the use of redacted words allows embodiments of the Jiveworld application to fine-tune the amount of assistance given to the user as they listen, keeping them on the "edge of understanding". Thus, the ratio or percentage of redacted words to unredacted words in the visual transcript may be varied based on a desired amount of assistance to be provided to a user. Depending on the settings or other criteria, embodiments of the Jiveworld application may show in the visual presentation, for example, only certain vocabulary words as unredacted (e.g., with the other words of the visual transcript highlighted).

The use of redacted words may also allow the user to visually follow and navigate the visually presented script in a consistent way, in particular by rendering the redaction lozenge at substantially the same width as the word, in place where the word would be. This treatment prevents the need to recalculate the layout of the transcript, and thereby allows the eye to stay focused in the same place on the screen (e.g., the word or lozenge highlighted (e.g., in teal or another color)), as in FIGS. 1A and 1B, whether in the redacted or the unredacted form. Moreover, as the redaction lozenge is approximately the size of the word, the redaction lozenge allows the visual presentation to show the word boundaries of the visually presented text (e.g., even when the text itself is not shown for that word in the visual presentation). Showing the word boundaries without showing the words helps the user's brain organize what it hears into symbolic chunks. The non-native ear often mishears words by confusing the boundaries between them. Showing the word boundaries aids in alleviating such confusion in users of the Jiveworld application.

Figure 2A:
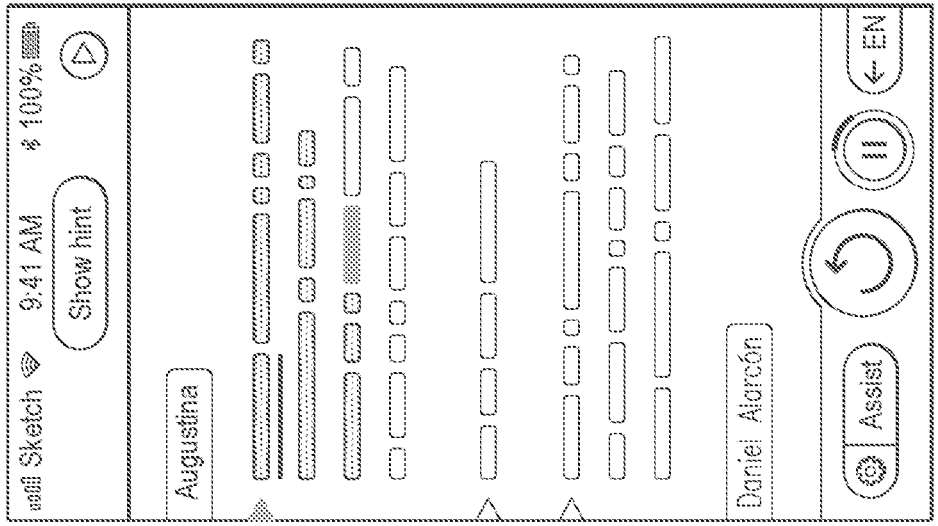
FIGS. 2A, 2B and 2C are depictions of interfaces that may be utilized by embodiments of a language learning system.
Figure 2B:
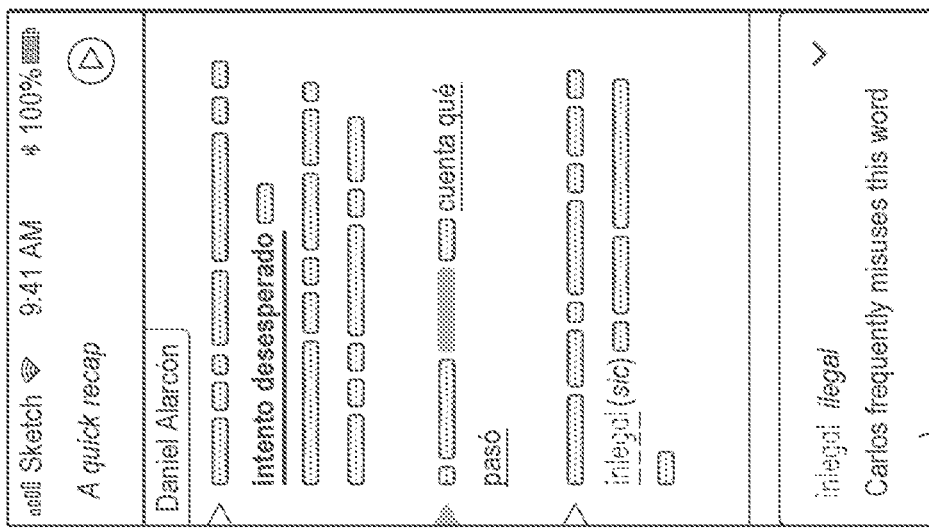
Figure 2C:
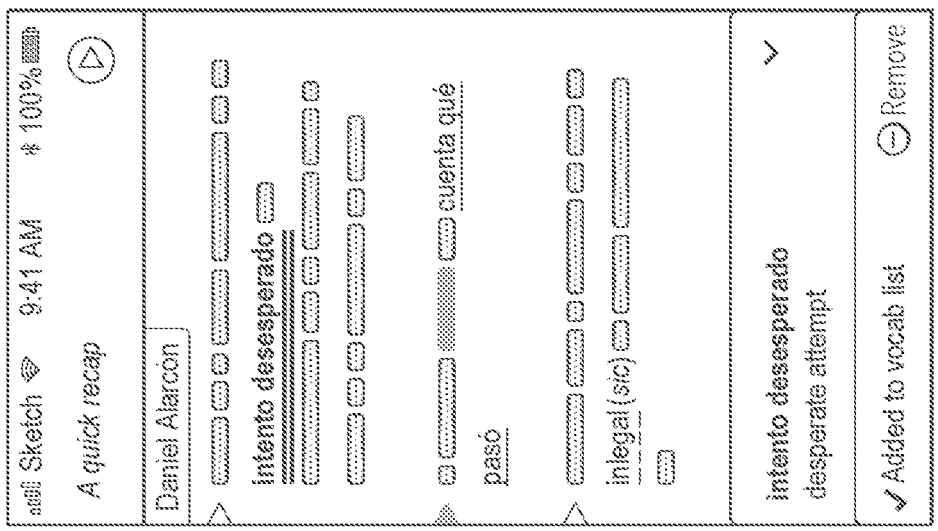

FIGS. 2A, 2B and 2C depict embodiments of other interfaces of the Jiveworld application. These interfaces depict embodiments of the use of redacted words to allow the Jiveworld application to fine-tune the amount of assistance given to the user as they listen. This assistance may comprise levels ranging, for example, from a fully redacted transcript, to a partially redacted transcript, to a fully unredacted transcript. Specifically, in certain embodiments, the Jiveworld application can control the amount of assistance to the learner while they are listening by unredacting certain classes of words or word groups (collectively word groups). Consider four different types of word groups (other examples are possible and are contemplated herein) that may be left unredacted (e.g., and emphasized) in visual presentations of the content:

Vocab or Vocabulary—selected words or phrases that are less common and may be unfamiliar to a learner may be unredacted in the visual presentation. FIG. 2B shows "intento desperado" as one example of a less common phrase that may be left unredacted (e.g., and emphasized with a colored underline such as a green underline) as an example.

Incorrect Usage or SIC—words or phrases in the content that do not follow the standard rules of grammar, are incorrect words, or are words used in the wrong context (e.g., unintentionally by the speaker) may be unredacted in the visual presentation. FIG. 2B shows "inlegal" unredacted (e.g., and emphasized in a color such as orange) as an example.

"Tricky Bits"—groups of words that are spoken fast in the auditory presentation, are elided, or are otherwise difficult for a non-native listener to understand, even if the words themselves don't qualify as interesting vocabulary. The tricky bits may be unredacted in the visual presentation. The phrase "cuenta qué pasó", unredacted (e.g., and emphasized in a color such with a dotted grey underline) in FIG. 2B is one such example of the presentation of a tricky bit in an interface of embodiments.

Annotations—These are words, phrases, or names in the content that might have some cultural, historical or linguistic significance that the learner might not be familiar with, to which an editorial note could be added in the visual presentation.

Some of the above, or other unredacted portions, of the transcript might require accompanying notes or explanations. Certain embodiments of an interface presented by the Jiveworld application may thus provide explanatory notes synchronized with the auditory and visual presentations. FIG. 2B shows a panel 220 that may pop up from the bottom of the interface, referred to as a "slide-up panel" (e.g., when the unredacted incorrectly used "inlegal" is being spoken in the auditory presentation, when the term "inlegal" is selected in the visual presentation by the user, when the visual presentation is displayed, etc.) explaining what the speaker in the auditory presentation of the content could have said (e.g., if using more standard Spanish usage) instead of "inlegal" (e.g., a correct term in Spanish, like "ilegal").

The embodiment of the interface in FIG. 2C shows a slide-up panel 222 with a definition for the vocabulary word unredacted in the visual presentation of the interface (e.g., "intento desperado"), with some other actions that might control how the vocabulary word is added to a vocabulary review list. In each of these cases selecting the unredacted (e.g., and highlighted) word group (e.g., a vocabulary word, a tricky bit, an annotation, an incorrect usage, etc.) in the visual presentation by tapping on the word group (e.g., using a device with a touch-screen) or otherwise selecting it (e.g., using a mouse click or other input device), in the transcript could reveal this panel.

Embodiments of the language learning system can automatically unredact any, or all, of these word groups according to a set of rules. FIG. 2A shows a transcript with all the words redacted, but the first redacted word has a colored (e.g., green) underline, indicating that it is a word group of interest (e.g., a vocabulary word for instance). Tapping (or otherwise selecting using a computing device, which will collectively be referred as tapping or selecting herein without loss of generality) this on the screen would unredact just that word group. A further tap may show a definition panel for that word or words in the interface (e.g., panel 222 in FIG. 2C).

As discussed, at least two desires of embodiments of the Jiveworld system are first to tailor the assistance given to users to keep them on the "edge of understanding" and second, to provide a user interface that is easy to use. In certain cases, these two desires may be difficult to reconcile. One solution is to provide a simple on/off assistant switch in the interface, illustrated in some FIGURES (e.g., assistant switch 112 FIG. 1A) such as a button in the bottom left of the player screen, that is highlighted (e.g., yellow when active).

Figure 3C:
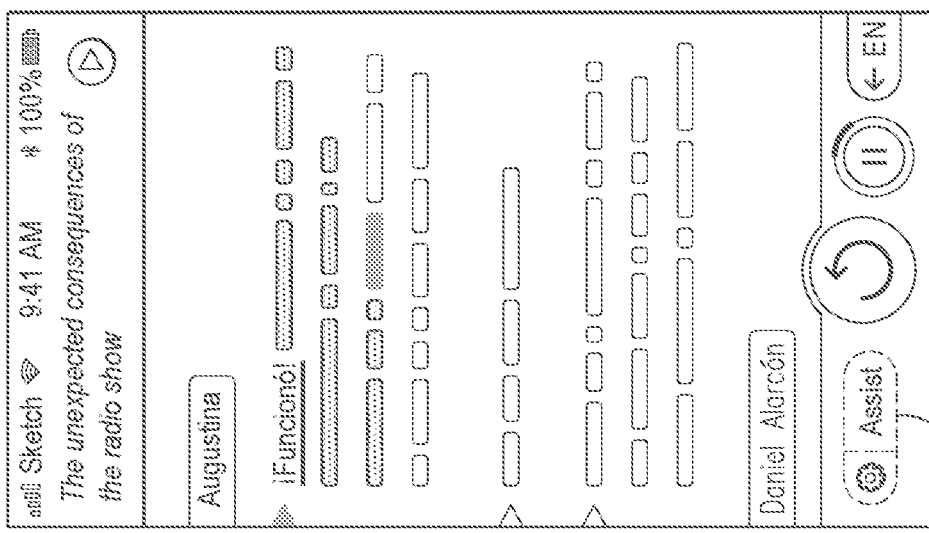
FIGS. 3A, 3B and 3C are depictions of interfaces that may be utilized by embodiments of a language learning system.
Figure 3B:
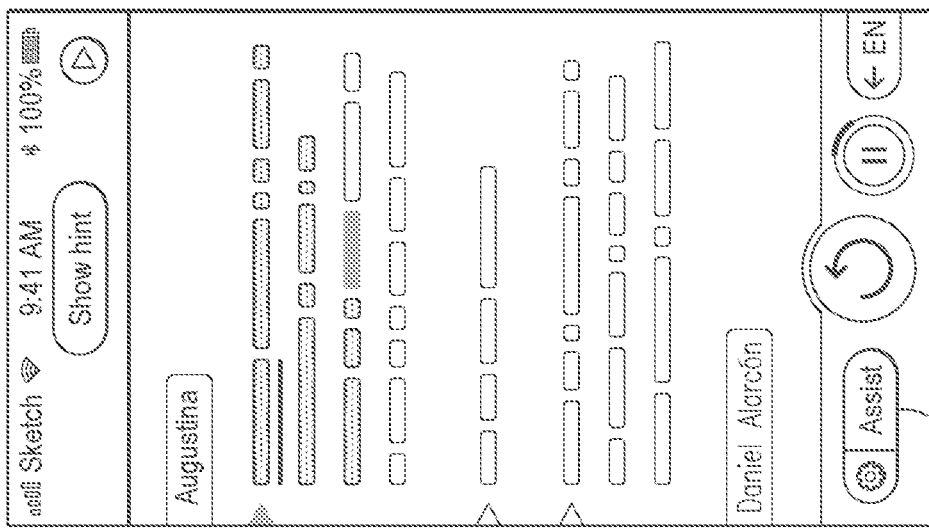
Figure 3A:
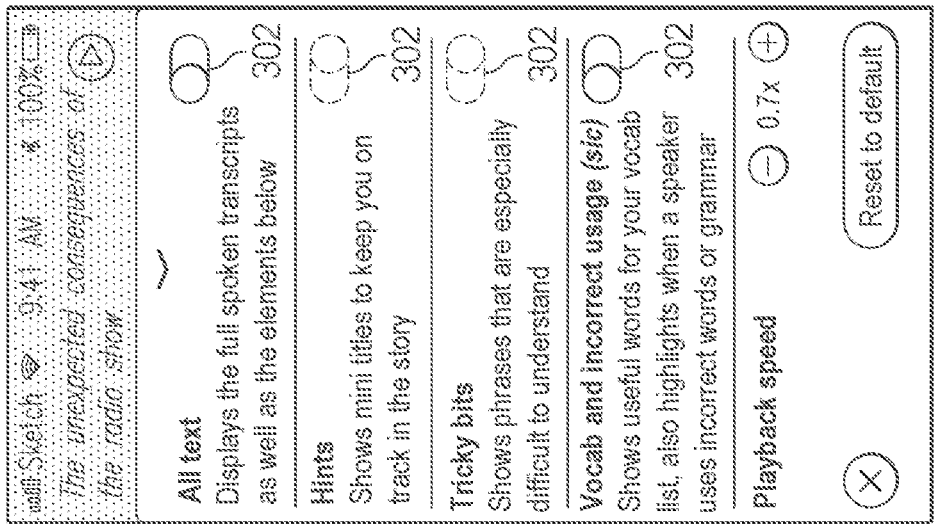

However, other embodiments may provide a way for users to more specifically tailor the types of assistance they get when they switch the assistance on. FIGS. 3A, 3B and 3C depict embodiments of still other interfaces of the Jiveworld application. FIG. 3A shows a settings screen interface that allows the user to tailor the types of assistance presented by, for example, selecting which kinds of word groups to show automatically unredacted, or even to show everything unredacted. By using the "slide" buttons 302 a user may select whether all the text, hints, tricky bits or vocab and incorrect usage are highlighted or displayed. The user may also use the settings screen interface to set the playback speed (e.g., how quickly the auditory content is presented relative to the original auditory transcript of the content). This may be, for example, a slow-speed setting which allows a custom audio time-stretch parameter (shown in the example depicted as 0.7×, or 70% of normal speed) to make it easier to follow.

Interfaces according to embodiments may also be simplified by using a single slider letting the user select from a series of preset assistance levels. Users may prefer the less fine-grained control in return for a simpler interface. Embodiments may also allow the assessment of different gradations of vocabulary or "tricky bits" and may expose settings to show more or less of gradations of tricky bits depending on the learner's level in the target language. Note that even when assistance is off, interfaces can still make the passage hints, vocab, notes, etc. accessible (e.g., by tap on a touchscreen device) on an instance-by-instance basis as illustrated.

The "Assist" button 312 in FIGS. 3B and 3C (bottom-left of screen) show how the user can control whether assistance is on (e.g., when the button is highlighted such as in yellow), or off (e.g., when the button is highlighted a different color such as in white). When assistance is off everything in the visual presentation is redacted by default, allowing the user to tap on the individual word groups (e.g., each individual lozenge presented in the visual presentation of the content) to unredact that word group. When assistance is on, only the types of assistance selected in the settings menu (e.g., through the menu depicted in FIG. 3A) may be enabled.

Other than explicit controls for auto-unredacting word groups (e.g., types of word groups), the system may have other ways of assessing the appropriate level of assistance. For example, if the user starts with everything redacted but tends to tap on "tricky bit" word groups frequently, this could be a signal to the application to unredact these "tricky bits" by default for the user. Thus, the system may have some threshold or time period whereby if the user interacts with a particular type of word group over the threshold amount during a given time period those types of word groups may be unredacted for that user. These thresholds and time periods may be, for example, different based on the type of word group, the user, the content being presented or other criteria.

Contextual based menus may also be used by the Jiveworld application in certain embodiments. For example, another way of allowing a user to unredact words is by offering them extra options when they rewind the audio presentation of the content. When dealing with challenging listening material the language learner will often need to rewind a short section to listen again before moving on. Jiveworld makes this action both easy and useful. When the user rewinds the content presentation both the audio content being presented and the corresponding visual presentation of the content reflect the rewind state. Specifically, the visual presentation may be returned to a point such that the highlighted word group in the visual presentation corresponds to the place in the audio content where the audio content was rewound (e.g., to the word or word group being presented in the audio content).

However, rewinding does more than just move the listening position back (e.g., move the audio content and visual presentation back by some amount). When the user rewinds, it is a strong signal that they might need some extra help to engage with the section of content being presented. It might be a specific word that they need to understand, or it could be a whole construction they missed; it might be because they're unfamiliar with the words used, or the style of speaking confused their ears, or for some other reason. Thus, embodiments of interfaces as used by the Jiveworld application may be context sensitive; utilizing the user interaction for a rewind request to present additional information and affordances in the visual presentation of the content (e.g., regarding one or more types of word groups).

Figure 4A:
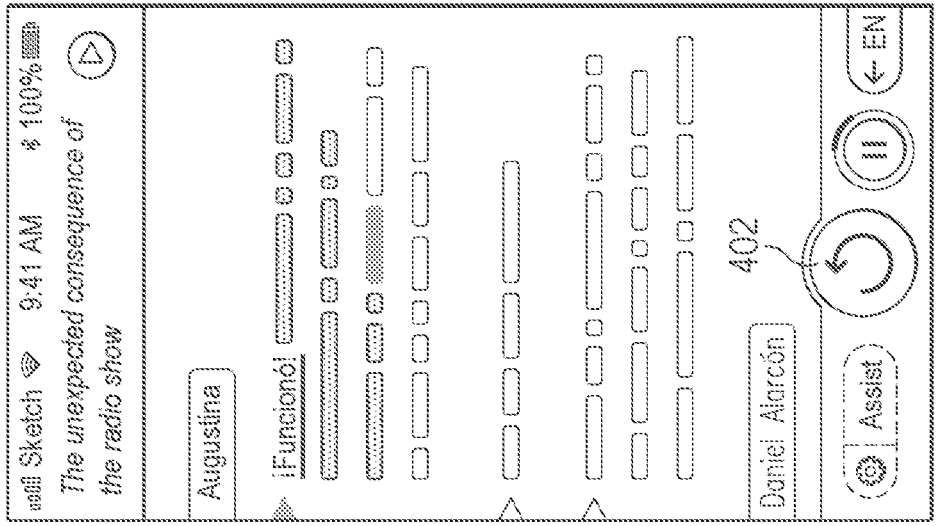
Figure 4B:
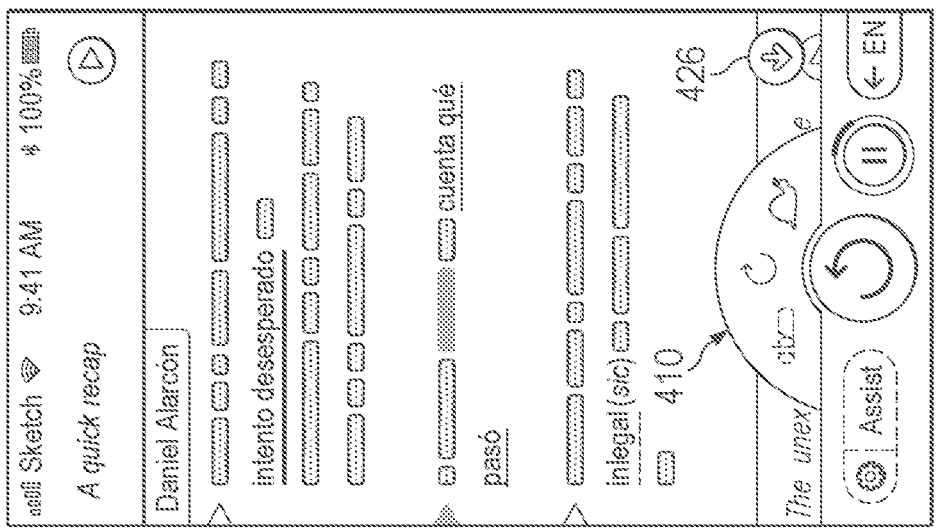

FIGS. 4A, 4B, 4C and 4D depict embodiments of contextual based interfaces of the Jiveworld application that may be used, for example, when rewinding a (e.g., auditory) portion of a transcript. FIG. 4A shows a large rewind button 402 in the bottom center of the screen. When that rewind button 402 is tapped or held the audio player's presentation of the audio content and the (e.g., highlighted) position in the visual presentation of the transcript of the content jump back (e.g., phrase by phrase or word by word). The tapping or holding of the rewind button 402 puts the application into a "rewind state" (e.g., until the audio has played forward again to the position where they initiated the rewind). In this rewind state, embodiments of an interface may show an extra options menu 410 as depicted in FIG. 4B, in an arc around the rewind button.

This menu 410 and the options are useful because, in most cases, when a user rewinds the audio transcript it is quite probable that they didn't understand the audio, and want to relisten to the preceding phrases. This is an appropriate context to offer them extra help if they want (e.g., to assist in what is presumed to be a lack of understanding).

Figure 4C:
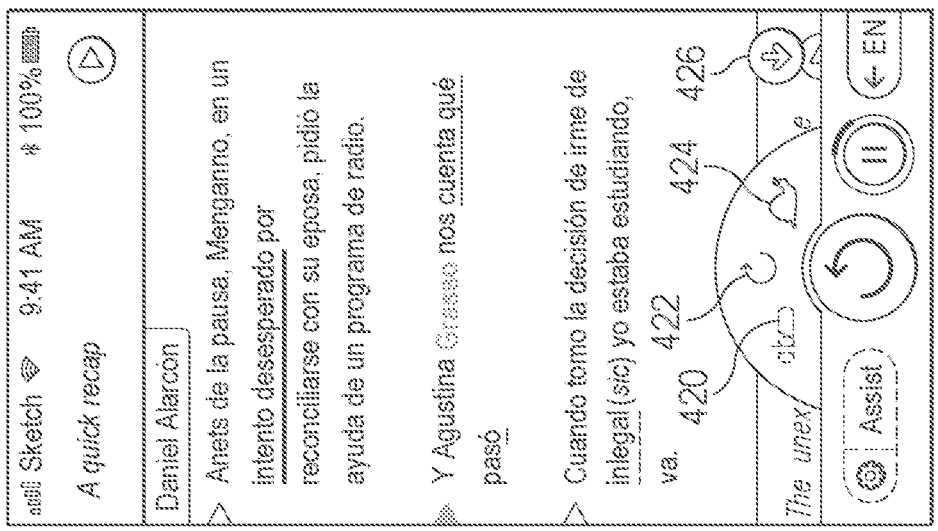

One of these options buttons 420 (e.g., the left-most of the three in the black arc—can trigger the unredaction of all the text. FIG. 4C shows this button 420 highlighted (e.g., in yellow)—after the user has tapped it—with the text above in the visual presentation all unredacted. This "show text" option button 420 thus switches the visual presentation of the content to the full unredacted text for that section.

Other options offered while in a rewound state are the forward option button 422 which allows reversing one of the rewind taps in case the user went back too far and the slow listen option indicated by the snail icon 424. This slow listen option may add additional time stretching on top of what may already be activated in assist mode (e.g., as set in the assistance menu as discussed above).

Again, FIGS. 4A and 4B show embodiments of interfaces of the Jiveworld application before and after the rewind button 402 (large button located at the bottom center of the screen) is pressed or held. Each tap of the rewind button may move the cursor (e.g., as represented by the highlighted word or lozenge in the visual presentation) to a semantically logical place such as the beginning of a sentence or to the beginning of a clause in a longer sentence. In the example interface of FIG. 4B the presentation of content has been stepped back a number of times relative to the example in the interface depicted in FIG. 4A.

In certain embodiments, the Jiveworld application saves the location in the content that was being presented before the rewind button 402 was pressed. This location may be tracked by the Jiveworld application in a "furthest played" marker (or variable). The user may be made aware they are in the rewind state by the display of the extra actions offered to them in the arc menu 410 above the rewind button 402 in the visual presentation of the content, and in the visual treatment of the script ahead of the cursor (e.g., as represented by the highlighted word or lozenge in teal color in the visual presentation). When the cursor has joined back up with the furthest played point (e.g., when the highlighted word or lozenge corresponds with the point in the content that was being presented before the rewind button 402 was pressed as maintained by the "furthest played" variable) the visual interface would revert back to how it was originally in FIG. 4A (e.g., the menu 410 may disappear and the Jiveworld application may be taken out of the rewind state). The user can force the player to the furthest listened state (e.g., to the furthest played marker) at any time using the down arrow icon 426 to the right of the arc menu 410.

Figures 4D, 7:
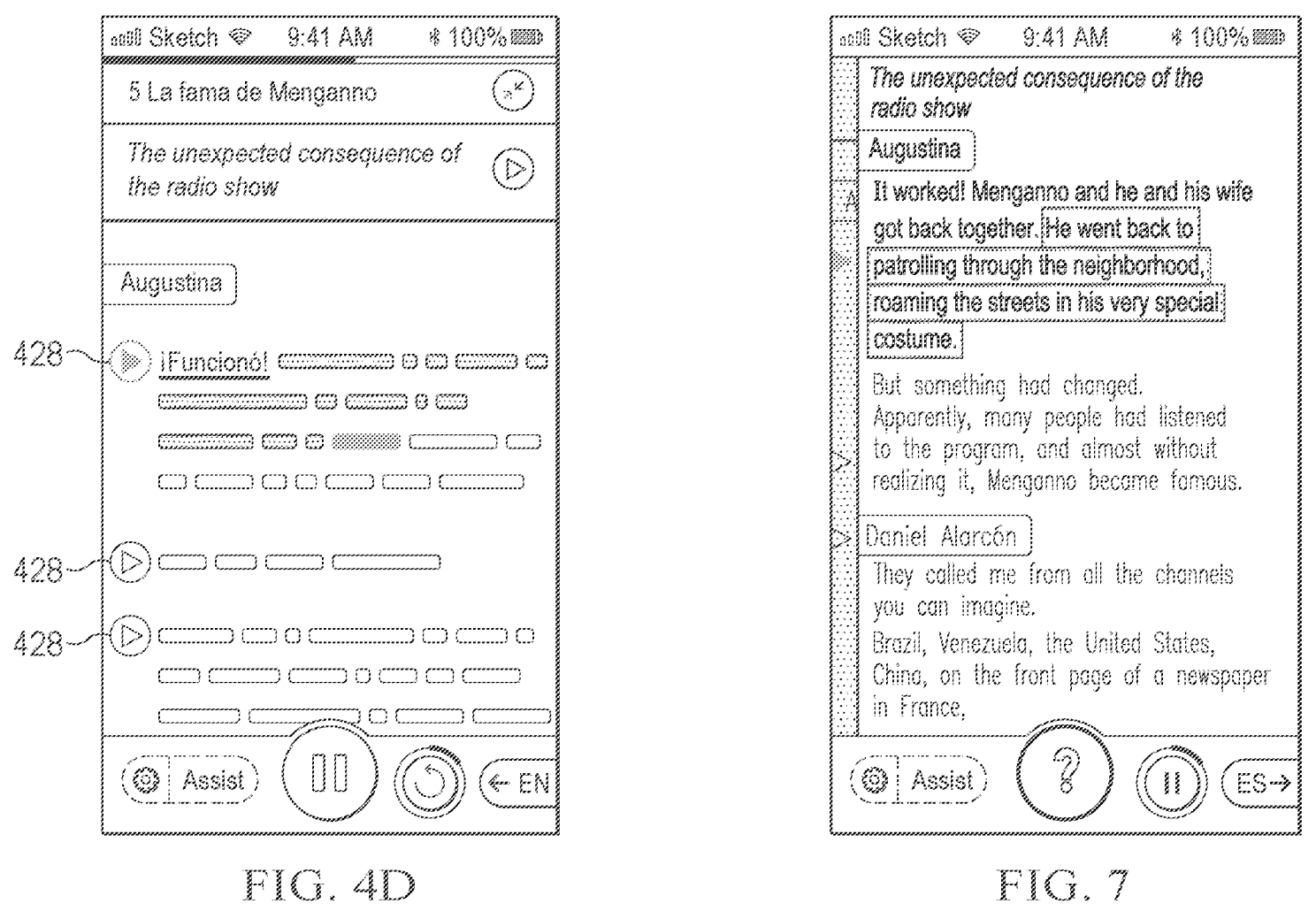

An additional way of jumping back (or forward) in the presentation of the content (e.g., both the visual presentation of the content and the auditory presentation) is shown in FIG. 4D. In this case there are buttons 428 in the left margin of the visual presentation that will cause the presentation of content to move to the beginning of a corresponding sentence (or other portion) of content. These buttons 428 could be revealed by, for example, explicitly pausing the player (e.g., pressing a pause button on the interface) or by a swipe-right (or other) action on the main body of the visually presented transcript of the content. This is yet another illustration of why it is useful to be able to represent the transcript visually in the visual presentation in redacted form (e.g., with lozenges covering one or more words or word groups of the visually presented transcript of the content): the visually presented transcript provides the user an easy way to navigate by scrolling to a part of the displayed transcript. The speaker labels (e.g., displaying "Augustina" in FIG. 4D) and hints (e.g., displaying "The unexpected consequence of the radio show" in FIG. 4D) that may be presented in association with the visually presented transcript give extra context while a user is manually scrolling that a user would not be provided with a traditional horizontal scrubber bar found in an audio or video player.

Embodiments of the Jiveworld application and associated interfaces may also improve understanding by allowing greater passive vocabulary acquisition. Focusing specifically on the passive vocab acquisition, embodiment may utilize a vocabulary review process that is based on audio recognition first and foremost, making it complementary to the processes and techniques employed for the listening practice described above. FIG. 5A depicts an embodiment of an interface that may be utilized by the Jiveworld application where a user can elect to add or remove a vocab element from a vocabulary list (shown in the panel 520 at the bottom of the interface which may be a slide-up panel or the like).

FIGS. 5B and 5C show embodiments of views of the vocabulary list that may be maintained for a user which allows the user to view and remove elements (e.g., 522) from a vocabulary list that may be maintained for a user. The user can thus work through their vocab list in the context of the passages where they encountered it (e.g., there are references to the section of the original content in which the vocabulary in the list was originally encountered).

Figure 6A:
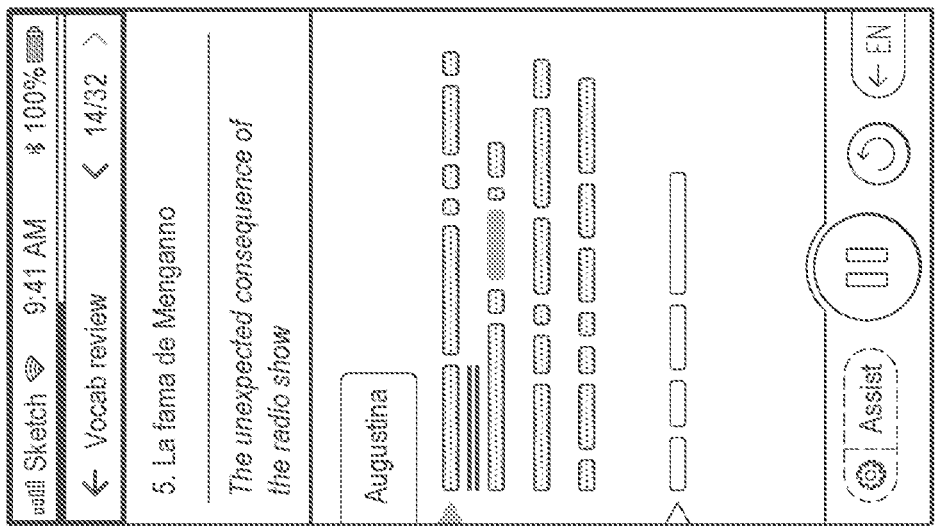
FIGS. 6A, 6B and 6C are depictions of interfaces that may be utilized by embodiments of a language learning system.
Figure 6B:
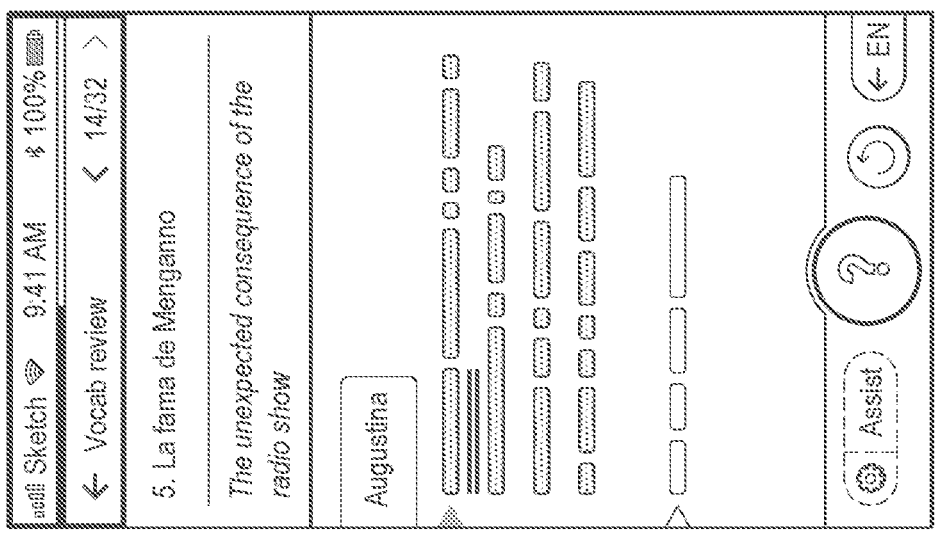
Figure 6C:
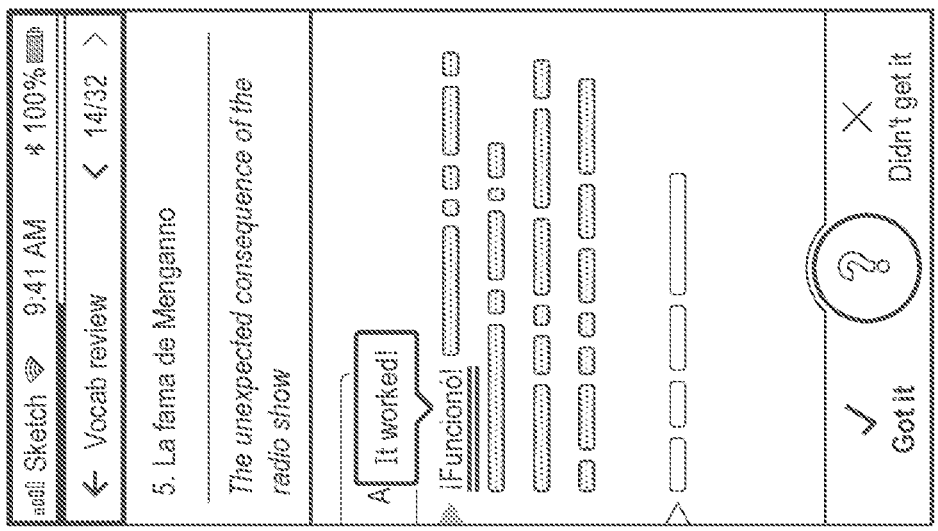

FIGS. 6A, 6B and 6C depict embodiments of visual interfaces illustrating how these vocabulary lists can work in an embodiment of the Jiveworld application. As an illustration, suppose a user has accumulated a vocabulary list in the manner described illustrated by FIGS. 5A, 5B, 5C for the story that they are studying. The selection of a "review vocabulary" mode by the user may result in the interfaces of FIGS. 6A, 6B, 6C. The user may then proceed one by one through their vocabulary list, in the same order as they appeared in the story. For each vocabulary entry the user may be presented with the sentence in which the vocabulary appeared. The users first concern is to recognize the spoken word (e.g., the double-underlined redacted word in FIGS. 6A and 6B) and second to understand the meaning. Since the example sentence presented in the interface is now disembodied somewhat from the chapter in which it appeared (e.g., its original context) embodiments of the interface can provide the relevant chapter title, passage hint, and even chapter summary to give the user extra context.

FIG. 6C depicts an embodiment of an interface that assists a user in revealing the vocab transcript and meaning, and grade themselves, either keeping the vocabulary in the list for further review, or dismissing it as learned. In this case the vocab word is "funcionó" (Spanish), meaning "it worked" in English. An assist mode may be provided here, in a vocabulary review context. The assist mode may, for example, allow the user to unredact every word except for the vocabulary word.

After having marked the vocabulary as successfully recognized ("Got it") or not ("Didn't get it") as illustrated in FIG. 6C, the user may proceed to the next vocabulary item on their list.

Other embodiments of interfaces may also be used to assist in gaining listening fluency in embodiments of the Jiveworld application. One of these embodiments may be referred to as a visual focus indicator. As listening is done in real time, the concept of "now" is important. The principle of serialized attention dictates that the user should never be reading one thing while listening to something else, so there is only one thing at a time that they are focused on. In other words, the visual presentation of the content and the auditory presentation of the content should be substantially synchronized, and kept synchronized.

In the visual display of content, the visual focus indicator may be represented with a contrasting effect. As discussed, a user may see the word currently being presented auditorily (or its redacted counterpart lozenge) highlighted (e.g., in a particular color such as teal blue) as depicted in the previous figures. In other words, the word (or lozenge) being highlighted in the visually presented transcript of the content is synchronized to the word simultaneously being presented auditorily in the auditory presentation. Extending the hierarchy of "now", embodiments may also have a pointer 110 (e.g., in a particular color such as teal) in the left margin indicating the current sentence, and the hint that applies to the current passage is at the top with a certain color background (e.g., teal or another color), as depicted in FIGS. 1A and 1B.

Even still, it is easy for a non-native listener to lose their way as the topic in conversation changes or evolves. Using an analogy from before, they fall off their semantic surfboard. Embodiments of interfaces presented by the Jiveworld system therefore give the user signposts (e.g., called "hints" or "passage hints") that can guide them through the auditory content, so they know roughly what to listen for. This is a type of listening assistance.

FIG. 7 shows an embodiment of a translation panel (e.g., that may slide in from the right of the visual display) that displays the current translated (e.g., in English or another native tongue of the user) sentence highlighted (e.g., in teal or another color). FIGS. 8A and 8B show a film strip depicting multiple states of one embodiment of an interface that illustrate how embodiments of the Jiveworld application can transition from one passage to another in the visual interface. An interface can start (left-most frame 802 of FIG. 8A) showing the current passage hint, "A quick recap"—the (e.g., colored such as teal) background shows that it applies to the audio that is currently being presented to the user.

In the second frame 804 of FIG. 8A, the presentation of content has reached the beginning of the next passage, indicated by a thin line 810 in the script (e.g., colored, such as teal). The next frames 806 (of FIG. 8A), 808 and 812 (of FIG. 8B) show the hint 814 revealing itself and remaining in focus, while the audio is paused a few seconds to allow the listener to read it: the longer the text of hint 814, the longer the time the audio presentation of the content may be paused. The play button 818 to the right of the new hint has a ring that animates clockwise, filling as a colored (e.g., black) line, to indicate the duration of the pause. The user can skip the pause by hitting the play button 818 at any time. In certain embodiments the hint may be narrated such that it is presented audibly, either by a human narrator, or a text-to-speech automated system.

In certain embodiments, as the visually presented transcript scrolls up, the interface may continuously present the hint 814 (e.g., "stick it" or "pin it") at the top of the screen (as in the first frame 802 of FIG. 8A) as long as it applies to the content currently being presented in the auditory presentation of the content. While embodiments may reveal hints 814 automatically as corresponding locations are reached in the audio presentation of the content, in other embodiments, a user can decide when or how such hints are displayed in the interface using an option in the "Assistance Preset" menu (e.g., as displayed in FIG. 3A). For example, a user may select to keep hints unrevealed until they choose to reveal the hint text. In this case, the interface may display an action button "Show hint" to reveal the hint (e.g., in place of where the hint text would show) as depicted in FIG. 9. The countdown for the pause may only begin if and when the user triggers the reveal action (e.g., using the "Show hint" button).

Other types of incremental help may be given to the user in other embodiments. For example, FIGS. 10A, 10B, 10C and 10D are embodiments of interfaces that show several types of inline assistance implemented in the visual interface. These include assistance comprising "incorrect usage" (or "SIC"), vocabulary, tricky bits, or biographies.

Figures 10A, 10B:
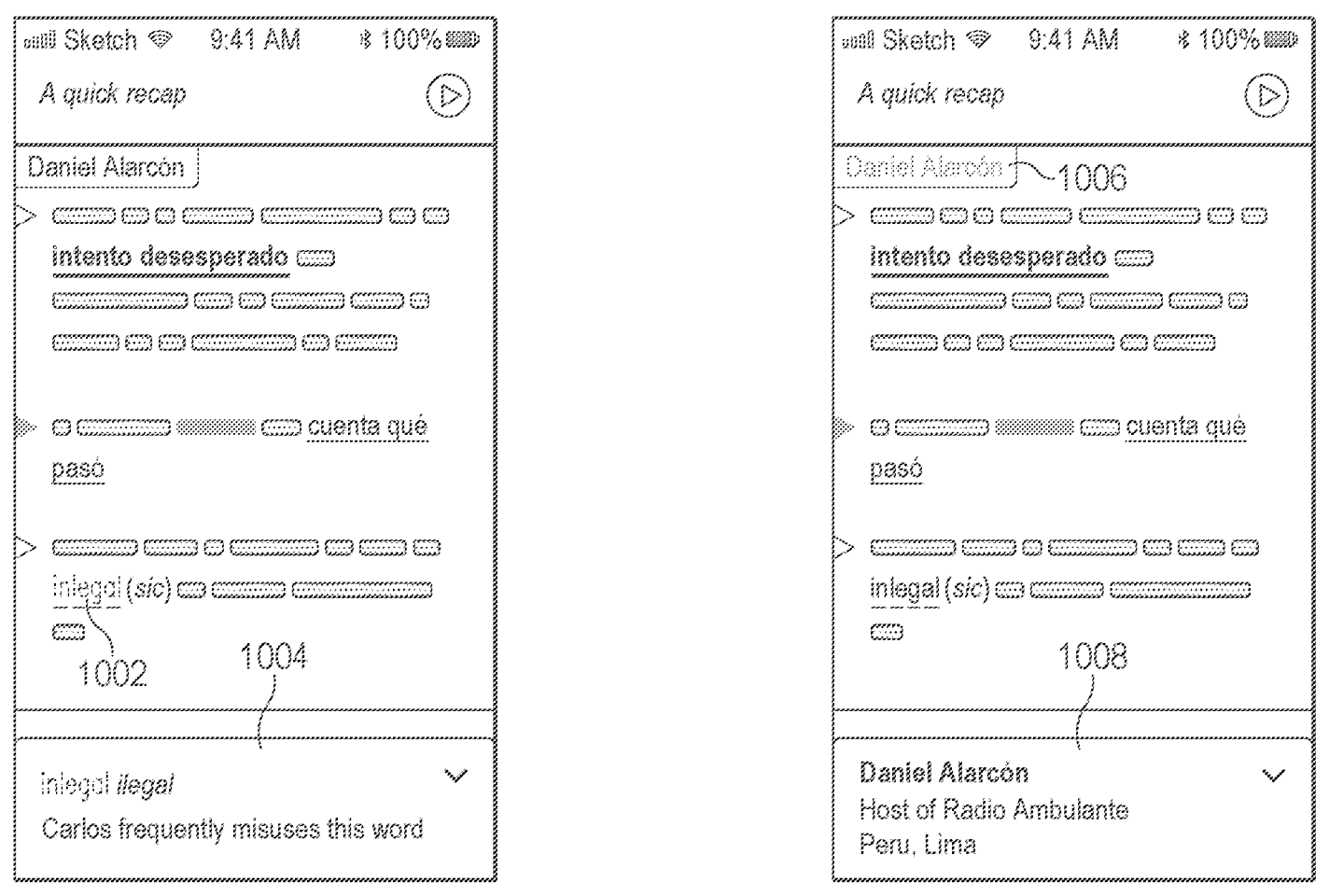

In embodiments of these types of interface, some words or groups of words in the visually presented transcript may have a solid underline indicating that they can be touched or clicked to reveal some useful information. For example, the interface of FIG. 10A shows a word "inlegal" 1002 in a particular differentiating color (e.g., orange or another color), to point out an incorrect usage by the speaker in the auditory presentation of the content. In this case the speaker meant to say the Spanish word "ilegal" (e.g., as noted in the slide-up panel 1004).

The interface of FIG. 10B shows that a speaker label 1006, "Daniel Alarcón" at the top in a particular color (e.g., blue), has been selected to show a short biography describing that speaker's role in the content and other pertinent information (e.g., their origin which may help in distinguishing between local accents and styles of speaking), in case the listener gets confused between the different speakers of the auditory presentation of the content. This speaker's biography may appear in the biography panel 1008 at the bottom of the interface based on an interaction with this speaker label.

Figure 10C:
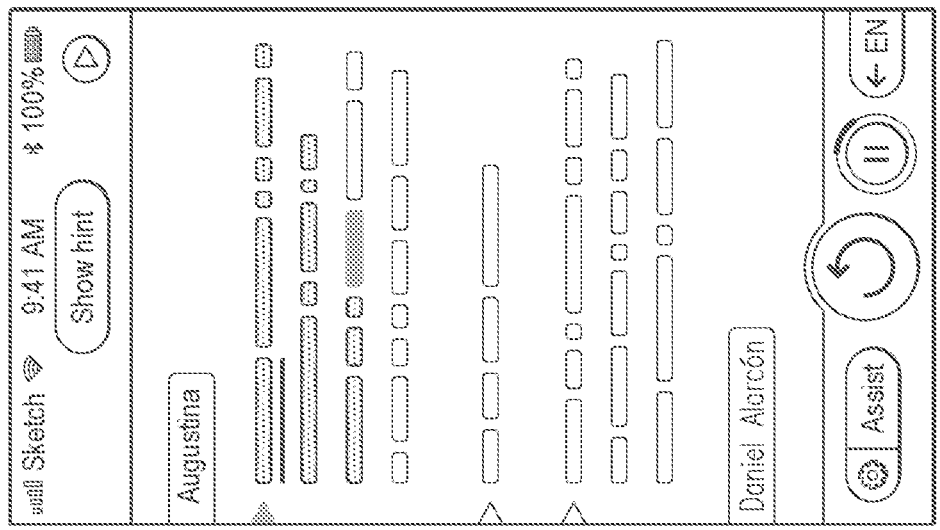
Figure 10D:
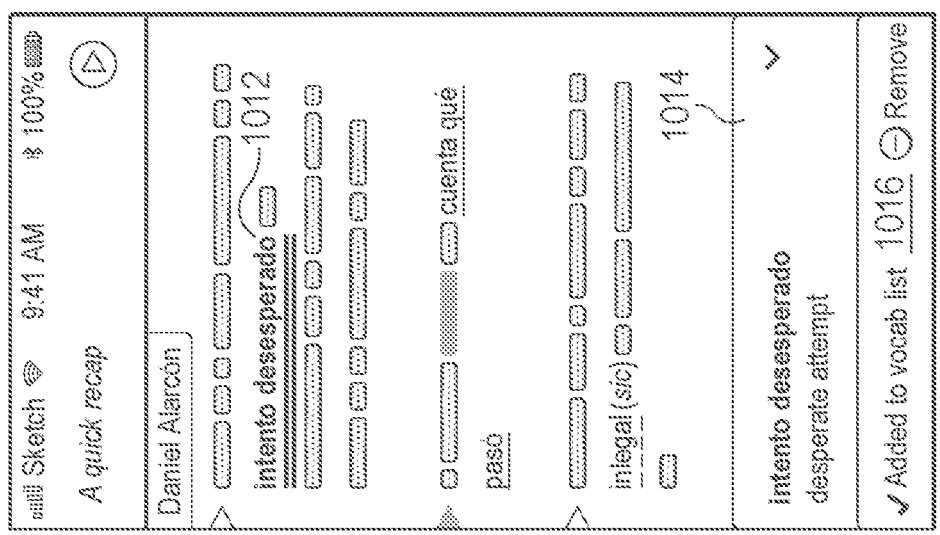

The interface of FIG. 10C shows two words 1012 (e.g., here "intent desesperado" in a particular differentiating color (e.g., green or another color)), indicating that this is vocabulary that the learner may not be familiar with. Information on this vocabulary may appear in the vocabulary panel 1014 at the bottom of the interface based on an interaction with this differentiated word group 1012. Since one objective of the Jiveworld system is to help increase the user's passive vocabulary, the interface (e.g., in panel 1014) may provide a way for users to add vocabulary to a study list, such as button 1016. Moreover, such help may be provided even in the case where a vocabulary word (or other type of word group) is redacted. FIG. 10D depicts one embodiment of an interface of displaying redacted vocabulary that a user would touch or click (e.g. once) to unredact, and a second time to view the definition in the slide-up panel.

Additionally, consistent with the approach to "serialized attention" interfaces of the Jiveworld system may pause the audio when displaying this extra information (e.g., as displayed in panels 1004, 1008, 1014, etc.) so the user can read them without worrying about missing the main spoken content.

FIGS. 10A, 10B and 10C also show another kind of inline assistance indicated by a dotted underline (or other type of differentiator such as highlighting in a certain color or different type of underline) under "cuenta qué pasó". This differentiator may be an indicator of what is referred to as a "tricky bit" word group type and is something that the interface allows a user to optionally decide to display as unredacted independent of the rest of the visually presented transcript (e.g., using an option in the "Assistance Preset" menu such as that displayed in FIG. 3A). The "tricky bits" word group type are groups of words that are spoken in a way that might be difficult for a non-native (or even a native) listener of the language to discern. For example, they might be mumbled, or heavily accented, or just spoken unusually fast in the auditory transcript. As such, the Jiveworld system may allow a user to decide to select (e.g., as part of the Assistance Preset menu as discussed), whether to show the word groups associated with vocab, notes, tricky bits or others as redacted or unredacted by default. In other embodiments, the tricky bit might have an attached language note which can be signified, for example, by a solid (rather than dotted) underline, which when tapped by the user may display the language note in a slide-up panel similar to 1004, 1008, 1014, etc.

Embodiments of the Jiveworld system may provide particular assistance in review and training in the target language. As discussed, a key element of training is repetition. The brain learns by recognizing patterns and so it needs to be stimulated with the same or similar signals without too much time elapsing. A lot of flashcard programs are now based on spaced repetition systems (SRSs) where the purpose is to try and make the brain recall something just at the point where it is about to forget it.

SRS works well for isolated data—e.g. vocab lists—but for a more complex piece, like a 100-250 second portion of audio listening, a different more effective technique may be employed by embodiments: listen once to study carefully, followed by a second review pass as reinforcement, while the content is relatively fresh in the user's mind.

It is expected by design, that the user will struggle somewhat in the first pass listening to a language they've not mastered, but the second pass of the same content will feel more like listening to a native language. Not only is this a pleasurable experience, like freewheeling down a hill that has just been cycled up, but the brain is listening in a different mode—a fluent mode where the meaning is coalescing naturally in real time.

Figure 11C:
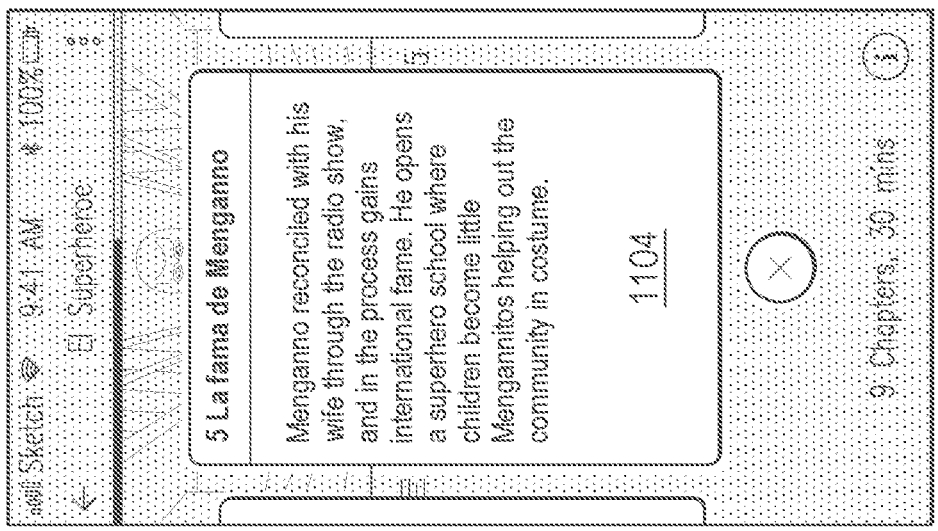
FIGS. 11A, 11B and 11O are depictions of interfaces that may be utilized by embodiments of a language learning system.
Figure 11B:
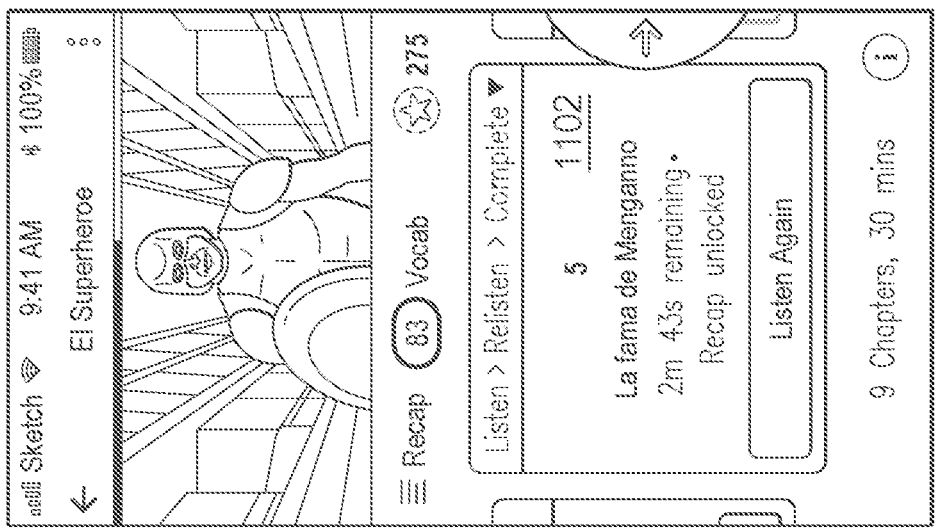
Figure 11A:
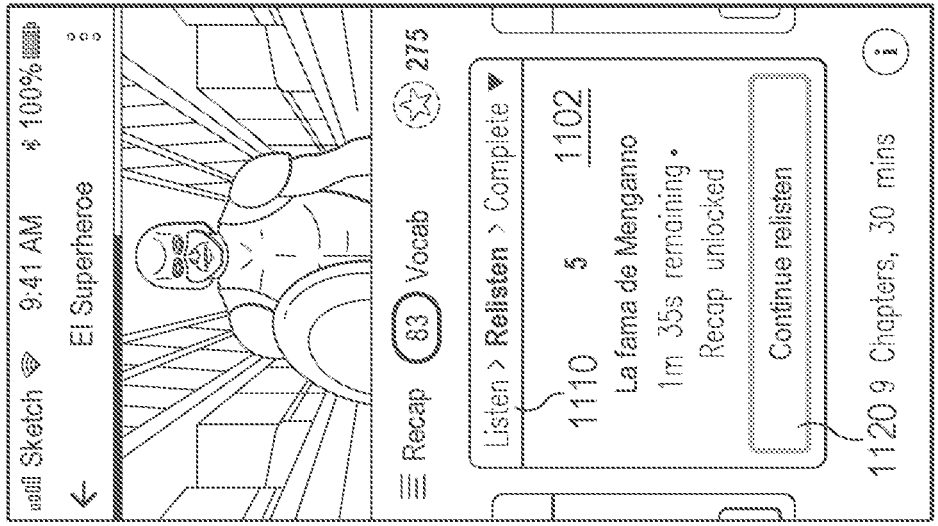

FIGS. 11A and 11B depicts embodiments of visual interface that may be utilized in such a review process. In this case, audio content (e.g., longer than a certain threshold length), which may be referred to as an episode, is broken up into multiple chapters of a desired time length (also referred to as a chapter) that are represented in a (e.g., horizontal) card carousel. In the example depicted in the interface, a card 1102 for chapter five is depicted. In embodiments of the Jiveworld system, when a user hits an action button (e.g., one of Listen or Relisten option on the menu 1110) a card may expand to occupy the full screen, becoming the player for the chapter including the corresponding visually presented transcript of the chapter of content, as shown in the FIGURES above. After the interaction with the chapter (e.g., the audio portion of the transcript has completed), the player shrinks down to become the chapter card again.

The "breadcrumb" at the top of the card—(e.g., the portion 1110 of the interface) that presents the "Listen-→Relisten→Complete" menu guides the user through each pass. By default the first "listen" pass will have assistance on (e.g., the Assist button will be activated as shown in FIG. 3C) in the player, and the second "relisten" pass will not. The (e.g., colored teal) button 1120 at the bottom of the card 1102 in FIG. 11A indicates that the chapter carousel card depicted is still the current chapter, and the user can see that next chapter card, whose edge is visible to the right of card 1102 is greyed out. The user can still indicate to progress to (e.g., swipe or other indication) the next chapter, but they are encouraged to complete both listening passes on the current card 1102.

When the second "relisten" pass is complete, as shown in FIG. 11B, the interface "activates" (e.g., it is no longer presented in grey and can accept interactions) the card corresponding to the next sequential chapter (e.g., the card to the right), however the user is still kept on the current card 1102 in case they want to listen to the chapter associated with that card 1102 for a third (or fourth etc.) time. This embodiment of an interface is an example of how the Jiveworld system can guide the user into a flow and habit that should improve their retention and progress while still giving them flexibility.

FIG. 11C shows another feature of embodiment of an interface, the "chapter summary" which can appear conceptually on the back of the chapter card 1102 and may be activated by interaction with the chapter card 1102 such that the chapter card "flips over" in the interface presenting the chapter summary 1104. This chapter summary 1104 is an editorial recap of the chapter on the corresponding chapter card 1102 which may be, by default, only enabled after the first complete listen of the chapter represented by the chapter card 1104. This acts like a safety net allowing the user to check their comprehension and revisit anything they missed or misunderstood. In other embodiments, instead of a chapter summary, the user may see a series of questions about the chapter content for the user to test their comprehension.

Figure 12A:
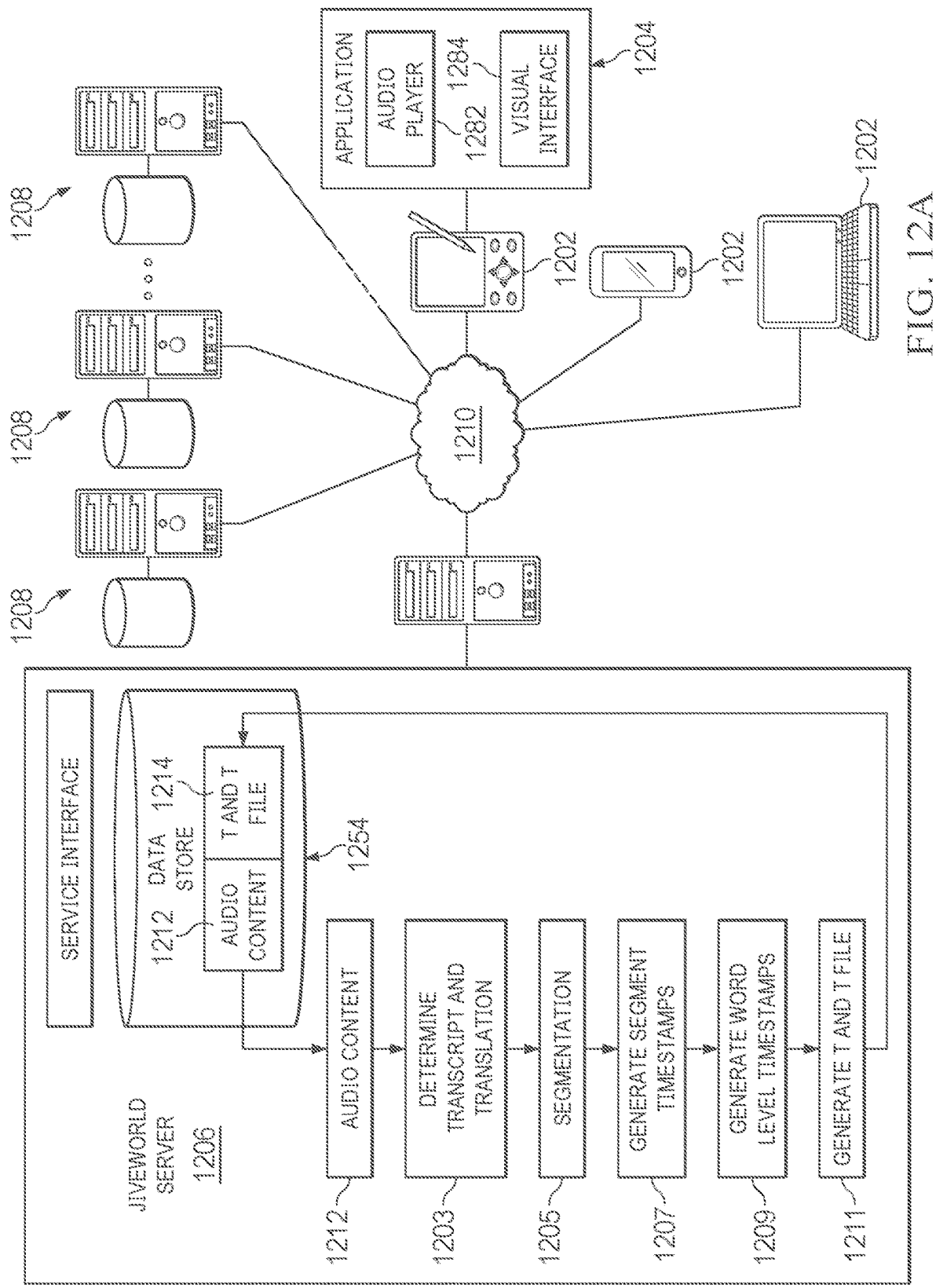
FIGS. 12A, 12B and 12C are block diagrams of embodiments of a language learning system.
Figure 12B:
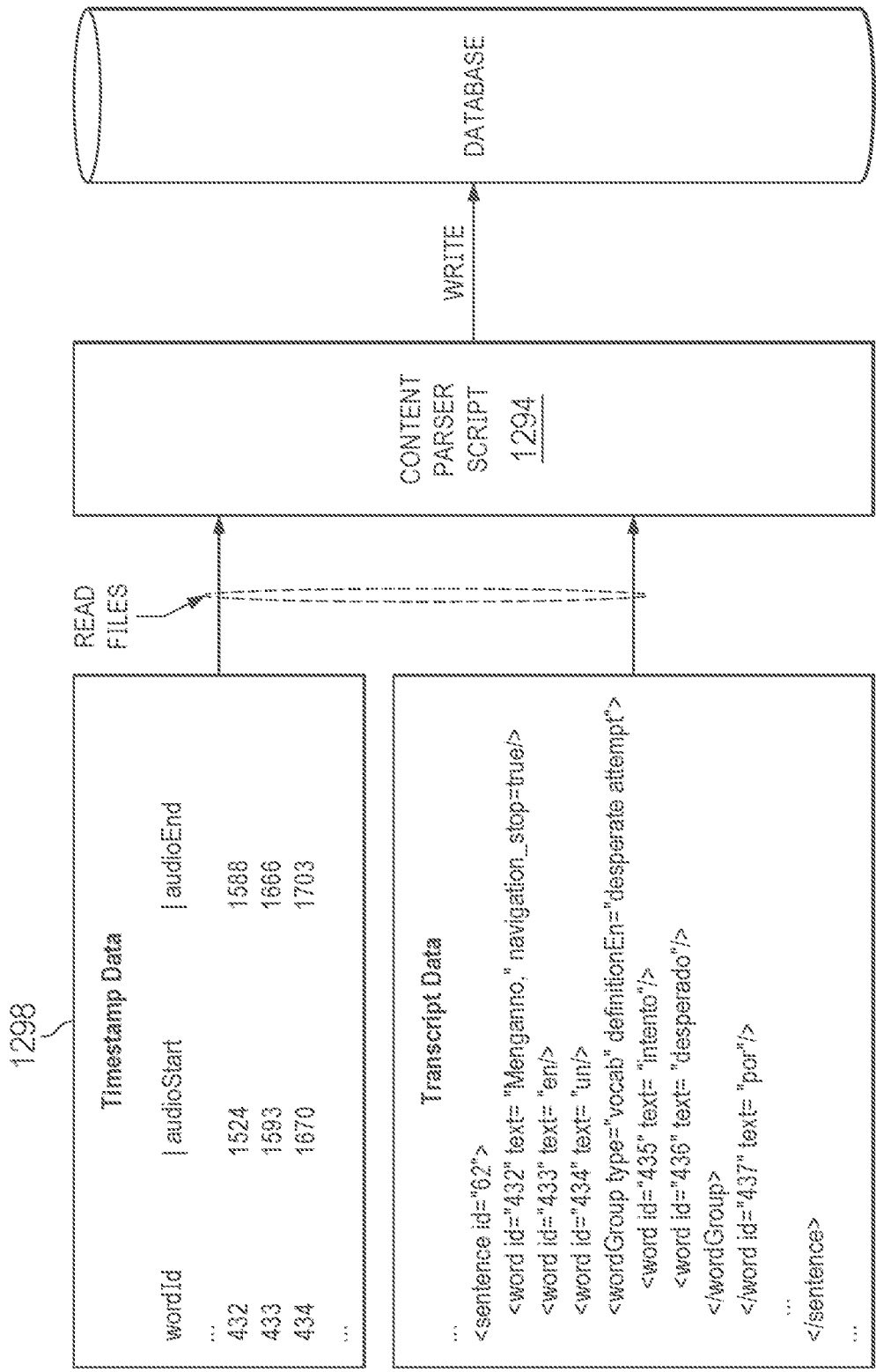
Figure 12C:
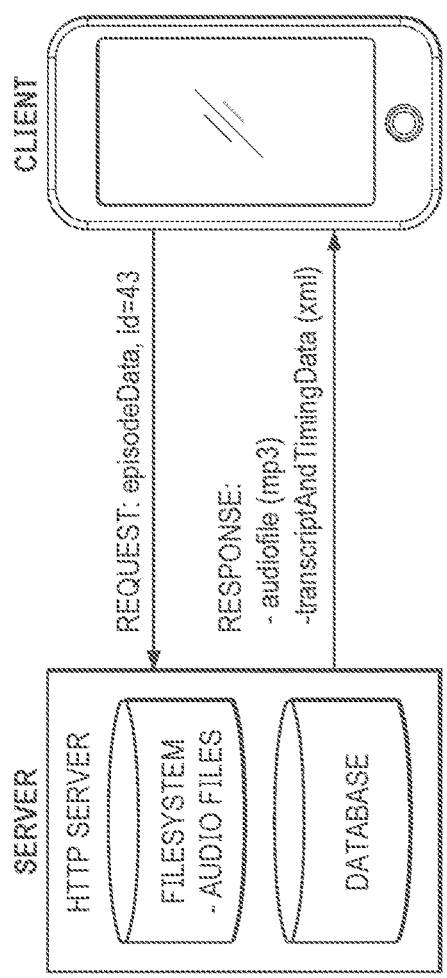

It may now be useful to delve into more detail about embodiments of implementations of the Jiveworld system. Referring then to FIGS. 12A, 12B and 12C, a depiction of embodiments of portions of an example implementation of the Jiveworld system are depicted. As shown in FIG. 12A, in one embodiment the Jiveworld system may include one or more client devices 1202 running an application 1204 (e.g., referred to sometimes as the client, client application or Jiveworld application) and communicatively coupled to a Jiveworld server 1206 although, in other embodiments the Jiveworld application 1204, may be run on the client device 1202 as a standalone system. In these embodiments, all the data can be precompiled into the application 1204.

The Jiveworld server 1206 can access or otherwise obtain audio content 1212 from one or more content sources 1208 over network 1210 (which may be the Internet, an internet, an intranet, a WAN, a LAN, a wireless or cellular network, or another type of communication network). Such audio content 1212 may also be manually accessed at the Jiveworld server 1206 off of a non-transitory computer readable medium including such audio content 1212. This audio content 1212 (e.g., an mp3 or the like) may be stored in a data store 1254 at the Jiveworld server 1206 and a corresponding structured data file (T&T file) 1214 for the audio content 1212 created at the Jiveworld server 1206. This structured data file 1214 may include the text, timing, and word groups, as well as the timestamp or duration for each word spoken in the corresponding audio content 1212, where each word (associated with a timestamp or duration) is indexed (e.g., by the timestamp) into an associated spot in the corresponding audio file 1212 where the word is spoken. This structured data file 1214 can be, for example, an eXtensible Markup Language (XML) or JavaScript Object Notation (JSON)) file, and may be referred to as the transcript and timing (or T&T) file.

FIG. 12B illustrates embodiments of two inputs that may be utilized to create the transcript and timing file 1214. The timestamp data 1298 may designate the beginning and end of segments or time sequences of corresponding audio content in the audio file 1212. A segment may be a short portion of the audio content of the audio file 1212—typically 2-4 seconds of audio—that is spoken in a fairly consistent speed. A segment is sometimes a full sentence, but is often just part of a sentence, and occasionally a single word. By finding the start and end of each segment, it is possible for the Jiveworld system to display the transcript word-by-word as the user hears it. This is because once the start and end time of a segment is determined, an approximation can be made by the Jiveworld system of the start and end timestamp of each word by analyzing its length (letters, vowels, syllables) compared to the other words in the segment. The words can be weighted accordingly (e.g., using linear interpolation or the like). This timestamping of each word is stored in the timestamp data 1298.

This timestamp data 1298 may be an export option of many audio editing tools (such as Audacity or Hindenburg Pro) which allow named labels associated with time sequences or segments to be created in an audio source file. Timestamping can also be done automatically by speech recognition processing services like Google Cloud Speech-to-Text service (e.g., or another algorithm or service). The output of such an editing tool or service may be a plain text file (typically comma or tab separated) which lists the label name with the start and end point in milliseconds in the audio track.

The timestamp data 1298 (including the data on the segments) may be used to implement another type of assistance for the learner (e.g., by augmenting or altering the timestamp data). This is referred to in the Jiveworld system as audio kerning. "Kerning" is a term used in typesetting, referring to the horizontal space between one letter and the next in a word. 'Tight' kerning means that the letters are more squashed together; 'Loose' kerning stretches them further apart.

Embodiments of the Jiveworld system may thus implement audio kerning by artificially increasing the natural pauses between sentences or sentence segments—(e.g., by programmatically stopping and starting the audio player) to help give the listener more thinking time to parse the sentences. This audio kerning may be independent of any "audio time stretching" (which will slow everything down without changing pitch). The Jiveworld system can, for example, add a 500 ms pause after each segment (e.g., in the timestamp data), or adjust the gap so that it is never less than 1000 ms. This audio kerning may be particularly helpful when listening to long sentences with more complex structures, where it is easy for a user to lose their place as a non-native listener. Since audio kerning does not change the speed of individual words on the track, the user may still be listening to the natural sound of the language.

Once the timestamp data 1298 is created, the timestamp data 1298 can then be combined with transcript data 1296 (e.g., and translation data, and other data) for the corresponding audio file 1212 to produce a separate file (e.g., which may also be a text file). This file can be created by compiling the transcript of the audio content into a structured text file which organizes the transcript of the audio content into a hierarchy of, for example, passages, paragraphs, sentences, and words. Identifiers of each type of word groups (vocab, tricky bits etc. mentioned above) associated with a particular word or set of words may also be identified in the transcript data 1296.

As one example, this structured data may be encoded as XML in the following way:

```
<sentence id="62">
    <word id="432" text= "Menganno," navigation_stop=true/>
    <word id="433" text= "en"/>
    <word id="434" text= "un"/>
    <wordGroup type="vocab" definitionEn="desperate attempt">
        <word id="435" text= "intento"/>
        <word id="436" text= "desperado"/>
    </wordGroup>
    <word id="437" text= "por"/>
    ...
</sentence>
```

In this example the two words "intento" and "desperado" (in Spanish) are selected as vocab with the translation "desperate attempt" in English. Parsing these two files and combining the timing data with the semantic data can be achieved with a script or other set of instructions 1294 (e.g., referred to as the "content parser script") written in a language like Ruby or Python or another programming language. The resulting T&T file 1214 can then be written into the data store 1254 of the Jiveworld server 1206 in association with the corresponding audio content 1212.

It may be useful now to describe one particular embodiment of the creation of a T&T file 1214 in more detail. With reference to FIG. 12A, once the audio content 1212 is obtained, the Jiveworld server 1206 can determine a corresponding transcript for the audio content 1212 (e.g., the words in the target language being spoken in the audio content 1212) and a corresponding translation for the audio content 1212 (e.g., a translation of the audio content in one or more native language of potential users of the Jiveworld system) (STEP 1203).

The obtained transcript may be edited into a "verbatim" or annotated transcript where pauses, half word, hesitations, stutters or other spoken language artifacts or utterance are annotated within the transcript. The transcript may also be annotated with a note of the speaker of each portion (e.g., sentence, paragraph or other syntactically or semantically meaningful portion) of the transcript. For example, the audio content 1212 may be an interview or a radio play or the like.

In such instances, the speaker or character, etc. speaking each portion of the transcript in the corresponding audio content 1212 may be noted in the transcript. These annotations may be done, for example, using a specialized markup language intended for such annotations.

This verbatim transcript can then be broken up into segments in "segmentation" process (STEP 1205). Segmentation means breaking up the verbatim transcript into portions such as those defined by free flowing runs of words (e.g., that may be spoken at an even pace). Each segment may be a run of words without a pause of a quarter of second or more in the audio content 1212 and may be based on annotations in verbatim transcript. As discussed, these segments may be a short portion of the audio content of the audio file 1212—typically 2-4 seconds of audio—that is spoken in the audio content 1212 in a fairly consistent speed. A segment is sometimes a full sentence, but may be just part of a sentence, and occasionally a single word. Each segment is thus identified with an identifier while each word of the segment may also be assigned an identifier. In one embodiment, each type of word group of interest may also be identified. Each of the word groups identified may be assigned an identifier associated with the specific type of word group (e.g., identifiers for "vocab", "incorrect usage", "tricky bits" or "annotations").

Additionally, the Jiveworld server can structure the content into chapters (e.g., and chapters into passages) and associate names with the chapters. The term chapter as used herein will refer to portions of the content being presented (e.g., and not chapters as are traditionally used when referring to printed or audio materials such as books or the like). This content (e.g., both the audio and the corresponding transcript or translation) may be portioned into digestible chapters (e.g., around 2-4 minutes of audio content or change in subject). While certain embodiments may not portion the content into chapters, in some embodiments it is desirable to portion the content into chapters to discretize the content so that a user can have a digestible amount of content. It has been found that the use of naturally spoken content, (e.g., interviews, radio programs, plays or other dramas with characters reading parts, etc.) is desirable for learning a spoken language (e.g., as opposed to audio books or the like) as listening to such naturally spoken language may aid a learner in actually learning to understand that language as spoken. Much of this naturally spoken content may thus not have natural divisions. Accordingly, in some embodiments, this content is portioned into chapters to allow a user to focus on each chapter in a discrete manner.

Each of the segments in the verbatim transcript may be then be associated with a "start of segment timestamp" that denotes the start time of that segment (e.g., relative to the beginning of the audio content 1212) and an "end of segment timestamp" that denotes an end time of that segment in the corresponding audio content 1212 (e.g., relative to the beginning of the audio content 1212) (STEP 1207). These segment timestamps may be stored in a timestamp data file and indexed according to the identifiers of their corresponding segment in the verbatim transcript.

Figure 12D:
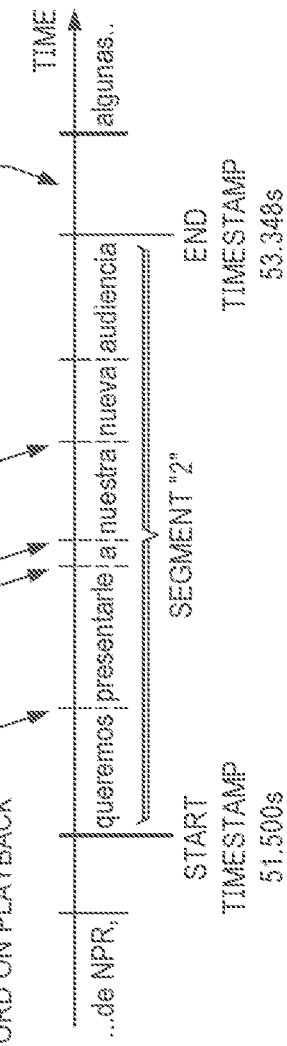
FIG. 12D is a diagram depicting one embodiment of a segmentation process.

Based on the timestamps assigned to the start and end of each segment, the timestamps for each word within each segment can then be determined (STEP 1209) and stored in the timestamp data file along with identifiers in the transcripts for each of those words. Word level timestamps for each word of each segment can then be determined based on the start of segment timestamp and the end of segment timestamp for a segment. These word level timestamps may include the start time and the end time of each word within the segment (e.g., and thus within the transcript). These word level timestamps include, for example, a timestamp denoting the start of each word (e.g., relative to the audio file 1212) and, in some embodiments, a timestamp denoting the end of the word. FIG. 12D depicts a representation of one embodiment of the segmentation and timestamping process.

In one embodiment, the determination of the start time and the end time of each word within the segment may be extrapolated using linear interpolation based on the start of segment timestamp and the end of segment timestamp for the segment and the length of each word within the segment (e.g., each word within the segment is given a relative weight based on the length of the word, and, in some embodiments, the number or total length of words within the segment or other criteria). This relative weight can be used to apportion the time between the start of segment timestamp and the end of segment timestamp for the segment to each word. These word level timestamps may be stored in a timestamp data file and indexed according to the identifiers of their corresponding words of the segment in the verbatim transcript. This word level granularity of timestamps serves to facilitate the synchronization of the presentation of the audio content and the corresponding visual presentation of content.

Once the segments and word level timestamps and the identification of word groups within each segment and other metadata have been determined, this transcript data and timestamp data may be merged along with the translation of the content into the T&T file 1214 (STEP 1211).

Figures 12E, 12F:
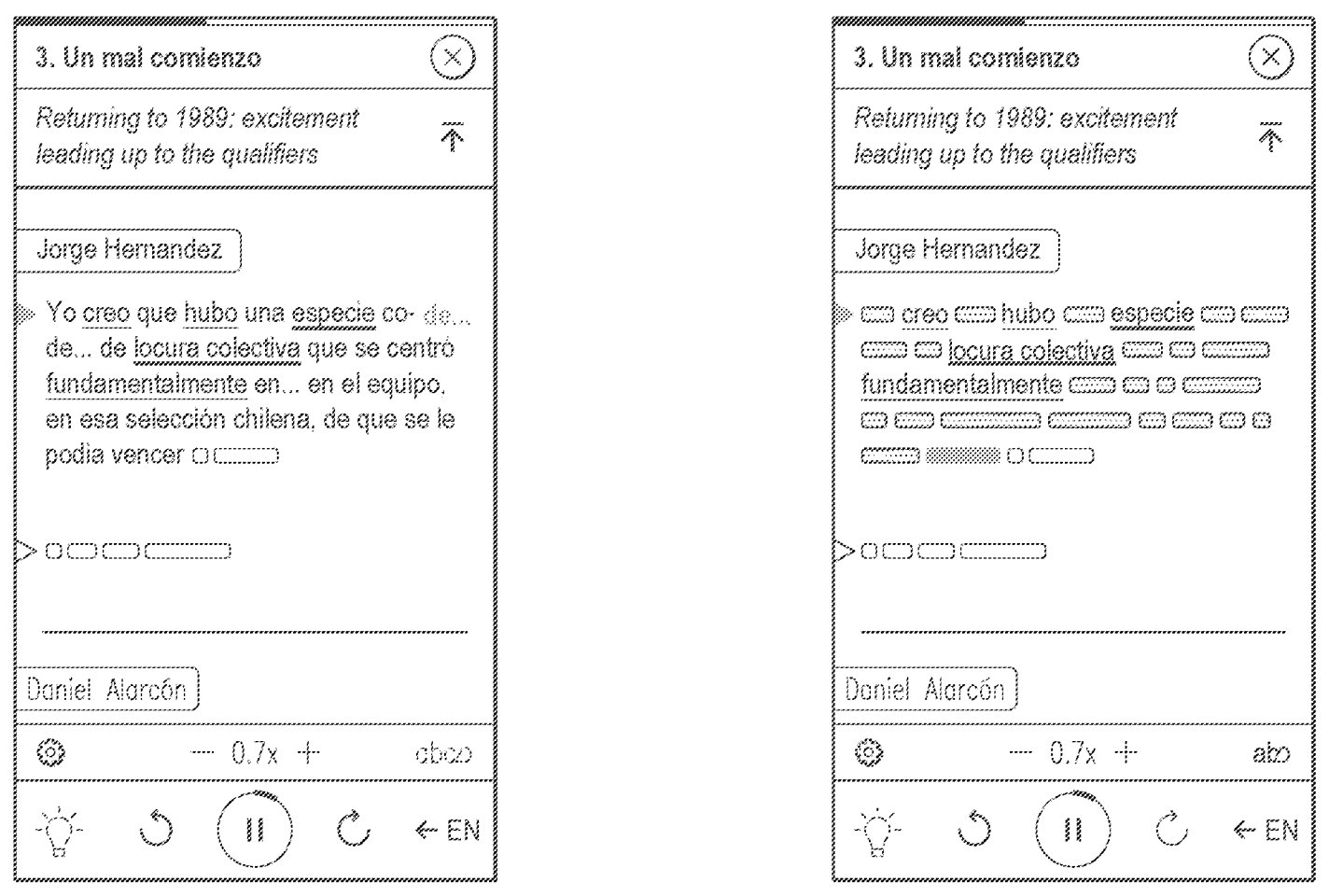

It may be useful at this point to depict an example of the generation of the T&T file for an audio file. Looking then at FIGS. 12E and 12F, embodiments of an interface for the Jiveworld application that present an unredacted transcript of a portion of audio content (FIG. 12E) and a corresponding partially redacted portion of the same audio content (FIG. 12F) are depicted.

An example annotated transcript for this audio content may be as follows:
Un mal comienzo
>A Bad Start
Returning to 1989: excitement leading up to the qualifiers
@Daniel Alarcón
[99] Volvamos a las eliminatorias.
>Let's get back to the qualifying rounds.
[100]La <expectativa=expectation>era gigante.
>The expectation was enormous.
@Jorge Hevia
[101] Yo <-creo>que+
[101.1]<-hubo> una <especie=kind, type> co—de . . . de . . . de <locura colectiva=shared madness>
[101.2] que se centró <~fundamentalmente> en . . . en el equipo, en esa selección chilena,
[101.3] de que se le podia vencer a Brasil.
>I think there was a kind li— of . . . of . . . of shared madness that fundamentally centered on . . . on the team, the Chilean National Team that could defeat Brazil.
[102] Y eso era historia.
>And that would be historic.

While the corresponding timestamp data for this annotated transcript may be as follows, where the three columns are the: segmentStartTimestamp: milliseconds, the segmentEndTimestamp: milliseconds and the segmentLabel: String, where the segmentLabel corresponds to the label in the square brackets in the annotated transcript:

443.929 445.355 99
445.429 446.716 100
447.094 447.977 101
448.575 450.884 101.1
451.307 454.389 101.2
454.757 456.339 101.3
456.900 457.553 102

The T&T file for the associated audio file that results for the merging of these files is depicted in the Appendix A below.

Referring to FIGS. 12A and 12C, one embodiment of the requesting and obtaining audio content and the associated T&T file for the audio content is depicted. Here, the client application 1204 on the client device 1202 may request a particular piece of content or chapter thereof from an interface (e.g., a service interface) of the Jiveworld server 1206 and store this content at the device 1202. Again, there may be two files that may be obtained from the Jiveworld server 1206 by the client application 1204, an audio file 1212 (e.g., mp3 or the like) of the content that will be auditorily presented and a T&T file 1214 including structured data file including transcript and timing data comprising the text, timing, and word groups of the audio content, as well as the timestamp and duration for each word that is index (e.g., by time) into an associated spot in the corresponding audio file.

At the client side application 1204, parsing the structured transcript and timing data and generating the text layout in the interface of the application 1204 may be done using a standard depth-first tree iterator. The styling of visual components may be altered during playback or otherwise through dynamic properties, so for example changing the color of a word element in the layout when the audio player is at a point that corresponds to its start time and duration in the timing data is straightforward.

Whether a particular type or instance of a word group is shown as text or redacted can be controlled dynamically by client state in the client application representing the settings chosen by the user (see, e.g., FIG. 3A above), whether the user has activated the assistant button, or by recording user taps/clicks on the word groups on the touch display.

The "rewind state" behavior described above (e.g., as illustrated with respect to FIGS. 4A, 4B and 4C) may utilize two 'cursors' to track listening state in the content, a current listening cursor (also referred to as just the "cursor") and a "furthest played element" cursor.

In one embodiment, both of these cursor variables store a reference to a word in the transcript (for example the identifier for the word element such as an "address"). These two cursors will be the same, except when the user has rewound. When the current listening position has caught up again to where the user was before rewinding then the two cursors will continue to be the same until the next time the user rewinds or jumps back. Therefore embodiments of the Jiveworld client application 1204 can compare these two cursors to figure out whether the user is in a rewind state or not, and to modify the user interface exposed accordingly.

With reference back to FIG. 12A, it will be helpful here to discuss embodiments of the implementation of the client application 1204 in more detail. The client application 1204 may include a visual interface 1284 adapted to present the visual display of the content in the visual interface 1284 as discussed, and an audio player 1282 for presenting the corresponding audio content. This audio player 1282 may, for example, be an audio player of the device 1202 on which the application 1204 is executing, or which may be in communication with such a native audio player application or library. The visual interface 1284 and visual display may be dynamically generated such that it is synchronized with the audio content being played in the audio player 1282.

When the application 1204 receives an audio file 1212 and a corresponding T&T file 1214, the application 1204 reads the T&T file 1214 and instantiates an object for each element (a.k.a. an entity) (e.g., passage, paragraph, sentence, word group, word, etc.) defined in the T&T file 1214. Each object for each element is thus an instantiated object that is scoped with the metadata defined for that element as defined for that element in the T&T file (e.g., the object for the element is instantiated with all metadata for variables for the element as described in the T&T file 1214). Each object of each element type includes methods that define how that element type is to be rendered based on the local data of the object and the global state maintained by the application 1204. An element (e.g., a visually rendered component of the interface) may thus be rendered by the corresponding object that reacts to a global state maintained by the application 1204.

Figure 13:
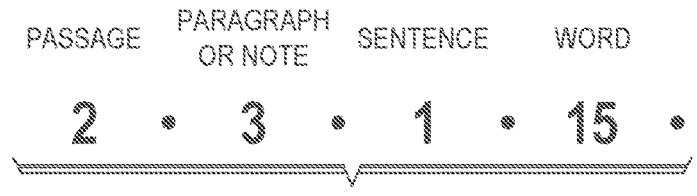
FIGS. 13 and 14 are diagrams depicting the use of an address for elements.

In particular, each element may be assigned an "address" that captures both the linear order of those elements and the hierarchical structure of containing elements outside. A "word" element, for example, may be contained in a "word group" element, which in turn may be contained in a "sentence" element, which in turn may be contained in a "paragraph" element, which itself may be contained in a "passage" element. The address may include a component for each element in the hierarchy of elements. An embodiment of this is illustrated in FIG. 13, which is described in more detail below.

The application 1204 can maintain a global state of a cursor synchronized, or otherwise set, based on the playback of the audio content in the audio player 1282. This cursor may hold the value of an address of the transcript element corresponding to the section of audio currently being played back in the audio player 1282. Specifically, the client application 1204 may monitor the time of the current play position in the audio file by the audio player 1282, and based on that play position (expressed in time units) can determine the visual transcript element at that particular time (e.g., based on the timestamps for each word or segment of the transcript), and determine the address of that element, and set the current cursor address to the address of that element, and broadcast the updated cursor address for consumption by each object for each element. The client application 1204 may also monitor user interaction with the presented visual depiction such that the cursor and audio player play position can be set based on the user's interaction with the visual transcript (e.g., as depicted in FIG. 4D if the user taps a play button 428 for a specific sentence, the cursor may be set to the address of the first word of that sentence).

The corresponding object for each element has methods that are adapted to render that object based on the state of the cursor, as well as other states in the application (e.g., assistance settings). The objects for elements that are rendered are thus registered with client application 1204 to listen to whether the cursor has changed and then make a determination if it should change its state based on the cursor.

Thus, the object for each element of each element type (e.g., passage, paragraph, sentence, word group, word, etc.) may get a notification or the like when the cursor changes and can render itself (e.g., show, hide, redact, change color, underline, display associated hint, etc.) based on the state of the cursor (e.g., the address associated the cursor) and any data specific to that object for the element or any other local or global state. For example, for a particular object for an element, if the address held by the cursor corresponds to the address of that element the element may render itself in a particular manner (e.g., highlighted or unredacted) while if the address does not correspond to the element the element may render itself in a second way (e.g., greyed out or redacted). For example, the object for the element can determine if the cursor (e.g., address) is before the element of the object or after the element of the object and render itself differently according to that definition.

As an example of another global state variable that may be maintained by client application 1204 and which may influence the rendering of an element by objects for those elements, is a "furthest played element" which may hold the address of the furthest element that a user has visited during a current listen-through of the audio presentation of the content. In other words, the cursor and the furthest played element may differ when the user had rewound or jumped back in the content being presented. Thus, each object for each element may utilize these states to determine whether the associate element is currently the same address as the address held by the cursor (e.g., is it "under" cursor) or if that element has been previously visited. Rendering of the element by the object in the visual presentation can thus depend on those determinations. There are other states maintained by client application 1204 that may be used to render an element by an object without loss of generality.

Embodiments of the implementation of the client application 1204 will now be discussed in more detail. In one embodiment, the fundamental playable unit of content is the Chapter—a discrete section (e.g., several minutes) of an audio track, interspersed with notes and hints that may not be part of the audio. If a piece of content is longer than a few minutes it may be broken up into chapters, as discussed.

The flow control within an episode may be relatively simple. A user may be encouraged to review each Chapter in sequential order (and repeat Chapters) until the user is comfortable with the Chapter, and then proceed to the next Chapter (e.g., which can be accessed randomly via a chapter menu). As it is desired that the user be focused on only one thing at a time, the interface of the client application 1204 is adapted such that, as much as possible the user should not be listening to something in the presentation of the audio content that is different than what is being read or seen in the visual presentation of the content.

This means that when the application presents certain content that is not in the audio file (e.g., chapter notes, passage hints, etc.) to the user (e.g., for the first time) the audio playback may be paused in the audio player 1282. The audio playback may also be paused if a user interacts with the visual presentation in a particular manner (e.g., tapping on an underlined word to view a definition or note). Thus, while a user may be interacting with a chapter (e.g., as represented by an isChapterPlaying variable in the global state of the client application 1204) this may not be the same thing as whether the audio content for that chapter is being played by the audio player 1282 (e.g., as represented by an isAudioPlaying variable in the global state of the client application 1204).

Figure 15:
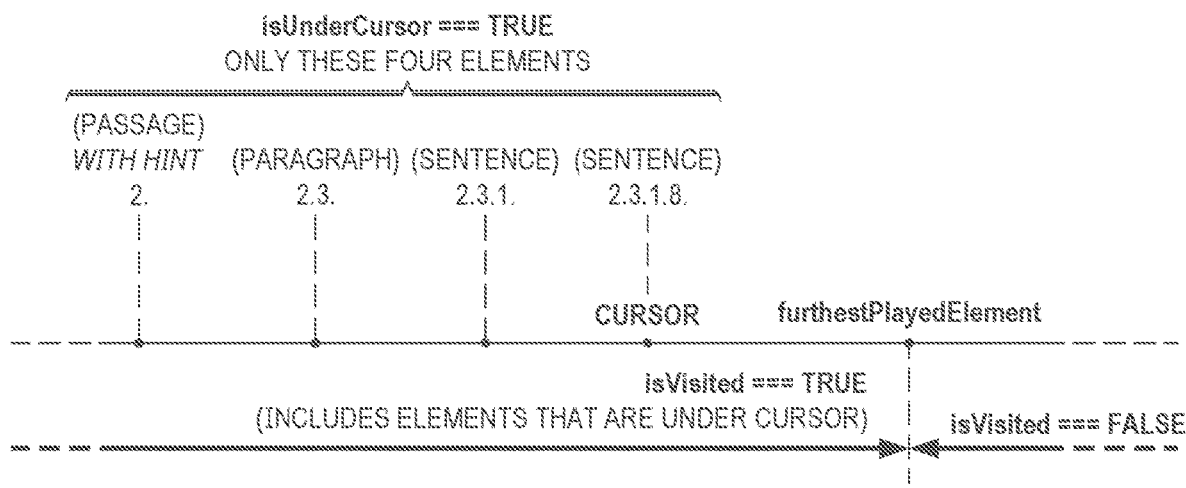
FIG. 15 is a diagram depicting the use of a cursor.

Looking at FIG. 15, the visual elements that are visually revealed in the interface (sometimes referred to as visual elements or script elements) may have both linear order, and compositional structure. For example:

Compositional Structure: Passages>Paragraphs>Sentences>Words

Linear Order: passage hint→passage note→sentence highlight→word 1→word 2 etc.

Each of these elements may be given an address in a format that captures both ordinality and compositional structure as depicted in the FIG. 15. In one embodiment, an address for an element can have up to four elements. Indexes are zero based which makes for simple lookup of an element in the nested array or tree structure: Element with address "2.0.1.0"⇒elements[2][0][1][0]. In some embodiments there may be a separator (e.g., a period) between each index of the address, including a trailing separator that may be useful for the comparisons of addresses.

Such addresses may be understood with reference to the examples given below in relative sequence order:

| Address | Type | Meaning |
|---|---|---|
| 0. | StartOfChapter | Special fixed address for before content starts playing |
| 1.0. | Note | 1st Passage, 1st Chapter Note |
| 1.1. | Note | 1st Passage, 2nd Chapter Note |
| 1.3.1. | Sentence | 1st Paragraph, 1st Sentence-before the first Passage Hint |
| 2. | PassageHint | 2nd Passage Hint |
| 2.1. | Note | 2nd Passage, 2nd Note |
| 2.2. | Paragraph (speaker) | 2nd Passage, 1st Paragraph |
| 2.2.1. | Sentence | 2nd Passage, 1st Paragraph, 2nd Sentence |
| 2.2.1.14. | Word | 2nd Passage, 1st Paragraph, 2nd Sentence, 15th Word |
| 999. | FinishOfChapter | Special fixed address for after the last element in Chapter |

Figure 14:
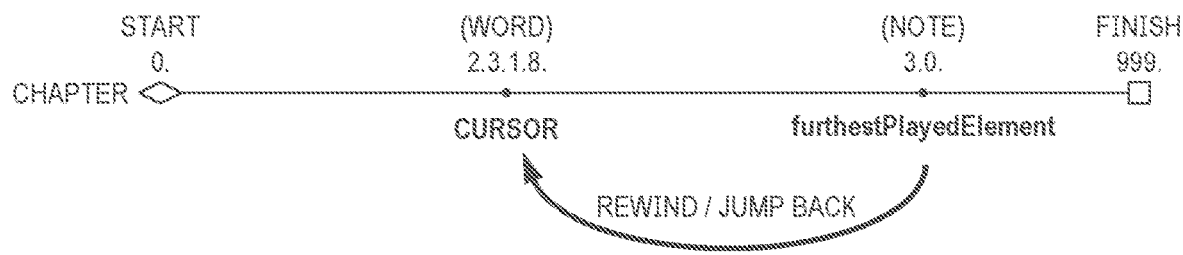

There are thus at least two key values or variables in the global state of the client application 1204 that point to an address: 1) a (current) cursor—the address of the element that the user is currently focused on (e.g., in the audio presentation of the content through the audio player 1282) and 2) a furthestPlayedElement cursor—the address of the furthest element that the user has visited in their current listen-through the current chapter. In some embodiments, the cursor and the furthestPlayedElement point to different addresses only when the user has rewound or jumped back in the chapter. When the user re-listens to a chapter, both the cursor and the furthestPlayedElement are reset. FIG. 14 depicts an illustration of these two variables in the context of a timeline for a chapter.

Thus, an important invariant of the fact that the cursor and furthestPlayedElement point to different addresses in cases where a user has rewound or otherwise moved the cursor manually is that according to embodiment, in the client application the cursor≤futhestPlayedElement. Thus each element (e.g., object instantiated for an element) can calculate two Boolean states that may be used in the determination of how that element is rendered visually in the visual presentation: isUnderCursor=f (address of the element, address of the cursor) and isVisited=f (address of that element, furthestPlayedElement). The use of these variable to determine whether an element has been visited by a user is depicted in FIG. 15

An example JavaScript for the underlying logic for element addresses and the calculation of these Boolean values by each element is:

```
// valid values: 1. 0.2. 1.25.3. 1.2.3.44.
// invalid values: 1.2.3 (no trailing period), 1.2.3.4.5.
const addressRE = /^(\d+\.){1,4}$/;
class Address {
    constructor (address) {
        if (!addressRE.test(address)) {
            throw new Error("Malformed address");
        }
        this._address = address;
        this._elements =
            address.split('.', 4).map( x => parseInt(x, 10));
    }
    equals (that) {
        return this._address === that._address;
    }
    isChildOf (that) {
        return !this.equals(that)
            && this._address.startsWith(that._address);
    }
    isBefore (that) {
        let maxIndex = Math.min(
            this._elements.length,
            that._elements.length);
        for (var i=0; i<maxIndex; i++) {
            let diff = this._elements[i] - that._elements[i];
            if (diff < 0) return true;
            if (diff > 0) return false;
        }
        return that.isChildOf(this);
    }
}
class ScriptElement {
    ...
    isUnderCursor (address = this.address) {
        return cursor.equals(address)
            || cursor.isChildOf(address));
    }
    is Visited ( ) {
        return this.address.isBefore(furthestPlayedElement);
    }
    ...
}
```

Figure 16:
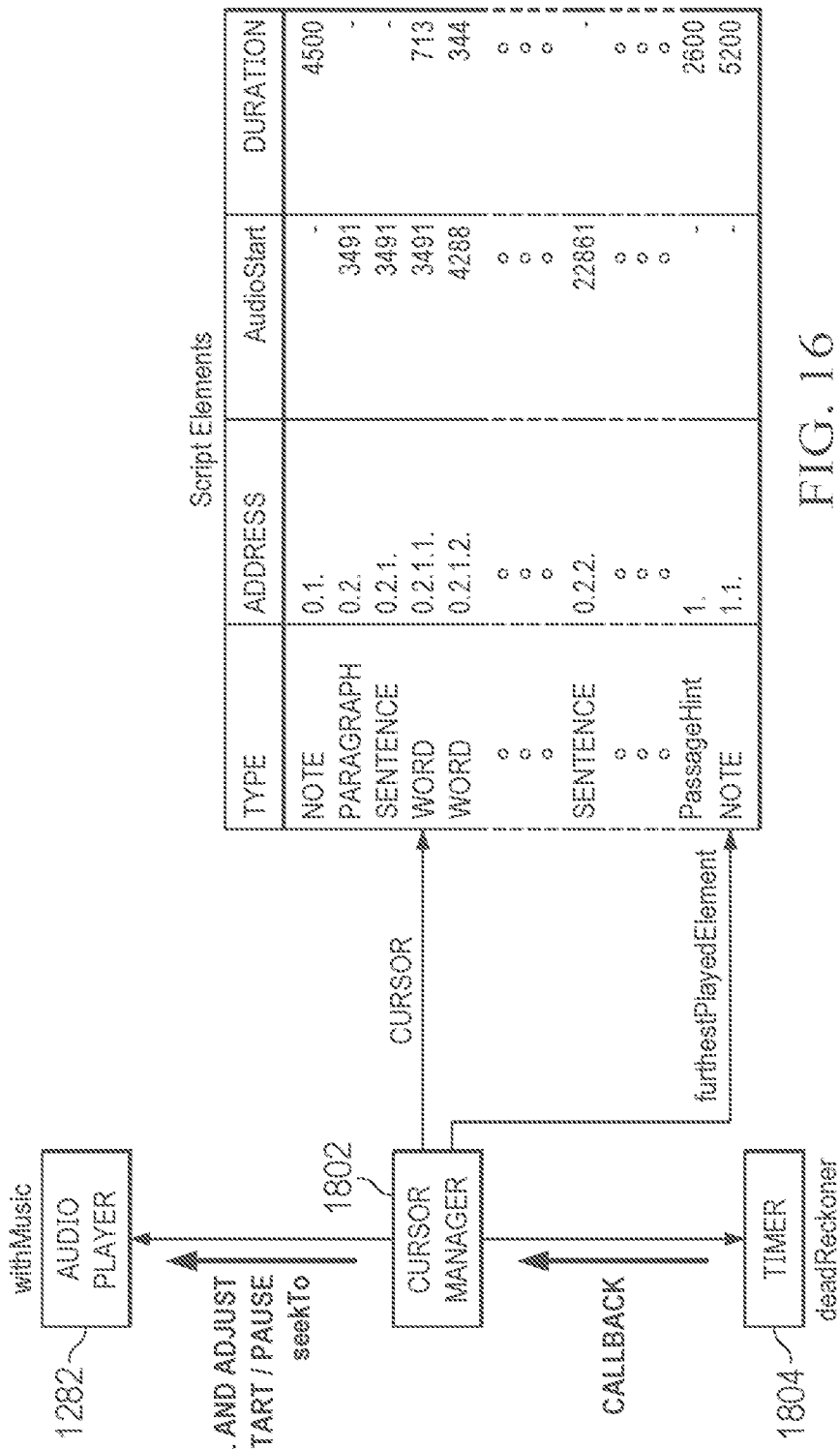
FIG. 16 is a block diagram illustrating an architecture for a cursor manager.

A cursor manager of the client application 1204 may thus be responsible for maintaining the current cursor, the furthest played element and other global state variables for use by the objects for each element such that the visual interface may be effectively rendered. Moving now to FIG. 16, a block diagram of one embodiment of a cursor manager 1802 is depicted. The cursor manager 1802 may utilize abstract addresses that reflect both order and structure of the elements and determine variables based on the current address to drive the presentation of the elements by the objects associated with those elements. In other embodiments, the cursor manager 1802 may use the audio player's 1282 current time as the canonical time that these "time aware elements" (e.g., object that change their display state based on time or a position of the cursor) are keyed off for some of their behavior.

Accordingly, in certain embodiments, script elements (e.g., words, sentences, paragraphs, passage hints, notes, etc.) may derive their visual behavior from two (e.g., Boolean) values that may be determined by their respective objects from values determined by the cursor manager 1802: 1) isUnderCursor—calculated by comparing the address of the element to the address of the cursor and 2) isVisited—calculated by comparing the address of the element to the address of the address in furthestPlayedElement.

The cursor manager 1802 may thus set the global state for cursor and furthestPlayedElement and manage an internal timer 1804 (deadReckoner) to move the cursor at the right time by intermittently polling the audio player 1282 to adjust the deadReckoner timer 1804 so that presentation of words in the visual depiction of the content are correctly synchronized with the presentation of the audio in the audio player 1282. The cursor manager 1802 may also pause/play the audio player 1282 according to what type of script element is currently under the cursor and manage the rewind logic (e.g., by adjusting the cursor and furthestPlayedElement variables).

Specifically, according to certain embodiments, the cursor manager 1802 may determine when to increment cursor and furthestPlayedElement while isChapterPlaying is true based on the deadReckoner timer 1804; handle the rewind/jump logic so set the correct values of cursor and furthestPlayedElement are adjusted when a user interacts with the visual presentation; and control the current audio player 1802 (e.g., calling play( ), pause( ), seekTo( ), setTimeStretch( ) of the audio player 1802).

The cursor manager 1802 uses a deadReckoner timer 1804 to decide when to increment the cursor. In one embodiment, the logic for setting the timer may be as follows:

```
handler ( ) {
    if (!isChapterPlaying) { // user has paused the StudyView
        return;
    }
    cursor.increment( ); // next ScriptElement with duration > 0
    let element = cursor.element;
    let duration = element.duration;
    switch (element.type) {
        // handle non-audio elements
        case 'Passage':
        case 'Note':
            if (isAudioPlaying) {
                audioPlayer.pause( );
            }
            break;
        // all other elements are audio elements
        default:
            let start = element.audioStart;
            if (!isAudioPlaying) {
                audioPlayer.seekTo(start);
                audioPlayer.play( );
            }
            else {
                // check the actual time of the audioPlayer
                // against what it should be (i.e start)
                adjustment = start - audioPlayer.currentTime;
                duration += adjustment;
            }
            // need to take into account time stretching
            duration = duration / audioPlayer.timeStretchFactor
            break;
    } // end switch
    deadReckoner.setInterval(this.handler, duration);
}
```

Objects for script elements (e.g., words, sentences, paragraphs, passage hints, notes, etc.) may also share or maintain properties related to time, including:

duration (e.g., in milliseconds)—how long the corresponding element for the object should be highlighted. Some elements may not have duration (e.g., sentence, paragraph—since their duration is implied by the current word or words making up the element combined with isUnderCursor logic above).

duration may be used for the determination of the dead reckoner timer 1802 while isChapterPlaying is true as detailed above.

audioStart (e.g., in milliseconds)—timestamp in the audio content where the corresponding element starts (e.g., this may be maintained only for the elements that are in the audio content).

audioStart may be used for: calling seekTo( ) on the audio player to move its playing position on rewind/jump; adjusting the deadReckoner timer 1804 by comparing the actual audio player time with the deadReckoner timer 1804.

It may now be useful to describe how selective redaction of words of the transcript is accomplished in particular embodiments. The following JavaScript-like pseudocode thus illustrates how the logic for selective redaction of words in the transcript may operate according to one embodiment. In this case a word object (e.g., element) decides whether to render itself as redacted (e.g., a lozenge should be rendered) or unredacted (the text or the word should be rendered) by observing various states in the client application.

Take, for example, a word that is part of a vocabulary word group G. As an example, assume that this word has been visited by the cursor (played in the audio) and is therefore eligible to be unredacted. Then, according to the example code, the word would display unredacted if (e.g., in some cases and only if) at least one of these conditions holds true: the learner (or system) has chosen to unredact the specific word group G (for example, by tapping on any of its words in the display); or the learner (or system) has chosen for all word groups of the type "VOCAB" to automatically unredact when visited; or the learner (or system) has chosen for all the text in the transcript to unredact when visited.

```
class CursorManager {
    cursor: Address; // currently playing word
    furthestPlayedElement: Address; // beyond cursor if learner has rewound
    ...
};
// tracks the state of the assist settings chosen by the learner
// or set programmatically
class AssistanceManager {
    // fields for which word group types to auto-unredact
    autoUnredactVocab: boolean;
    autoUnredactSIC: boolean; // for incorrect usage
    autoUnredactTrickyBits: boolean;
    autoUnredactAnnotations: boolean;
    // learner can choose to view full transcript regardless
    // of settings above
    showAllText:boolean;
    ...
};
class WordGroup {
    groupType: Enum; // one of VOCAB, SIC, TRICKYBIT, ANNOTATION
    // tracks if user has tapped on this word group instance
    // when it was redacted, in order to unredact it
    isManuallyUnredacted: boolean;
    assistanceManager: AssistanceManager;
```

```
// returns true if the words in this word group are allowed to
// display themselves unredacted. Regardless, the word instance
// will not unredact if it hasn't been played yet (see below)
// furthestPlayedElement address.
function canMyWordsUnredact ( ) {
  // has the user explicitly chosen to reveal this word group
  if (this.isManuallyUnredacted) {
    return true;
  }
  if (this.assistanceManager.showAllText) {
    return true; // this overrides the word group type specific settings
  }
  switch (this.groupType) {
    case VOCAB:
      if (assistanceManager.autoUnredactVocab) {
        return true;
      }
      break;
    case SIC:
      if (assistanceManager.autoUnredactSIC) {
        return true;
      }
      break;
    case TRICKYBIT:
      if (assistanceManager.autoUnredactTrickyBits) {
        return true;
      }
      break;
    case ANNOTATION:
      if (assistanceManager.auto UnredactAnnotations) {
        return true;
      }
      break;
  } // end switch
  if (this.groupType == VOCAB
      && assistanceManager.autoUnredactVocab) {
    return true;
  }
  return false;
}
};
// represents a Word element in the visible transcript
class Word {
  cursorManager: CursorManager;
  assistanceManager: AssistanceManager;
  wordGroup: WordGroup; // null if this isn't in a word group
  address: Address; // to compare with CursorManager cursors
  isUnredacted: boolean; // memorized derived local state
  // data bound (i.e. reactive) to changes in cursorManager,
  // assistanceManager and wordGroup
  function calculateIfUnredacted ( ) {
    // always redact if the player hasn't visited the word
    if (cursorManager.furthestPlayedElement.isBefore(address)) {
      this.isUnredacted = false;
      return;
    }
    // else check with my word group if I have one
    if (this.wordGroup && this.wordGroup.canMyWordsUnredact( )) {
      this.isUnredacted = true;
      return;
    }
    this.isUnredacted = false;
  }
  ...
};
```

Embodiments as disclosed will be more clearly understood with reference to the enclosed Appendices which depict example data for a T&T file and example data models for elements. It should be noted that the embodiments and examples depicted in the Appendices are given by way of example only, and that any restrictive language used in conjunction with such embodiments should be taken as applying only to those specific embodiments and not to embodiments as disclosed generally.

As can be seen, certain embodiments may focus on different kinds of assistance offered to a learner while they listen, and incorporating this assistance in a useful way in an interactive audio software player (for example on a mobile phone) including—high level guides to the story structure in the form of chapter titles, passage hints, and chapter notes; variable, partial redaction of the transcript, highlighted to track the audio heard; assistance with vocabulary glosses and other notes; and speed control, involving either timestretch audio and a concept of "audio kerning" where natural gaps and pauses in the speech can be elongated to give more thinking time to the listener, without changing the sounds of the spoken words.

In addition embodiments may provide a type of "study flow" with two-phase listening process for each chapter (section of audio): first, careful listening and study, using the assistance and looking up unfamiliar vocabulary; second, natural listening (post-study), without assistance and at native speed, to reinforce the sound of authentic speech with material that is already understood.

While embodiments go some way to address the knowledge and listening gap, some issues remain to be addressed. One problem, affecting lower proficiency learners in particular, is that there is still a lot of interrupted playback as the learner stops to look up unfamiliar vocabulary, and as they rewind to relisten to something that isn't clear. Listening in this fragmented way makes it difficult to follow the overall plot of the story. As an analogy, it is like looking at a photograph only through a microscope: you can see every detail, but it is hard to grasp what the whole picture is.

Another problem affects more advanced learners who only need help with the occasional word, but can grasp the plot in their first listen through, without assistance. For them, a second complete listen is unnecessary, and having the first listen in a highly interactive player with assistance they do not generally need is overkill. If this problem can be addressed it widens the audience that can be served using a language learning application to include learners at advanced levels.

Generally then, there is an opportunity to improve flow in various ways for different learners (n.b., "flow" and "fluency" share the same etymology). Specifically, embodiments may provide better flow in the listening itself—less stop-and-start, more continuity. Thus, when the learner does have to pause, the player may stop at a semantically logical place—for example at the end of a sentence—not at an arbitrary place, immediately as a new word is encountered.

Embodiments may also provide a way for learners to easily mark sentences for later study (a feature we refer to as "mark-for-study"), without interrupting their continuous listening, and a way to efficiently process that list of sentences afterwards. Accordingly, a better study flow (i.e. the organization of study tasks performed by the learner on a chapter or section to achieve their learning objectives effectively and efficiently) is provided. These study tasks include listening, but also activities like quizzes, notes, and reviews. In particular, it is desired that embodiments adapt (e.g., the study flow of the application) to different learners' needs, according to their proficiency level.

It is common to talk of being in a "flow state": working in a highly productive way, with good tools and an environment that allows you to focus. The focus of embodiments may thus be on enabling a flow state for listening study with authentic media: less about the assistance itself to fill the knowledge gaps (our previous focus), and more about when and how that assistance appears—guiding rails to help learners complete useful learning tasks with continuity, momentum, and efficiency.

To illustrate in more detail, for a story, say a movie or a book, one talks of the plot—broadly, who does what and why, expressed as a synopsis. This can be thought of as the skeleton or structure of the story. Then there is the dialog and other details, which add flesh and life. One can remove quite a lot of the detail without losing the plot, but the detail and nuance is what brings the story to life. This dichotomy—structure vs detail—gives a framework to restate and reframe a major aspect of the "lack of flow" problem described above, as well as a way to address it.

A native speaker can appreciate the detail of the spoken dialog (pathos, humor, descriptive detail, etc.) but still keep track of the high level structure, the plot: in other words native speakers can synthesize both at the same time. In fact, for the native speaker, the structure emerges from the detail, so a person can enjoy the movie (or podcast, lecture, conversation etc.) and grasp the essence of it in the same single listen (or single reading for a book, article etc.)

At the lower proficiency levels, on the other hand, there is often so much unfamiliar detail that it gets in the way, occupying all the learner's concentration, preventing them from synthesizing the story structure while they study. Even with passage hints, partially redacted script, and sloweddown audio there is still much vocabulary that requires looking up, which requires pausing the player. This stop-start breaks the flow, making it very difficult to grasp the plot: the essence of the story.

Embodiments thus provide a solution that allows a learner to use their initial listen to focus only on the structure of the chapter or section under study. The structure comprises much less information than the full story, so a user experience can be provided as a low-interaction content player that allows even the lower proficiency learner to grasp the structure with a single continuous listen (e.g., of the unabridged audio). By vastly reducing the scope of the comprehension task (e.g. without abridging the audio)—from full detailed comprehension to the much simpler structural comprehension—the Jiveworld application can reintroduce flow into the initial listen.

This structure-detail dichotomy is a key concept. The core problem is the knowledge gap between the learner and what's required to understand the story they're listening to. The standard way to address this gap is to simplify the content itself. But the Jiveworld approach allows us to keep the full authentic (e.g. audio) content, and distill the structure out (reducing the information) and creating a dedicated task around comprehending just that.

After the learner has grasped the structure, they can then proceed to study the detail in the section under study, in a high-interaction player of the kind that was previously described. Accordingly, the learner can concentrate on the details without worrying about the structure. In fact, because the structure is more essential than the detail, they don't have to worry about missing something important and they can fully focus on exploring the detail. Moreover, the structure itself is a scaffold to which the details (e.g., new vocabulary) can be attached—the structure provides context to the detail, that makes it easier to digest and remember.

Figure 17B:
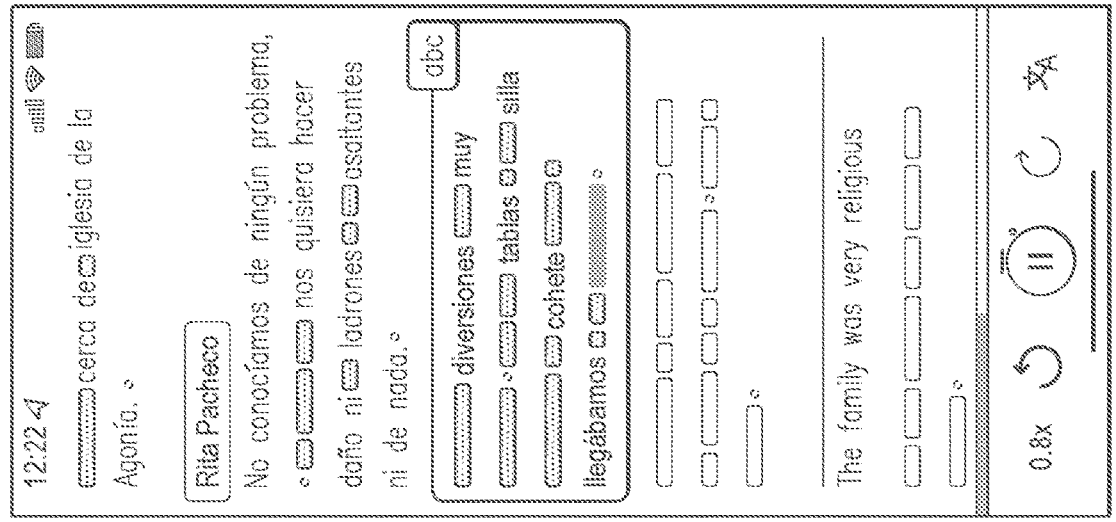
FIGS. 17A and 17B are depictions of interfaces that may be utilized by embodiments of a language learning system.
Figure 17A:
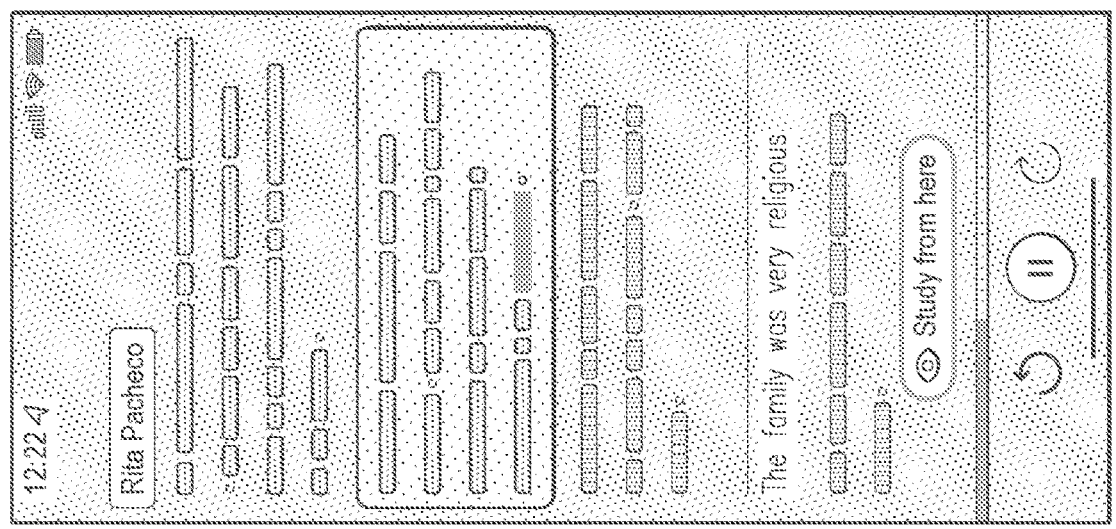

Accordingly, embodiments of the Jiveworld application now makes the separation of structural understanding and detailed comprehension literal, by utilizing two different kinds of player (or modes for the player) for the audio content. In one embodiment then, a structural comprehension player (or mode, also referred to as "lean-back" listening) is adapted for continuous listening (continuous in this disclosure will be taken to mean with no, fewer, or minimal interruptions), has fewer types of user interaction, and displays sparser information on the screen (e.g., only that information needed to understand the essential structure at the learner's proficiency level—higher proficiency learners may not need any extra information). The goal with this structural comprehension player is that the learner can, in a single uninterrupted (or with fewer or minimal interruptions) listen to a section of audio (one or more chapters), understand the plot well enough to correctly answer questions about it. In one embodiment, the structural comprehension player—comprehension with continuous listening, with little or no user interaction—lends itself to a dark visual theme (e.g., light text and icons on a dark background, a more relaxing environment). This structural comprehension player (or mode), aimed at lower proficiency learners, may also be referred to as the Guided Listening Player. An example of the structural comprehension mode for a player is depicted in FIG. 17A.

Embodiment of the structural comprehension player or modes, which may also be dark themed, may be adapted to provide listening reinforcement and review (i.e. listening at natural speed without any assistance, after a detailed comprehension session (e.g., as discussed above). Other functionality that may be provided in the structural comprehension player is a listen and mark-for-study mode that serves higher proficiency learners as will be discussed.

The second of the two (or more) different kinds of player (or modes for the player) for the audio content utilized by the Jiveworld application may be a detailed comprehension player or mode. Such a detailed comprehension player may conversely lend itself to a light visual theme (e.g., dark text on a light background). An example of the detailed comprehension mode for a player is depicted in FIG. 17B. For information-dense environments this light theme seems more natural—this is what most of us use for writing documents, reading, browsing the web etc. As will be realized, this theme is not an absolutely necessary attribute for use, and some may choose a dark theme for other reasons (e.g., less stimulating when using at night)—but it's nonetheless a meaningful usability concept. The famous Taoist yin-yang symbol is suggestive: yang (sun) is associated with analysis and activity, and yin (shadow) with intuition and gestalt and passivity. Indeed, the detailed comprehension player may have more controls, and requires more interactivity to navigate the information-dense space.

The detailed comprehension player may, in embodiments, may also be adapted to improve "flow" using other mechanisms such as a delayed pause, (e.g., a tri-state play button in the transport control) to encourage continuous listening at the sentence level: not stopping mid-sentence. Such a detailed comprehension player may be akin to the player interface described above, but may also include functionality to make embodiments simpler in some ways: such as by reducing focus on the structural elements, which are dealt with in the structural comprehension player; and curtailing affordances and signifiers around vocabulary lookup until the player is in a paused state.

As discussed, the term study flow, generally, refers at least in part to the series of tasks performed by the learner to process a chapter or section of an audio story. It is desired that the learner be in a "flow state" with focus on one well-defined activity at a time, moving towards their learning goal.

As discussed, embodiment may separate the tasks of structural comprehension and detailed comprehension, and some different modes of a player (e.g., a structural comprehension or detailed comprehension player or modes). There is one of the study tasks in particular—the natural listening task (sometimes referred to as fluent listening task)—that is also addressed. Specifically, embodiments may utilize a mechanism for tracking and encouraging a meaningful completion of that task, even if the learner gets diverted mid-way into a study mode.

Also challenging is addressing a different problem: as a learner progresses in their fluency their learning needs change. An advanced beginner may need more help with structural comprehension and also need to look up far more vocabulary for detailed comprehension than a higher proficiency level learner. Similarly for the same learner, some kinds of material may be easier to understand or more accessible than other kinds. In either case, a one-size-fits-all study flow is undesirable—rather it is desired that the learner spend the least amount of time necessary to extract the comprehension and learning they need from each story. Embodiments may provide an elegant solution to this problem.

As may be realized then, a variety of problems may present during the acquisition of a language using a language learning application. Such problems may be at least partially addressed by embodiments as presented through various aspects or functionality offered by such embodiments as presented herein, including embodiments of the Jiveworld application presented herein adapted to include features referred to as guided listen; listen and mark-for-study; tri-state play control, with "delayed pause" (which may include automatic latency adjustments); and adaptive study flow and natural listen task tracking.

Turning first then to guided listen, guided listen is a mode of the Jiveworld application, and in particular, a mode available in an embodiment of a structural comprehension player. Embodiments may be adapted so that a lower-intermediate or higher-beginner proficiency level learner can grasp the structure of the chapter or section of a story with a single continuous listen, before embarking on detailed study.

To illustrate in more detail, in one embodiment the essence of the story structure are the passage elements in the story data. A "passage" is a subdivision of a chapter, and for the purpose of Jiveworld focuses on a single concern (key event, subject, idea) in the telling of a story (or equivalent for a conversation, lecture etc.). For a chapter with a lot of movement and variation there will be more passages, compared to one with less movement. Passages need not be of fixed length, but in general they may comprise between three and a dozen or so sentences of dialog.

In certain embodiments, a passage was represented to the learner as a passage hint, a short statement summarizing the passage, or at least focusing on an important aspect of it. However, in other embodiments there may be a richer data structure for the passage:

```
struct Passage {
    statement: LString; // eg. Maria visits Juan in hospital after his
        //   stroke
    question: LString; // eg.Why is Juan, Maria's brother, in hospital?
    answer: LString; // eg. Because he had a stroke
    wrongAnswers: List<LString>;
        // eg.
        // Because he had a car accident,
        // He is being treated for lung cancer
};
```

Here the type "LString" may represent a "localized string", that can be displayed in the target language (known as "L2") or a language native to the learner ("L1").

Every passage may not be formulated as a question, some passages might have just a statement format (like the passage hint). For passages with questions, embodiments may use the questions to construct a quiz to test the learner's structural comprehension when they reach the end of the chapter. The quiz could be a multiple choice quiz format (useful for self-study scenarios), or the questions could be open, soliciting an answer to be evaluated by, say, an instructor (suitable for classroom scenarios, for example).

Even when there is a passage question, the statement form may still be utilized after the quiz has been completed, for example to allow easy navigation of the story by passage during review, or to provide a summary of previously completed chapters.

Figure 18C:
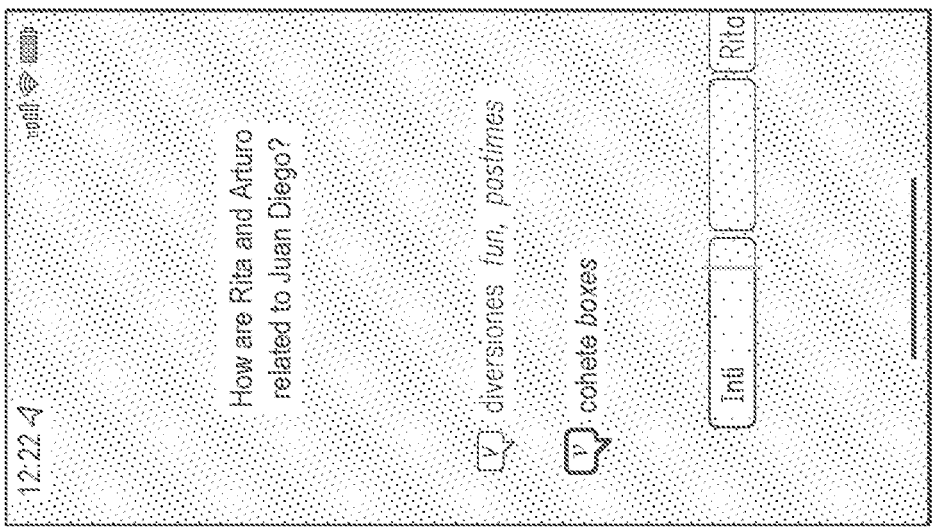
FIGS. 18A, 18B and 18C are depictions of interfaces that may be utilized by embodiments of a language learning system.
Figure 18B:
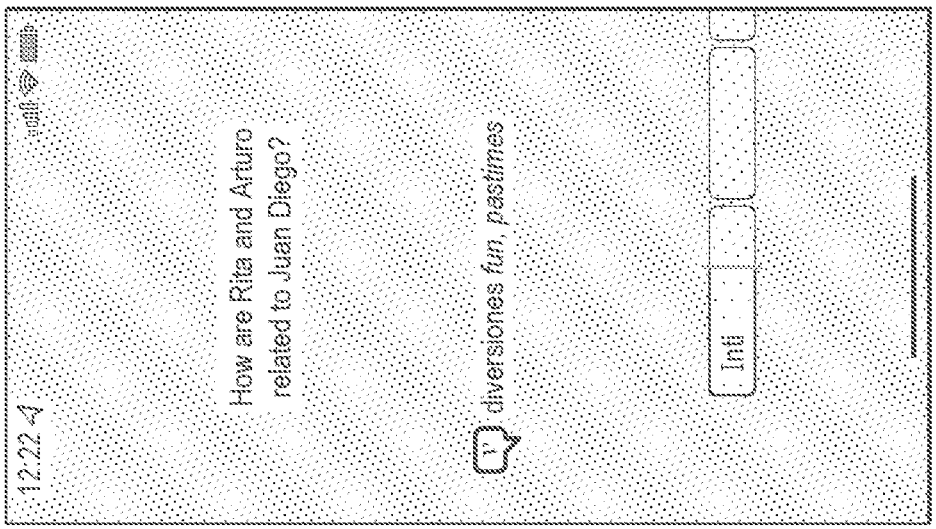
Figure 18A:
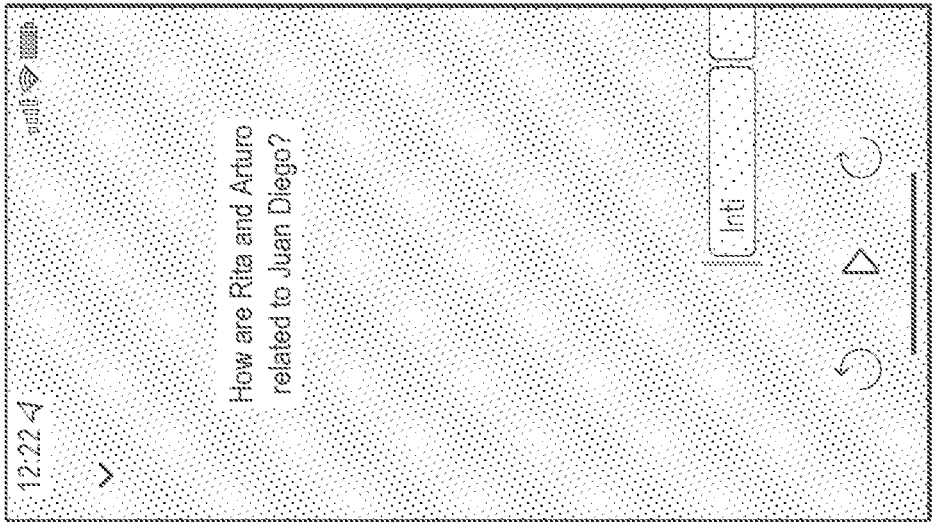
Figure 19:
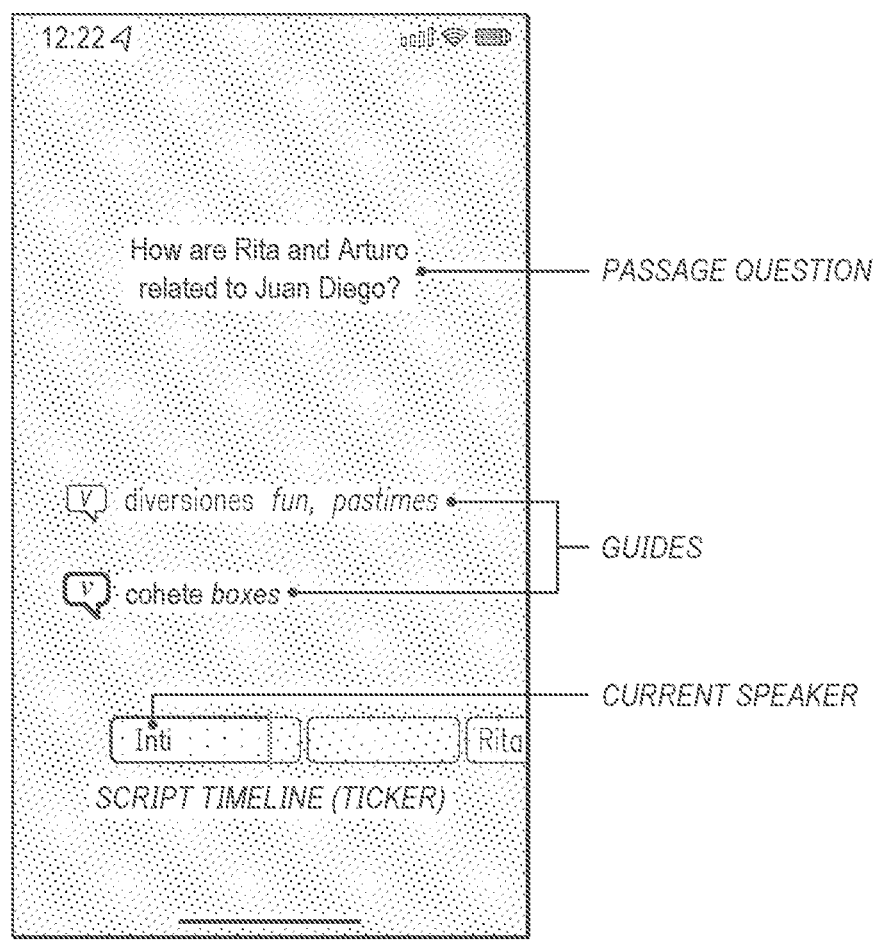
FIG. 19 is an annotated depiction of an interface that may be utilized by embodiments of a language learning system.

Referring now to FIGS. 18A, 18B and 18C, three interfaces depicting an embodiment of a guided listen mode of a structural listening player rendered to a learner as they start playback of a chapter are depicted. FIG. 19 depicts annotated elements of such an interface, including: passage questions, guides, and a script timeline or "ticker". A passage question may stay in view during the playback of the portion (passage) to which it applies. A script timeline, or "ticker" comprises a portion of the display associated with high-level (low-resolution) information about who is speaking in the presented content and how long each sentence or other portion is. This can be an interactive widget, allowing the listener to navigate backward/forward by semantic chunks, and also mark sentences for later study (without pausing the playback).

The guides, from which the "guided listen" feature gets its name, show and hide in synchronization with playback of the content, and may remain on the interface for only a few seconds, long enough to be read and understood. This way the information on-screen at any time may be kept relatively sparse and easy to digest.

In FIGS. 18B and 18C two guides are shown in sequence. There can be different types of guides, for example transcript (L2) words and phrases with translation ("L1 gloss"), as in FIGS. 18B and 18C; transcript (L2) words and phrases without L1 gloss (i.e. a common word that does not require translation); or short descriptive text that provides important context to the presented content (e.g. Inti is making fun of Juan Diego, or, implies that Maria's brother is no longer alive). Guides may be adapted to be relevant to the plot structure or the presented content without explicitly answering a passage question. In one embodiment, only those guides which are selected as essential to the plot of the presented content may be displayed.

Figure 20C:
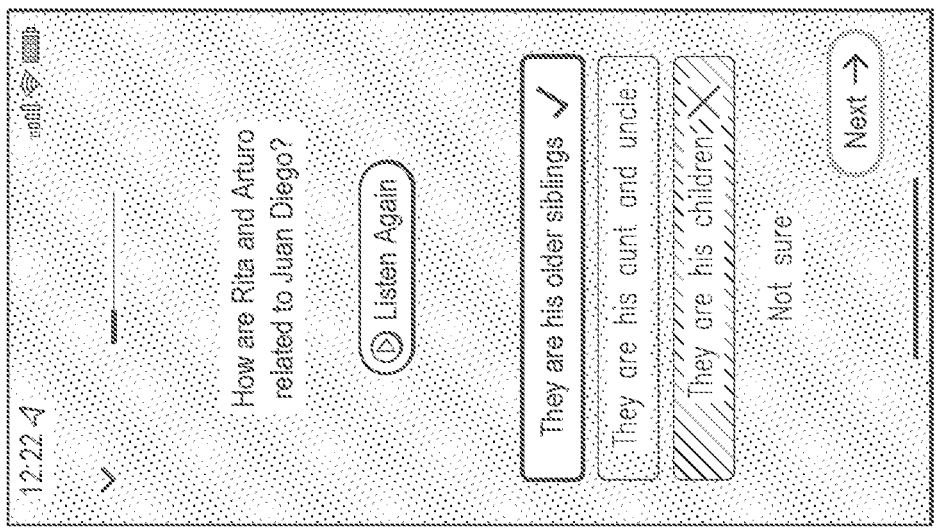
FIGS. 20A, 20B and 20C are depictions of interfaces that may be utilized by embodiments of a language learning system.
Figure 20B:
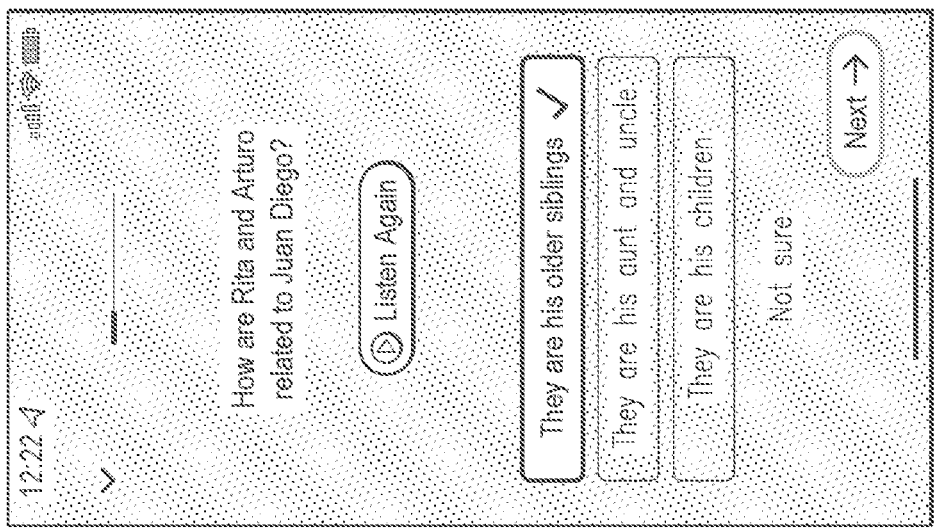
Figure 20A:
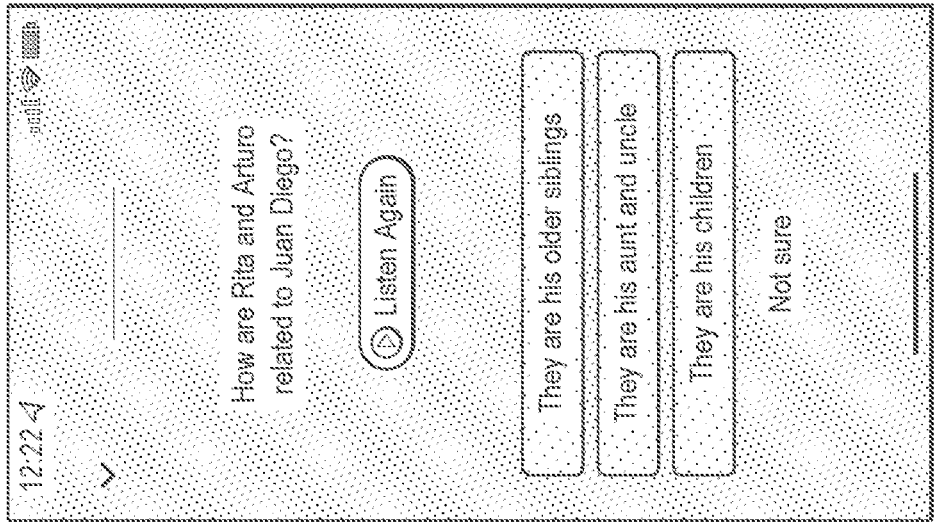

In some embodiments, at the end of the guided listen, or indeed after any first listen of the chapter or section for the purpose of structural comprehension, the learner may answer a multiple choice quiz composed of the same passage questions. FIGS. 20A, 20B and 20C show embodiments of an interface including a quiz for the first passage question, with a progress bar at the top as the learner works through the list of questions.

To implement such functionality the data structures and formats described herein may be utilized. As described with respect to FIG. 13, a hierarchical addressing system for language elements may be utilized, from the word (smallest) up to the passage (largest, within a chapter).

Specifically, according to this hierarchical addressing system, there is a containment relationship—passages contain paragraphs, which contain sentences, which contain words—and each of these entities is associated with a start timestamp in the audio content, and a duration. The addressing system provides a coordinate system for the transcript elements of the audio content so the audio content can be segmented based on a semantic structure (e.g., the presentation of the audio content is currently on the 15th word of the 1st sentence, of the third paragraph, of the second passage of the chapter"), and map that to a time positions ("the presentation of the audio content is 132,400 milliseconds into the chapter"). Thus, a reference to a particular paragraph may have a shorter address (e.g. "2•3•), or just use a portion of the address.

The passage data structure (above) can be attached to the existing passage address in the serialized data—"000" in this example (e.g., replacing what was previously a single hint string) as illustrated by the example below (e.g., using the data structures as discussed and included in the Appendices):

```
...
"elements": [
    {
        "address": "000.",
        "entity_type": "beginning_of_chapter",
    },
    {
        "passage": {
            "statement": {
                l2: "Maria visita a Juan en el hospital despues de su derrame cerebral",
                en: "Maria visits Juan in hospital after his stroke",
                ... translations for other languages here ...
            }
            "question" : {
                l2: "¿Por que esta Juan, el hermano de Maria, en el hospital?",
                en: "Why is Juan, Maria's brother, in hospital?",
                ...
            }
            "answer" : {
                l2: "Porque tuvo un derrame cerebral",
                en: "Because he had a stroke",
                ...
            }
            "wrongAnswers" : [
                {
                    l2: "Porque tuvo un accidente de coche",
                    en: "Because he was in a car accident",
                    ...
                },
                {
                    ... another wrong answer ...
                }
            ],
        }
        "address": "001.",
        "duration": 2100,
```

```
"elements": [
    ... element data etc. ...
```

Similarly the guide data may be attached either to the word or sentence entities. The length of time to display the guide can be a function of the length of the text shown (in words or characters), bound within a minimum and maximum display length. The example data below shows for illustration how different guides may be attached using a data example from the Appendices:

```
...
{
  "address": "001.004.002.",
  "audio_start": 20850,
  "entity_type": "sentence",
  "translation": "And this journey he describes is his commute.",
  "object_class": "Sentence",
  "guides": [
    {
      "guide_type": "hint",
      "show_at_address": "001.004.002.",
      "l1": "Carlos is speaking metaphorically"
    }, {
      "guide_type": "vocabulary",
      "show_at_address": "001.004.002.001.",
      "l2": "este periplo",
      "l1": "this journey (_i.e. the coyote trail_)"
    },
    {
      "guide_type": "transcript",
      "show_at_address": "001.004.002.004.",
      "l2": "ruta de trabajo"
    },
  ],
  "elements": [
    {
      "text": "Y",
      "address": "001.004.002.000.",
      "duration": 121,
      "audio_start": 20850,
      "entity_type": "word",
      "navigation_stop": true,
    },
    {
      "text": "este",
      "address": "001.004.002.001.",
      "duration": 243,
      "audio_start": 20971,
      "entity_type": "word",
    },
    {
      "text": "periplo",
      "address": "001.004.002.000.",
      "duration": 364,
      "audio_start": 21214,
      "entity_type": "word",
    },
    {
      "text": "que",
      "address": "001.004.002.000.",
      "duration": 202,
      "audio_start": 21578,
      "entity_type": "word",
    },
    {
      "text": "describe",
      "address": "001.004.002.001.",
      "duration": 405,
      "audio_start": 21780,
      "entity_type": "word",
    },
    {
      "text": "es",
```

```
      "address": "001.004.002.002.",
      "duration": 162,
      "audio_start": 22185,
      "entity_type": "word",
    },
    {
      "text": "su",
      "address": "001.004.002.003.",
      "duration": 162,
      "audio_start": 22347,
      "entity_type": "word",
    },
    {
      "text": "ruta",
      "address": "001.004.002.004.",
      "duration": 243,
      "audio_start": 22509,
      "entity_type": "word",
    },
    {
      "text": "de",
      "address": "001.004.002.005.",
      "duration": 162,
      "audio_start": 22752,
      "entity_type": "word",
    },
    {
      "text": "trabajo.",
      "address": "001.004.002.006.",
      "duration": 405,
      "audio_start": 22914,
      "entity_type": "word",
    }
  ],
}
```

Using the logic described above for operation, embodiments of the Jiveworld application may be adapted for showing and hiding the guides using, for example, a round robin or scrolling logic to position a new guide when more than one is visible on the screen at the same time.

While guides may be helpful to learners in certain circumstances, for learners at higher proficiency levels, they typically don't need guides to get the gist (structure) of a chapter or section on their first continuous listen: instead they can listen unassisted, maybe at a slightly slower speed, and understand what is going on. They still, however, may miss some of the details and may encounter vocabulary or expressions that they do not know, or might not catch everything said by some speakers at the speed they listen.

Instead these learners may face a different problem: when they encounter something they struggle with should they stop playback and lose the flow of the continuous listen, possibly losing track of the plot? Or do they enjoy the continuous listen, and then have to go back and search for all of the pieces that they missed?

While it may not be desirable to interrupt the flow of a continuous listen, embodiments may be adapted to allow users to tag (e.g., in real time) the places (e.g., sentences) that they want to revisit later, without stopping playback. Accordingly, embodiments may be adapted to provide a mode (e.g., of the structural comprehension or dark themed player) which allows toggling a sentence, and a corresponding feature in the detailed comprehension player (e.g., the light themed) for iterating over that list of sentences efficiently.

Figure 21C:
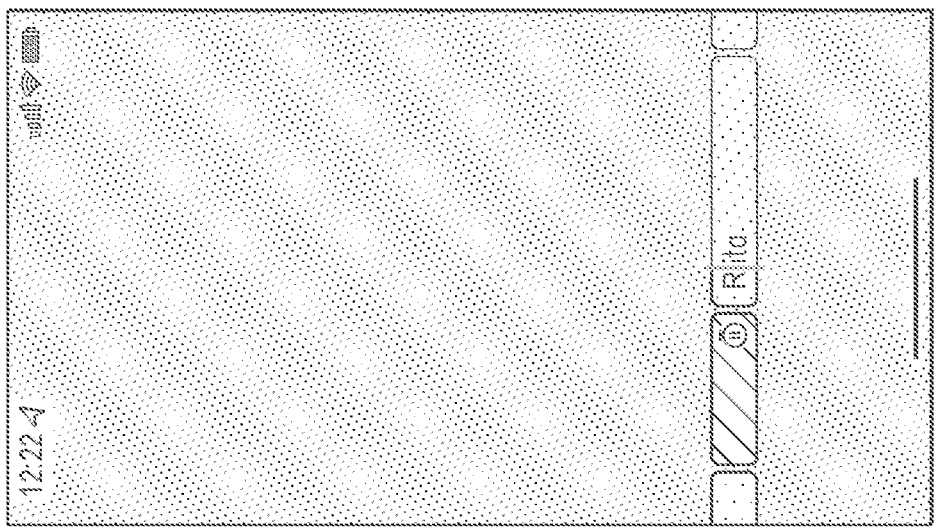
FIGS. 21A, 21B and 21C are depictions of interfaces that may be utilized by embodiments of a language learning system.
Figure 21B:
Figure 21A:
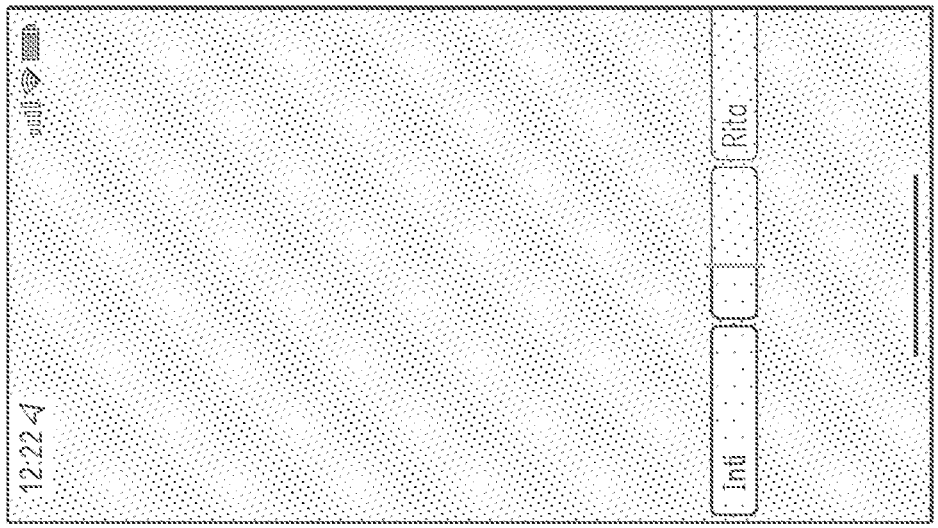

FIGS. 21A, 21B and 21C show embodiments of an interface of a Jiveworld application that provides an approach to this feature. The "ticker" as discussed in the guided listen above shows a portion (e.g., sentences in the depicted embodiment) as rounded rectangles scrolling horizontally as they are played. Some direct action (tap/click, or long tap) may toggle the sentence as shown as "marked for study", with visual feedback (in certain cases highlighted in a color such as red and with a "delayed pause" icon as will be discussed).

Figure 22:
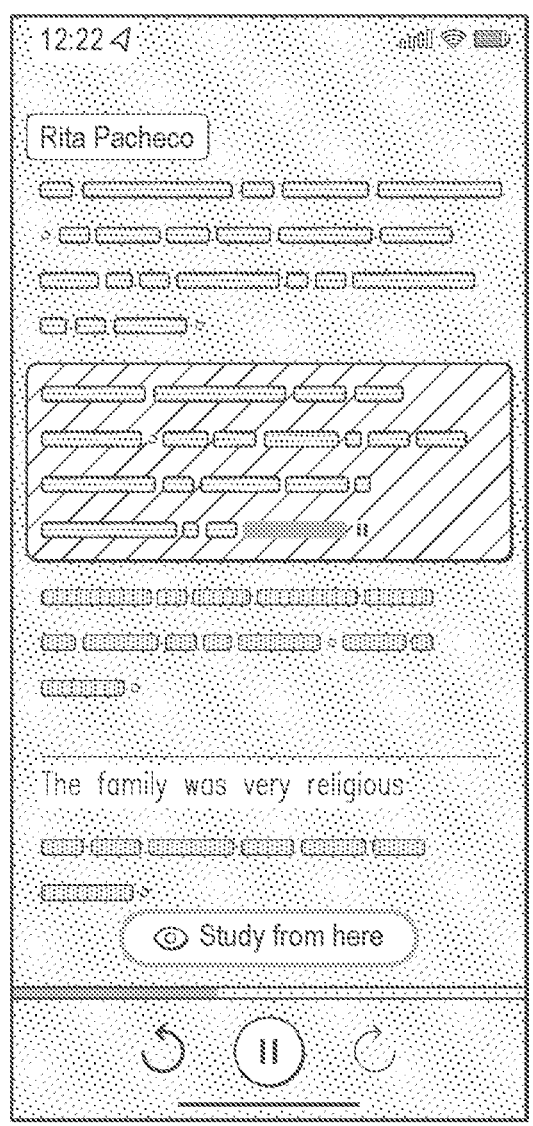
FIG. 22 is a depiction of an interface that may be utilized by embodiments of a language learning system.

FIG. 22 shows an embodiment of an alternative rendering of an interface of the structural comprehension player for this feature. In this case the same script may be used as with the detail comprehension player but with all words replaced by redaction bars (e.g., lozenges). Note that each sentence starts on a new line, so the "paragraph-looking" objects on screen are sentences. In this interface, some action on the sentence (tap/click, or long tap) could toggle the sentence as shown as "marked for study", with visual feedback, (e.g., in some cases highlighted in a color such as a dark red, with a red "pause" icon at the end of the sentence).

Figures 23A, 23B, 23C:
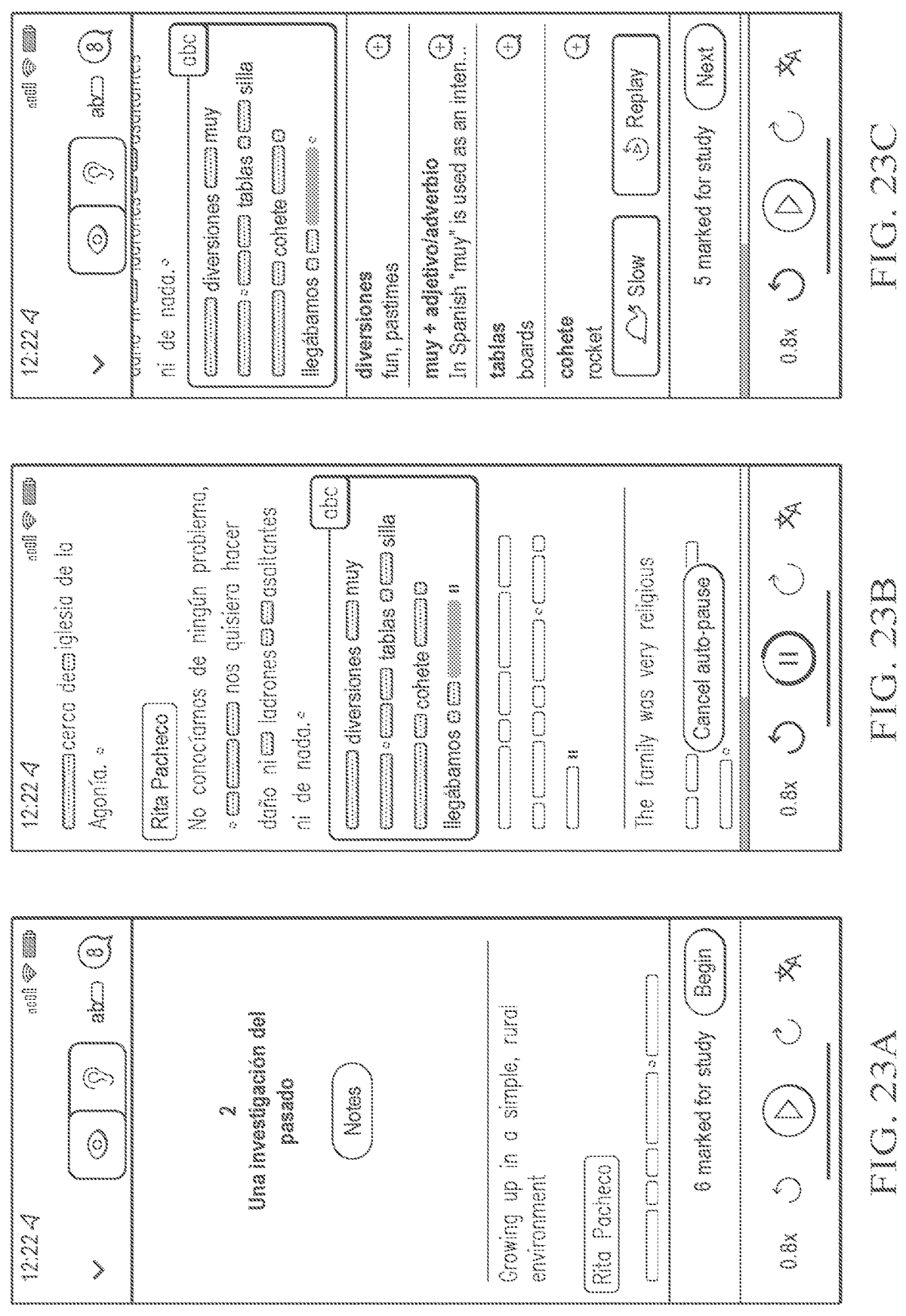

FIGS. 23A, 23B and 23C depicts how the Jiveworld application and its interface can be adapted such that portions (e.g., sentences) marked for study can be visited by the learner in an efficient manner (e.g., in the detailed comprehension player (light theme)). Above the bottom transport controls is a button that allows the learner to jump to the next marked sentence, and gives feedback about how many are remaining. Note that within the script, in this rendering, the marked sentence may be annotated with a "pause" icon, in the same way as it is signified in FIG. 22. These features may be implemented using embodiment of the content (e.g., structures) and player data structures described elsewhere herein. For example, creating and consuming a list of addresses (e.g. "2.3.1") and mapping such an address to a media timestamp is described. As will also be described, this feature integrates elegantly with the "delayed pause" feature (e.g., in the detailed comprehension player).

As discussed, a detailed comprehension player or mode of the Jiveworld application may be used by the learner (user) for the purpose of exploring the content of the chapter or section of audio to gain a native-speaker level of listening fluency. "Fluency" in this sense is not a property of the person listening, rather it is a relationship between the person and what they're listening to. By careful study of the specific material, a (e.g., intermediate level) language learner can have a native-speaker level command of (at least) that content, and that will help them build their fluency in general.

As discussed, in certain embodiments, the Jiveworld application may underline words and phrases in the presented visual transcript where there is a vocabulary gloss. The idea is that if the learner needed help with that selection, they could tap it directly and see the translation for it in a popup window. While such a vocabulary panel is displayed, playback is paused, else the learner cannot concentrate on the new audio while examining this vocabulary. When the learner dismisses the vocabulary panel, playback resumes.

One possible problem with this operation is that it leads to a broken listening experience. The learner is encouraged to look up unfamiliar words immediately when they encounter them and that typically happens in the middle of a sentence, an unnatural place to pause. Thus, it is desired to adapt the Jiveworld application to encourage the learner to listen through to the end of the sentence in all cases, before looking up any vocabulary or other notes related to it.

Consequently, in certain embodiments, the Jiveworld application is adapted such that it does not underline the words and phrases with vocabulary annotations while the learner is listening (e.g., while the audio transcript is being presented). Thus, the interface does not give them any links or portions of the interface to interact with in the visually presented transcript.

Figures 24A, 24B:
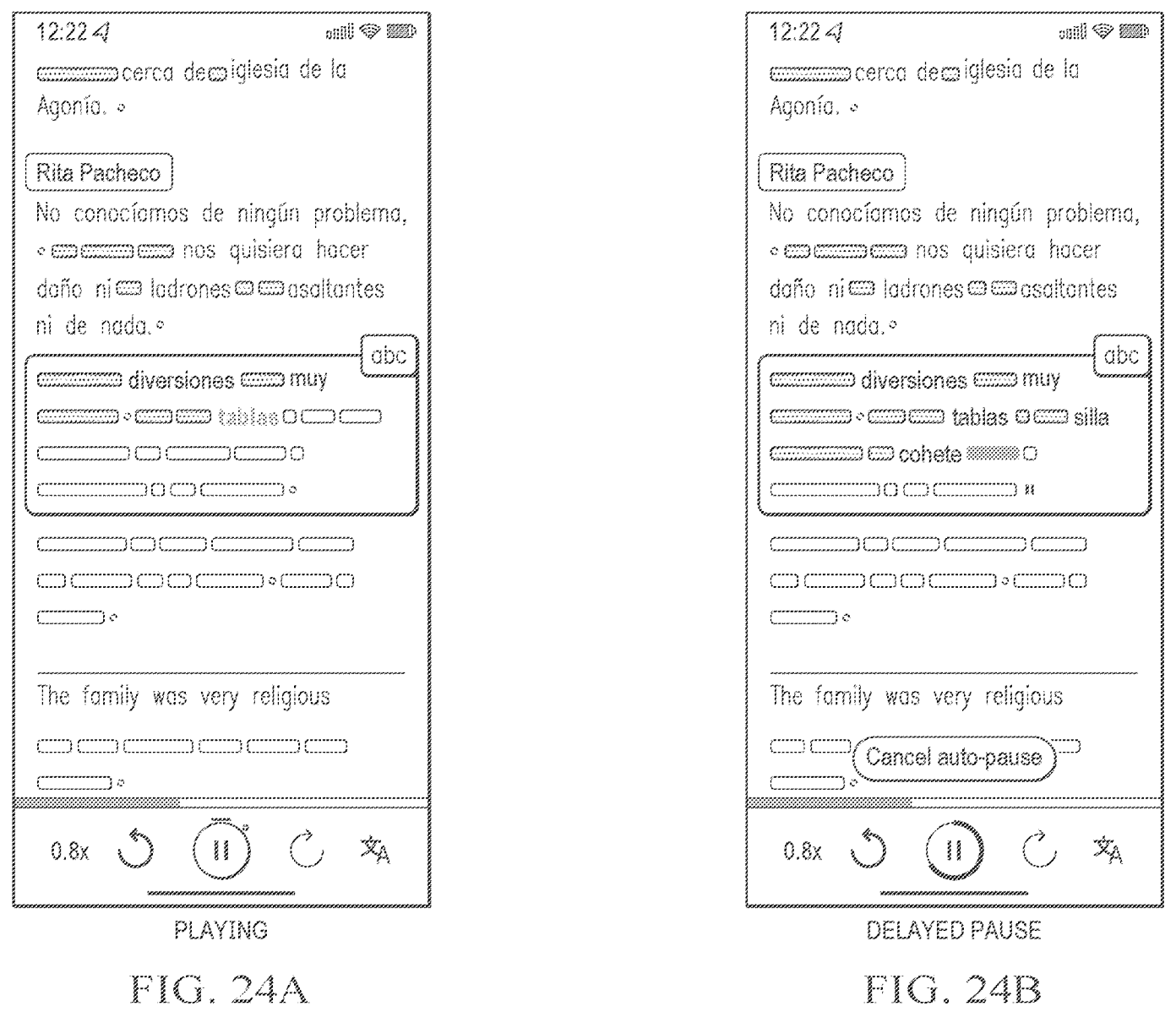
Figure 24D:
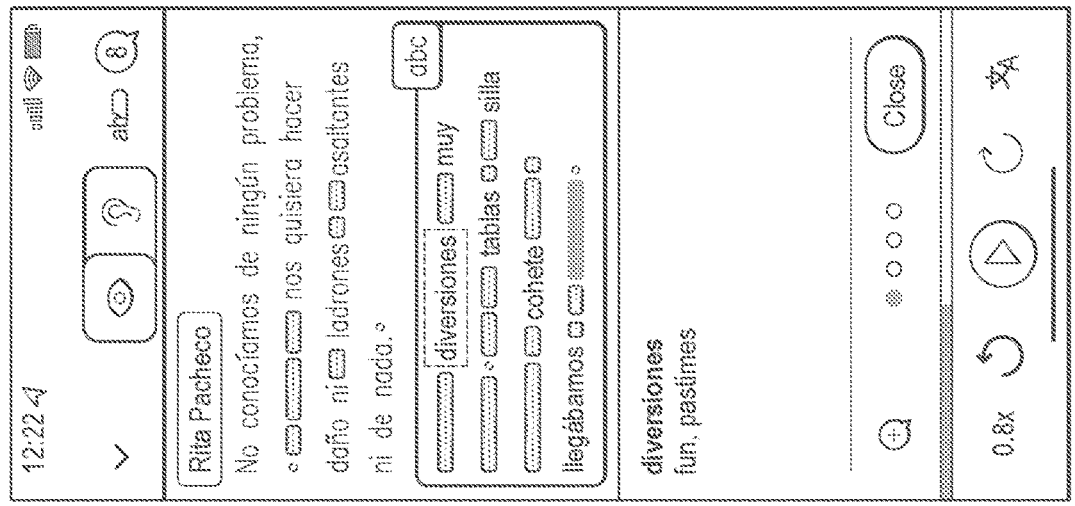
Figure 24C:
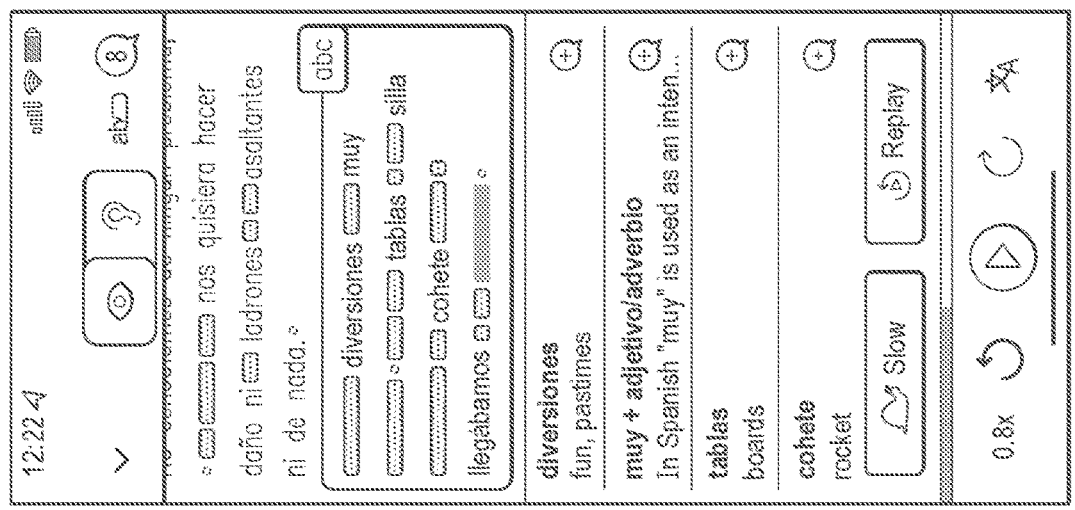

Instead, in certain embodiments, the standard dual-state play/pause button may be replaced in the interface with a button with three states: 1) play, 2) delayed pause or 3) pause. FIGS. 24A, 24B, 24C and 24D depict examples of an interface of such embodiments. FIG. 24A depicts normal playback. The learner is in the middle of the sentence (the word "tablas" is highlighted, meaning that this is the word playing on the audio track). If the learner taps the play button, the Jiveworld application moves into a delayed pause (also called "auto-pause", or "smart pause") state as depicted in FIG. 24B whereby the presentation of the content of the audio transcript is continued until the audio transcript it reaches the end of the current sentence and which point the Jiveworld application then automatically pauses the presentation of the audio transcript as depicted in FIG. 24C.

Referring briefly to the delayed pause state as depicted in FIG. 24B, a couple of features will now be discussed in more detail. Since a delayed pause may be a non-standard player state, it is desired to present the learner with a visceral sense of what is happening. In the FIG. 24B the button itself, with the pause icon, may be presented in a different or standout color (e.g., is red—and there is a small red "pause" icon now at the end of the current sentence in the script, mutated from the terminal navigation stop in orange). Alternatively or in addition (for example) the cursor may be changed to a different color (e.g., to a red color) or the background color behind the current sentence may be altered (e.g., to a reddish hue) in order to associate the "delayed pause" state to the text.

Also, in certain embodiments, the incomplete (e.g., red) ring around the button animates (could be either filling or deleting the circle) as the cursor moves to the end of the sentence, to give another visceral sense of when the actual pause is going to happen. As discussed above, the timing data for the words and sentences in the script (e.g., the timing and transcript file), may be utilized to drive the state of such a countdown or count-up animation for the ring.

In some embodiments, the Jiveworld application may be adapted such that if the learner changes their mind before reaching the end of the sentence they can cancel the delayed pause (the button labeled "cancel auto-pause" in FIG. 24B). And if they do want to pause immediately, mid-sentence, they can tap the tri-state play/pause button again.

In the paused state, all the words and phrases from that sentence with vocabulary or other notes may be displayed (e.g., FIG. 24C). If they select something from that list the note may be shown in the details panel (e.g., FIG. 24D), highlighting the word in the script that it relates to ("diversiones" with a (e.g., yellow) background, in this example).

In essence the learner's focus has been changed from deciding whether to look up each individual word as soon as it is heard (old design), to a lower resolution binary decision of whether they need help with the sentence. And in doing so they are encouraged to listen to meaningfully complete sequences of audio (e.g., complete sentences).

Other benefits of this approach is that meaningful options may be offered at this more natural place to pause (e.g., FIG. 24C) such as replay the sentence, replay the sentence at a slower pace (e.g., the button with the snail icon), displaying the full transcript text (e.g., the 'abc' button on the top right of the sentence), or viewing the full translation (e.g., icon at the bottom-right of the interface). Such options may have a particular value when in the course of ingesting content (e.g., the presented audio transcript) portion by portion (e.g., sentence-by-sentence).

Figure 25:
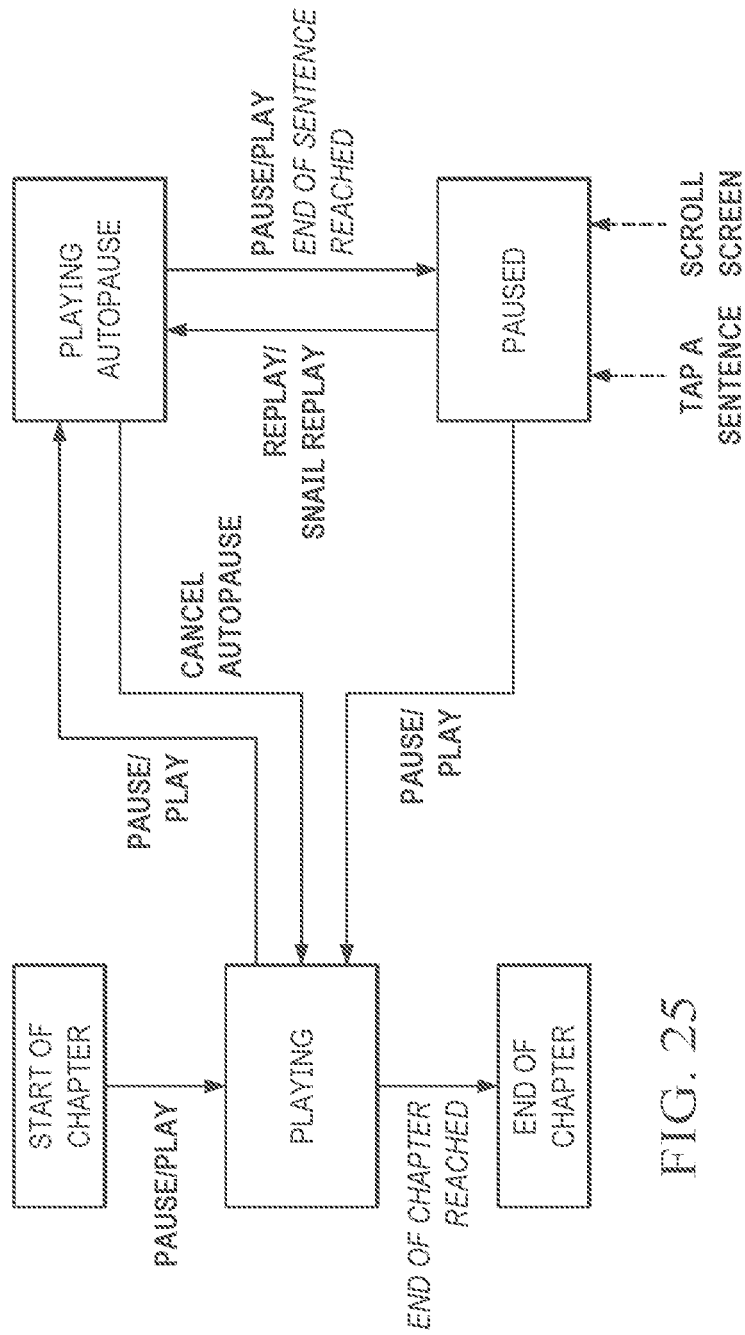
FIG. 25 is a state diagram depicting operation of one embodiment of a language learning system.

FIG. 25 shows a state-transition diagram for one embodiment of a Jiveworld application comprising three player states corresponding to the tri-state play button, while playing a chapter in the detailed comprehension player. There are two other states for the player shown: 1) Start of Chapter and 2) End of Chapter. Other interactions with this player that can transition the player into the paused state may include tapping on a sentence or other portion that has already been presented in the audio or visual transcript (previous to the current playing sentence) in the main transcript or scrolling the visual presentation of the transcript. Overall then, embodiments enabled with this new delayed-paused state allow a learner to listen focused on sentences or other portions rather than individual words, while still providing access to all the detailed information to get a full understanding of the content.

One consideration when implementing this delayed pause on common application platforms where the Jiveworld application may be deployed (e.g. mobile web, desktop web, native mobile applications) is that there may be a delay between when a "stop playback" command is issued in the code at runtime, and when the system audio player actually executes the pause. This can lead to an unpleasant user experience where the listener hears the start of the next sentence in the audio transcript, rather than a clean stop as calculated by the timestamp. Even a latency of 200 milliseconds may affect the smoothness of the listening.

One way to address this problem would be to divide the audio file into separate single-portion (e.g., sentence) segments, so that the application (e.g., system audio player) presenting the audio content for the transcript has to stop at the end. This cutting up into segments (e.g., of the .mp3 or .wav encoded file) could be pre-executed during the product stage, or calculated in real time by the Jiveworld application.

However what this approach gains in better auto-pause experience may lead to a worse listening experience when playing continuously, with a different kind of audio glitch during continuous playback across sentence boundaries. This may be noticeable, for example, if there is a continuity in background noise or background music.

Thus, another approach would be to heuristically anticipate the lag for a particular study session (e.g., individual use of the Jiveworld application or interaction with content). Note that the lag may be different for different hardware, but also might vary for the same hardware and user depending on what else is running concurrently.

Accordingly, each time an automatic pause is executed by the code of the Jiveworld application, the Jiveworld application can compare the timestamp where the Jiveworld application intended to stop the audio with the actual timestamp at which the audio was paused (e.g., by the system audio player used by the Jiveworld application). The intended timestamp is part of Jiveworld application's timestamp data, and the actual timestamp can be queried (e.g., using the player API available in audio player libraries). The difference between the actual and intended audio timestamp (positive or negative) can be used to anticipate exactly when to issue the "stop playback" command to the system audio player for the next auto-pause.

For example, if the Jiveworld application issues a "stop playback" command to the system audio player at timestamp 10500 milliseconds in playback, but the actual stop time executed by the system audio player is 10800 milliseconds, then the Jiveworld application might determine the next planned pause by 300 milliseconds (the difference). Each time the Jiveworld application executes a programmed pause, the Jiveworld application can query the system audio player again to see how accurate the heuristic is, and further adjust.

This simple input alone may be sufficient for acceptable results, but if necessary the Jiveworld application can experimentally predict an initial latency lag for the first pause based on the device on which it is executing, or the Jiveworld application may have other inputs that help predict the latency of the next auto-pause. For example, the audio player latency might be affected by the number of words in the current sentence, or in the chapter, since there will be more objects to render and animate on the screen, which can slow down the processing time of everything on the device. Alternatively, if there is a large variation in latency times, the Jiveworld application might determine a weighted average of the previous sampled latencies, for example the previous five instances.

As detailed above, embodiments of at least three specific ways to increase flow in listening study, especially with authentic (unredacted) native speech have been presented, including: guided listen—aimed at lower-intermediate level learners, so they can comprehend the structure of a chapter or section of story with a single continuous listen; listen and mark-for-study—aimed at higher intermediate and advanced learners who can grasp the structure on their first listen, giving them an efficient way to annotate in real-time and later process the places where they want to check their detailed comprehension and tri-state play Button with delayed Pause—during detailed listening, to encourage listening to complete portions rather than stopping and starting in arbitrary places in the media playback.

It may now be useful to present embodiments of how the Jiveworld application may be adapted to present tasks for a given learner to allow a learner to process a chapter or section of a story to extract the maximum amount of learning benefit in the shortest number of steps. Embodiments of this workflow may be referred to as the "study flow".

As mentioned previously, implementation of a study flow may be different based on the proficiency level of the learner in their target language (L2), and how it relates to the content being accessed. Although embodiments are tailored to the presentation of authentic spoken content they may also be applied to made-for-study spoken content, or music, or any other kind of recorded language material. And even within authentic spoken content, difficulty may vary widely, and even for a given piece of content it might be more or less difficult for different learners of the same proficiency for other reasons (e.g. their familiarity with the accent, culture, or subject matter).

In many cases, however, it is desired that certain concepts be applied (e.g., to each chunk of study, such as chapter, story, passage, etc.) regardless of content difficulty and learner proficiency level. The first is that structural comprehension should be completed before detailed comprehension is completed. The second is that a learner should complete at least one natural listen (e.g., a continuous listen at native speed without speed control, or guides, or hints—where detailed comprehension is completed or mostly completed).

Regardless of these concepts, however, a study flow may be different for different learner proficiency levels. Although the Jiveworld application could use differently graded content so that proficiency (fluency) remains constant with respect to the study material, a primary goal here is work only with the most engaging and interesting native-spoken audio stories, a study flow that adapts to what the learner needs at their level is desired.

Typically, either a single one-size-fits-all guided flow is implemented by language learning applications, or else a generic set of tools (without much of a guided flow) and it is left up to the learner to create their own system (Do-it-Yourself (DIY) style). But the DIY learner type is very much in the minority: the vast majority of people want a defined program to follow, much the same way that in dieting most people like some system to follow or in fitness and other difficult endeavors. It takes creative energy, discipline, and a certain personality to roll your own system, and most are not inclined to do so. It is, however, difficult to design an adaptive study flow that does not confuse the learner. Without a strong conceptual framework, choosing which learning tasks to include or exclude can seem arbitrary choices.

As used herein, a study flow will be understood to mean an ordered sequence of study tasks (e.g., for each chunk of study). For illustration study tasks may be grouped into structural comprehension tasks (e.g., that may be utilized in a structural comprehension or dark themed mode), detailed comprehension and study tasks (e.g., that may be utilized in a detail comprehension or light themed mode) or ear naturalization tasks (e.g., that may be used in a structural comprehension or dark themed mode).

Structural comprehension tasks may include listening notes and guided listen, listen and mark-for-study and structural comprehension quiz. Listening notes may include editorial notes to help learners with what they are about to listen to. These may cover aspects of local accents and styles of speaking, historical or cultural context related to the story, or help clarify something that could confuse the learner (for example if a speaker is talking sarcastically, or imitating someone). Most of these notes will have playable examples excerpted from the audio.

Detailed comprehension and study tasks may include study spotlights, full detailed study or spot study. Study spotlights may be similar to listening notes, but the focus may be on useful vocabulary, patterns, and techniques taken from the audio content that the user can practice and incorporate into their own usage. These will also often feature playable examples from the story and other examples and exercises. Full detailed study may be a portion by portion (e.g., sentence by sentence) sequential listen of the complete chapter or section. The user pauses as necessary at the end of a sentence to look up unfamiliar vocabulary, relisten, or view a translation. Spot study may be an alternative to the full detailed study (e.g., also performed in the detailed listening mode) to review only the sentences marked for study in the listen and mark-for-study task above.

Ear naturalization tasks may include natural listen, which may be substantially equivalent to the second of the two-stage listening. This can be functionally the same as the listen and mark-for-study task above (and therefore may allow the mark-for-study feature), but this may be played at natural speed without any (or with minimal) alteration to the audio of the original content. The purpose here is to reinforce the natural sounds of the spoken language for the content already studied. In some cases, this task can be omitted if the learner has already done a listen and mark-for-study at a speed at or close to natural speed. In certain embodiments, a mechanism for tracking this task in a flexible way may be implemented.

It will be noted here that this is not an exhaustive list of possible study tasks: there could be vocabulary reviews, grammar exercises, conversational practice tasks, creative exercises etc. Not all chapters or sections in a given story need have the same choice of tasks. Any task, however, may naturally fall into one of the three groups above: structural comprehension, detailed comprehension and study, ear naturalization. For example, for a long serialized story a quiz or mini-review may be introduced to recap an earlier part of the story, and this would classify as a structural comprehension task. But this non-exhaustive list of tasks are some example tasks that may be used in an adaptive study flow as implemented by embodiment.

It may be helpful to an understanding of embodiments to give an example. Thus, for purposes of example reference is made to 5 minutes of audio content (e.g., one or two chapters) and the study flow for a low-intermediate versus an advanced proficiency learner is examined using the study tasks listed above.

| Study Task | Low-intermediate learner | Advanced learner |
| --- | --- | --- |
| Structural comprehension | | |
| View listening notes | 3 min | 1 min |
| Guided listen (70% speed) | 7 min | — |
| Listen and mark-for-study | — | 5 min |
| Comprehension Q&A | 1 min | 1 min |
| Detailed comprehension and study | | |
| Study spotlight | 2 min | 1 min |
| Full detailed study | 12 min | — |
| Spot study | — | 2 min |
| Ear naturalization | | |
| Natural listen | 5 min | — |
| TOTAL STUDY TIME | 30 min | 10 min |

For purposes of this example, typical times for each task have been provided at the proficiency level of the example user. Here an advanced user may spend less time on the listening notes and study spotlights tasks since they are probably familiar with some of the content. They can achieve good structural comprehension listening at natural speed, marking for study several sentences they want to examine. Finally, the advanced user may not need a natural listen at the end since they've already done this as part of the listen and mark-for-study task. So in this example the time taken for the low-intermediate learner may be 30 minutes, six times the original content length (5 minutes), compared with 10 minutes for the advanced learner.

If instead of asking how long each learner takes to study (e.g., 5 minutes of) original audio, the focus may instead be placed on the length of the study session itself. Namely, for this example, how much original audio can the learner study in a half-hour study session. The answer in the above example is around 5 minutes for the low-intermediate user and 15 minutes for the advanced user. For example, the advanced user can skip certain tasks (e.g., the listening notes, Q&A and study spotlight tasks) then they may be able to study 20 minutes of source audio content in the same 30-minute study session.

In this way embodiments of the Jiveworld application may adapt not only the workflow (which tasks) but also the unit length of study based on the proficiency level of the learner. Specifically, the Jiveworld application may chunk up the audio content in different sizes accordingly. This is one reason why terms "chapter or section" have been utilized when describing the study unit above. The portions or sections of audio content in any given context may be of a given desired length. It also allows us to think in terms of choosing audio content based on length. If audio content of the same length as the study chunk can be found for a learner at a particular proficiency level, it can be a pleasant user experience to complete a complete piece of audio content in one study session.

The study flows for different proficiency levels as implemented by embodiments of the Jiveworld application are depicted in FIGS. 26A, 26B, 26C and 26D. While almost any number of levels of study flows may be implemented by certain embodiments, for purposes of this example four levels are utilized: Level 1—high-beginner or low-intermediate; Level 2—mid-intermediate; Level 3—high-intermediate or low-advanced; and Level 4—mid-advanced.

Figure 26A:
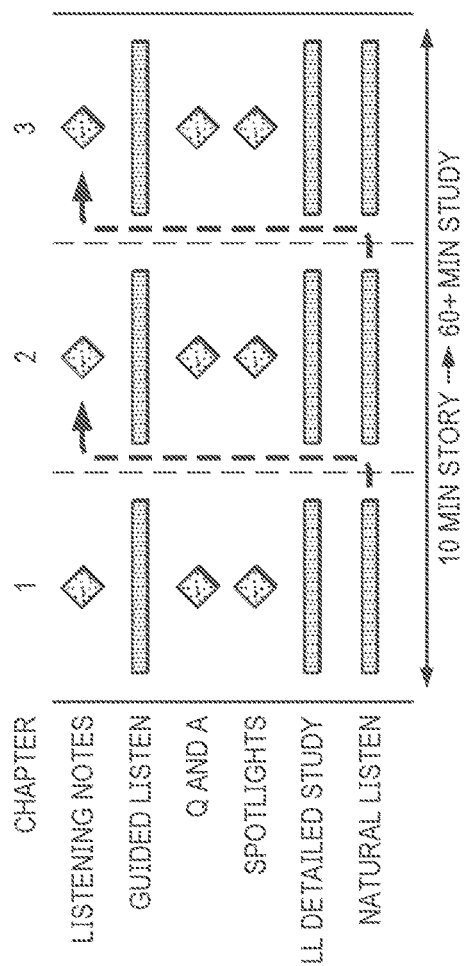

FIG. 26A depicts one embodiment of a Level 1 study flow. As can be seen, in such a Level 1 study flow the user may study one chapter at a time, since each chapter (3-4 mins) could take a complete study session (20-30 mins). As depicted in the FIGURES, the study flow is depicted as moving vertically down a column and then following the dotted line to the start of the next chapter.

Figure 26B:
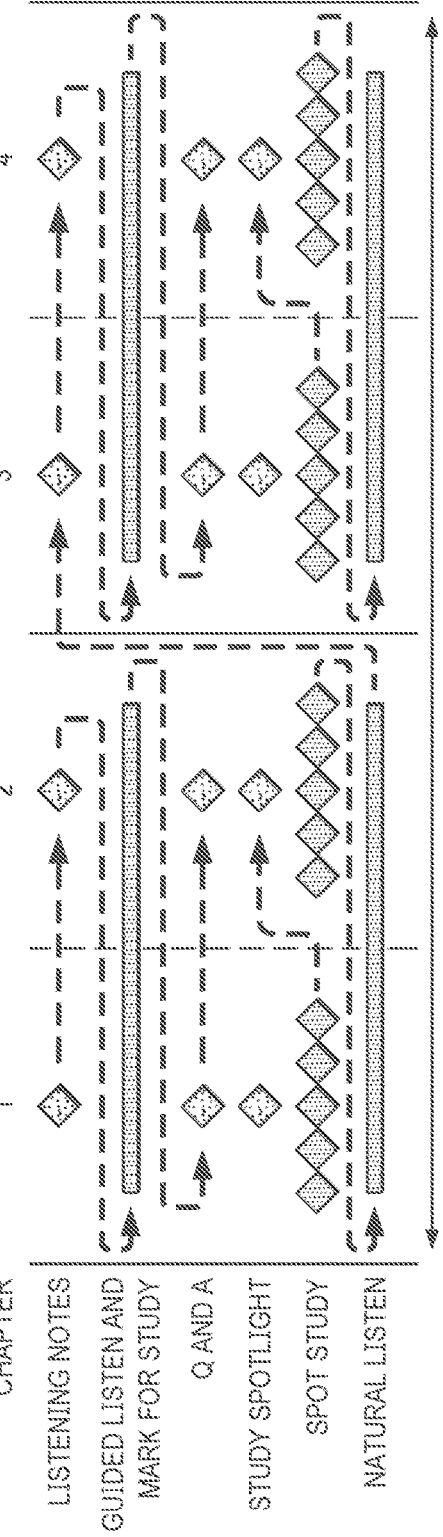

FIG. 26B depicts one embodiment of a Level 2 study flow. At Level 2 the Jiveworld application can introduce the mark-for-study feature inside the guided listen task, materially reducing the amount of time spent in the detailed comprehension player. Compared to Level 1, a user should already be familiar with a broader vocabulary and many sentences will not need further examination. Now the Jiveworld application can present larger chunks of audio content, in this case two chapters at a time. Again the dotted line depicts the flow.

FIG. 26C depicts one embodiment of a Level 3 study flow. In this case, the user may not need the guided listen, and instead can listen at or close to natural speeds. In this case the Jiveworld application can skip the extra natural listen at the end (even if, say, the listen and mark-for-study was at 90% speed, or with some other adjustment to the presentation of audio content), and now the Jiveworld application can present yet larger chunks of audio.

FIG. 26D depicts one embodiment of a Level 4 study flow. As a user approaches true listening fluency, there is less to spot study on each pass, and the comprehension Q&A checks may be redundant and therefore skipped by the Jiveworld application. Note that the Jiveworld application has adapted the study flow so that there is very little overhead for the user beyond the natural listen. In fact they might choose to listen at greater than natural speed (e.g., many people listen to podcasts in their native language at considerably faster than normal speeds). In this example the "unit of study" is the full six-chapter story.

Given that the Jiveworld application can use these levels to estimate the rate at which a user can study (e.g., the ratio between the study flow time and the underlying audio time), the Jiveworld application can let the user choose how long their study session is and then pick an appropriate chunk of audio content to match that they can fully study in the time.

Figures 27, 28:
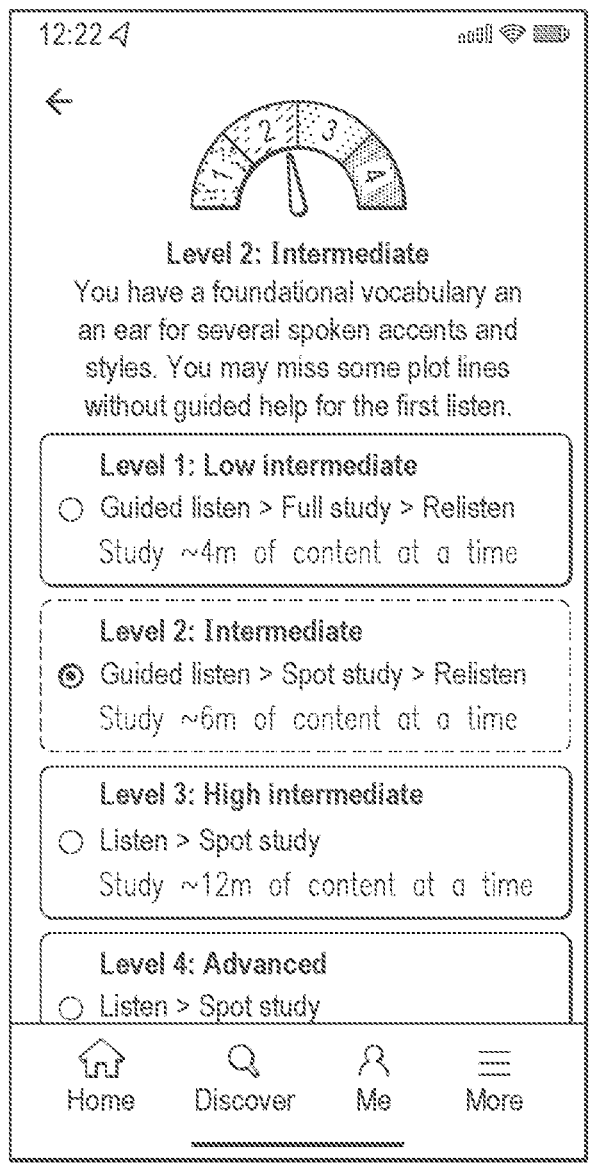
FIG. 27 is a depiction of an interface that may be utilized by embodiments of a language learning system.
FIG. 28 is a depiction of the operation of an embodiment of a language learning system.

Having explicit proficiency levels provides a simple and natural way for a user to understand their progress towards general listening fluency, as illustrated in FIG. 27. Going up a proficiency level increases the user's listening velocity, and they can spend more time enjoying the stories as stories, and less time studying. It will also be apparent to the user if they are at the wrong proficiency level: either they will feel lost in the audio content if the level is too high for them, or they will be frustrated by the unnecessary repetition of listening (e.g., the level is too low).

Therefore it's feasible for a learner to choose their own level based on what is comfortable for them, and choose when to move themselves up a level. However, the Jiveworld application can also analyze other signals to suggest that the level is too high or too low (e.g., for a given user), for example: if the user is struggling to answer the comprehension questions correctly (e.g., based on time or number of correct answers) the user may need to move down a level with slower playback and more assistance with guides, or if the user is pausing less frequently during the detailed study task it may indicate that they can move up from full detailed study to a spot study workflow, or may no longer need a guided listen. The Jiveworld application can also make use of placement tests, a narrower context where graded content may be appropriate.

As mentioned earlier, even when working with exclusively authentic (native spoken) audio content difficulty might vary, and the same user may have higher fluency for some audio content over other audio content. Therefore it is useful to have a more dynamic way for a learner to choose a study flow path as they are listening. Embodiment of the Jiveworld application may thus have just such a dynamic method for user choice of study flows.

For a user's initial listen in the structural comprehension player (e.g., dark theme), the Jiveworld application can allow the learner to extend (or truncate) the chunk of study to something they feel appropriate for their level. During the preparation of the content, places that would be reasonable stopping points for chunking audio content may be identified. These points may, for example, may not be at the end of a particular portion such as a chapter. FIG. 28 illustrates a conceptual model where the audio content is treated as a series of passages, some of which may be suitable for a stopping point of a study chunk.

What is desired is a way for learners to adapt their learning path as they go through audio content. While this goal may seem to conflict with the goal of providing a clear directed path, so that learners don't have to think hard about how they want to learn (unlike DIY learners) as described earlier, embodiments of the Jiveworld application may reconcile these goals through presentation of the portions of audio content or other methods.

Figure 29:
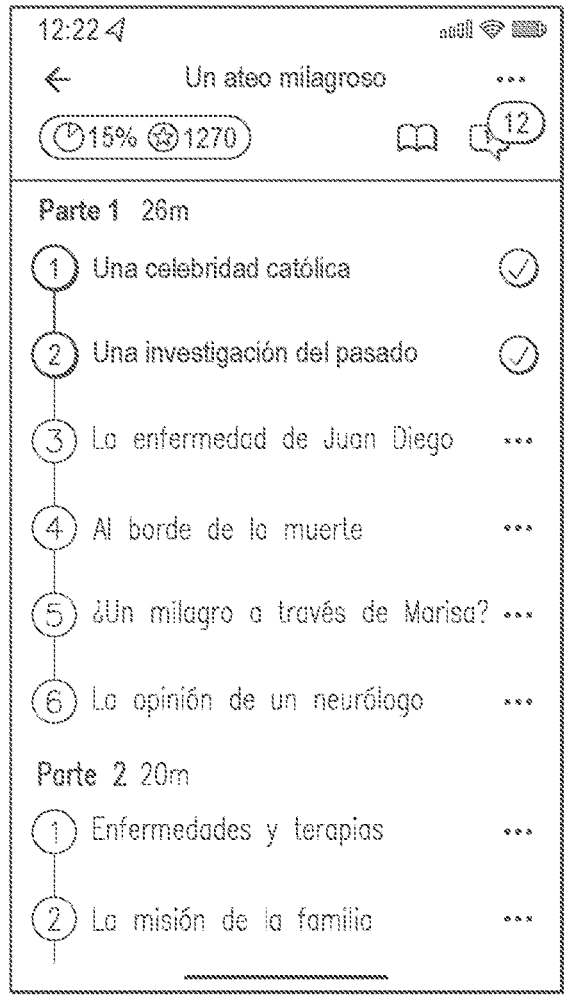
FIG. 29 is a depiction of an interface that may be utilized by embodiments of a language learning system.

FIG. 29 shows one embodiment of an interface of the Jiveworld application that may present audio content as a list of portions (e.g., chapters) to a user. The purpose here is to provide a visual reference to understand the study flow (e.g., as illustrated in FIGS. 30 and 31).

Figure 30:
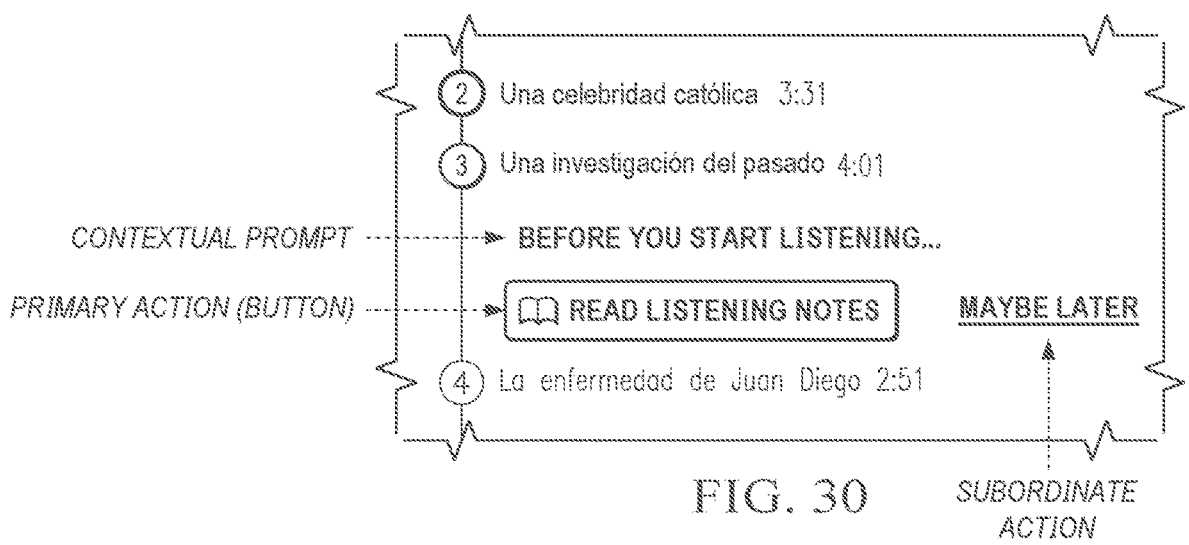
FIGS. 30, 31, and 32 are depictions of interfaces that may be utilized by embodiments of a language learning system.

FIG. 30 illustrates some elements of an embodiment of a study flow user interface. The interface of the Jiveworld application keeps the flow directed by only having a single (primary) action as a large button. A subordinate action (to the primary action) can be provided, for example, as a link, in this case a way to skip the "Read listening notes" primary action.

The contextual prompt above the primary action button gives the user context for where they are in the study flow and the purpose of the primary action. Note how the choice of labels—the contextual prompt to the primary action button label to the subordinate action label—reads naturally: "Before you start listening, read listening notes (or maybe later)". Subordinate actions may include, for example, either skipping a task, or restarting a task (if the learner is midway through the task).

Figure 31:
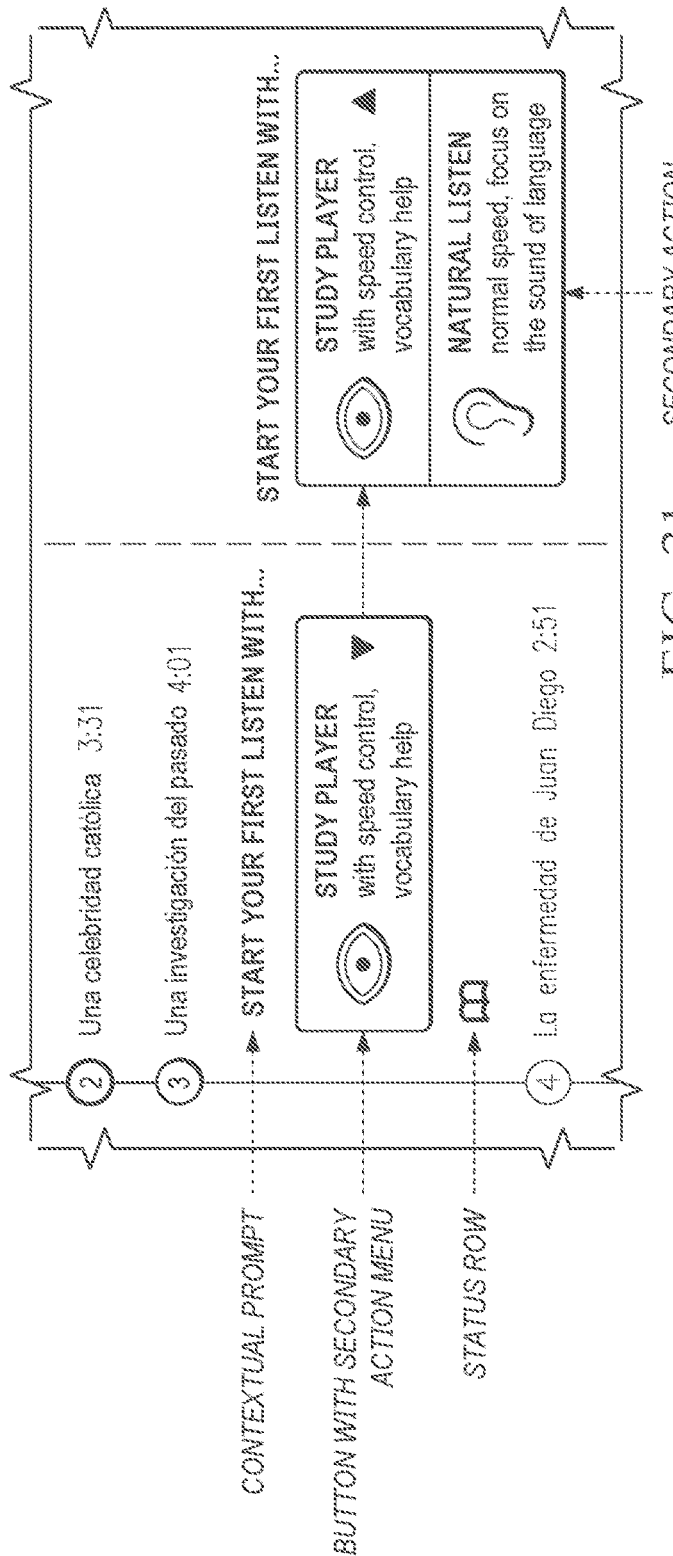

FIG. 31 illustrates how the Jiveworld application can suggest an alternative path in the study flow, while still keeping a single primary action button in the main view. The downward-pointing triangle on the primary action button indicates there is an alternate choice (for how to do the initial listen) shown via a popup menu. But it doesn't force a choice by showing all the actions by default. Instead it gives a subtle but clear signifier (downward triangle) that there is something that can be explored. It is important that these secondary navigational choices are only given at the start of a task, else the clarity and strong direction of the study flow may be lost.

FIG. 31 also illustrates a status row that displays a breadcrumb trail of the tasks that have been completed: reflecting the realized study flow in iconized form. When the user does choose a different path, the Jiveworld application can remember that choice in settings and default to that path on the subsequent study flow (until the user chooses something else again).

Figure 32:
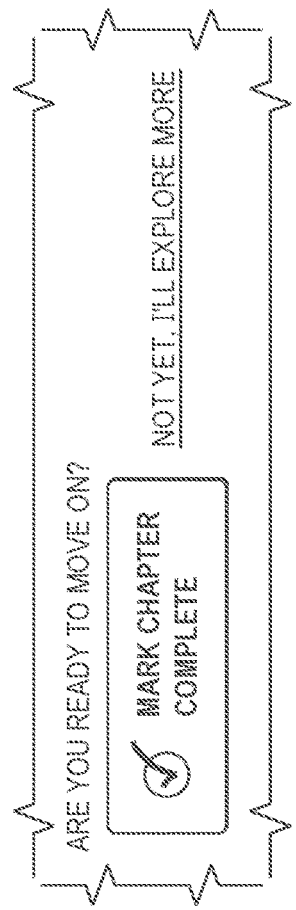
Figure 33B:
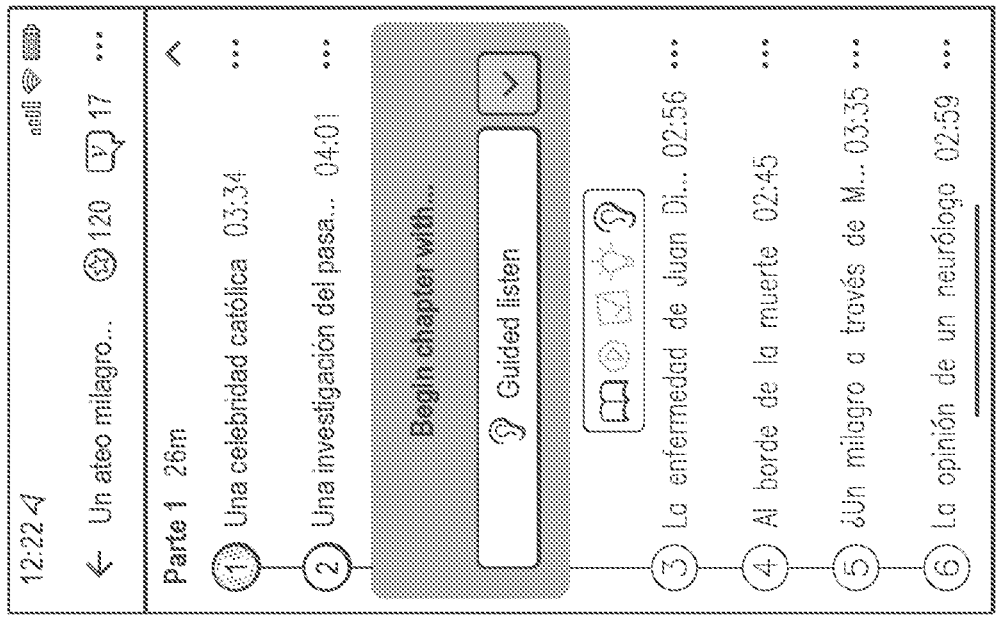
FIGS. 33A, 33B, 33C and 33D are depictions of interfaces that may be utilized by embodiments of a language learning system.
Figure 33A:
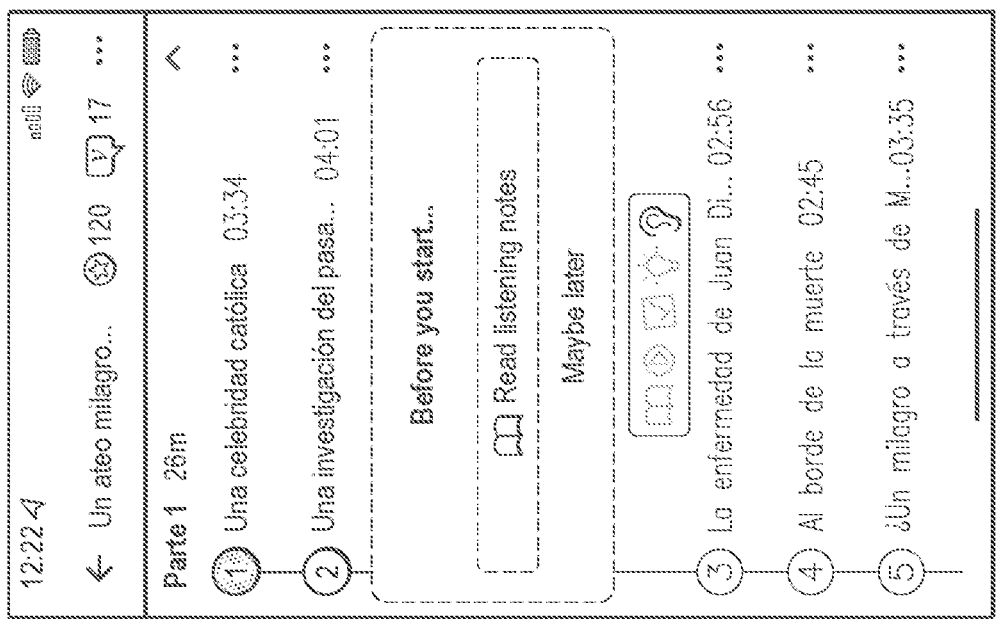
Figure 33D:
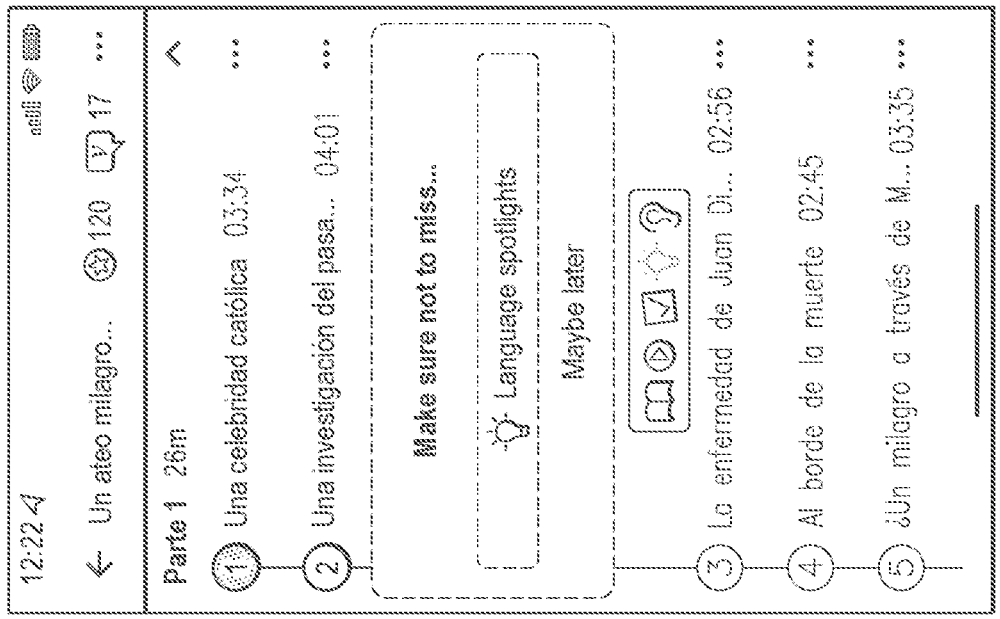
Figure 33C:
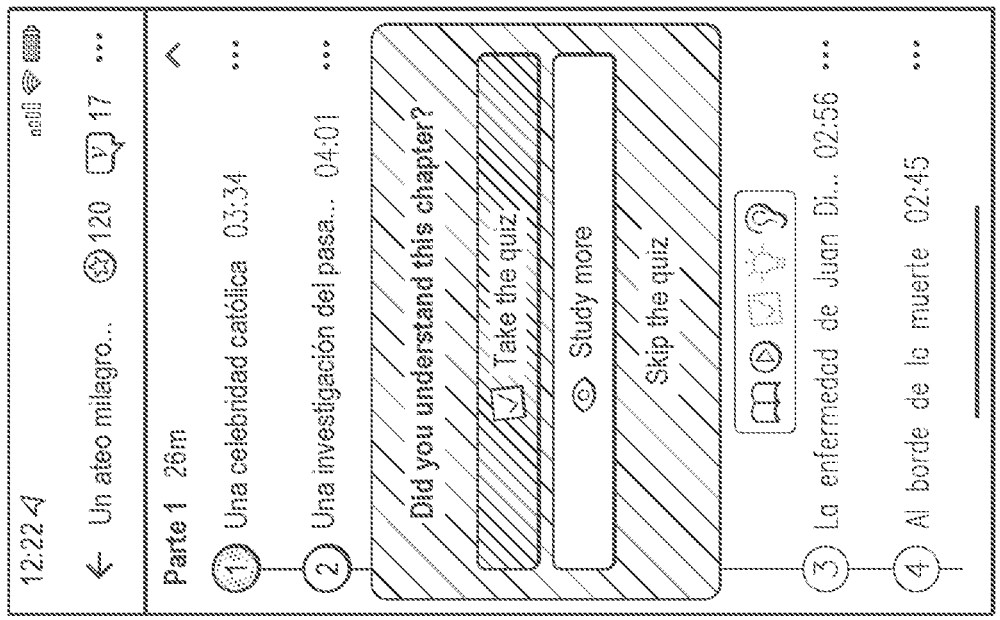

When the learner has satisfied the study flow requirements—structural comprehension check complete, natural listen complete, and no remaining sentences marked for study—the primary action presented to the learner may become "Mark complete", as illustrated in FIG. 32. If the learner feels they need to study the chapter or section more, they can explore further in either the structural comprehension player or detailed listening player (or reexamine the listening notes etc.).

This action is an important feedback signal to the study flow heuristic within the Jiveworld application. If the user has completed a set of study flow tasks, but does not feel like they have sufficient command over the chapter or section it is an indication to the Jiveworld application that the Jiveworld application should present them a lower proficiency level flow. FIGS. 33A, 33B, 33C and 33D give an illustration of embodiments of these adaptive study flow workflow stage interfaces for a mobile device.

Another advantage of a real-time adaptable study flow is that it can easily accommodate stories and chapters with different learning resources. As long as each resource can be associated with a task, and that task can be positioned before or after one of the listening or study activities in the Jiveworld application, then the Jiveworld application can easily offer it to the learner in the study flow.

A natural listen task may be a special task in the study flow aimed at lower proficiency learners whose first listen (e.g., for structural comprehension) requires assistance (e.g. as a guided listen). It may be desired that the user completes this task so as to help naturalize the ear to the natural spoken language, and therefore the Jiveworld application may place this task at the end of the study flow, before marking the chapter or other section complete.

A practical issue the Jiveworld application may address here is that the user may start the natural listen task thinking that they have a complete grasp of the content, but find during the course of it that there is still something they need to look up, something they might have missed or forgotten. Therefore, the Jiveworld application may provide a way for the learner to switch dynamically between the structural comprehension player (e.g., lean-back) and the detailed comprehension player modes. FIGS. 34A and 34B illustrates embodiments of approaches to such a user interface that allows toggling between these modes.

Note that with embodiments of two player modes with the strong dark and light visual themes, the Jiveworld application may have a much clearer and more elegant way for switching assistance on and off.

Part and parcel with this functionality may come a new problem, however: a user has been allowed to break their natural listen task. It may, however, not be desirable to force the user to restart the task from the beginning each time: rather it is desired for the user to be able to find their way back to where they were and continue in the natural listen mode in the structural comprehension player (e.g., dark theme mode).

Figure 35:
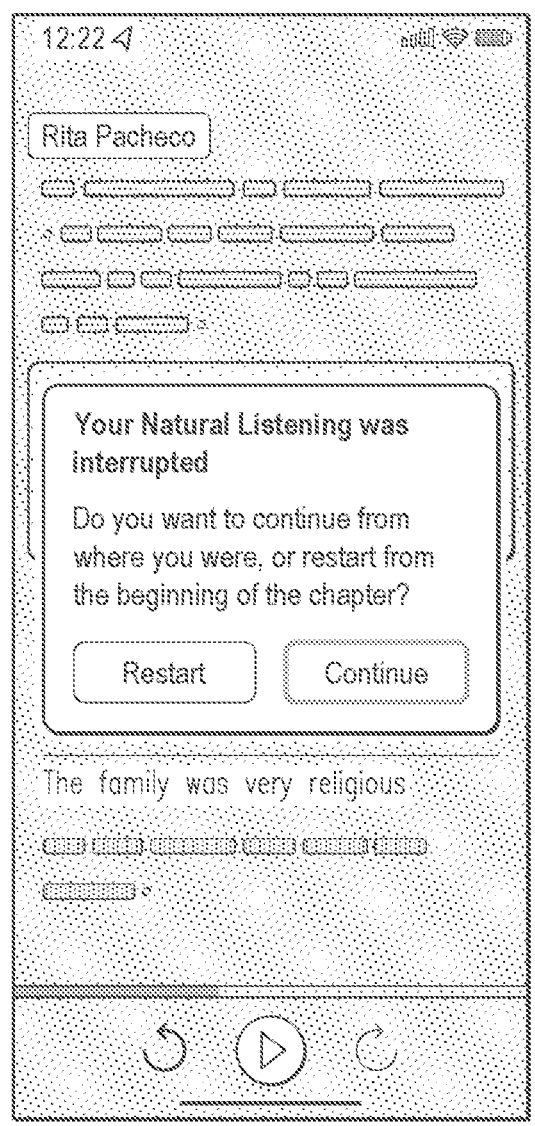

To achieve this end the Jiveworld application may track a user's natural listen progress with a "high-water mark". Now the user can switch over to the detailed comprehension player (e.g., light theme) mode, and explore freely. The Jiveworld application can then guide them back to their previous natural listen position at the appropriate occasion, for example when: they switch back to the dark themes listening player; they reach the end of the chapter, still in the light themed study player or if they have prematurely ended their study session, when they come back to resume their study. An example of how the Jiveworld application would guide them in the user interface is shown in FIG. 35.

Figure 36:
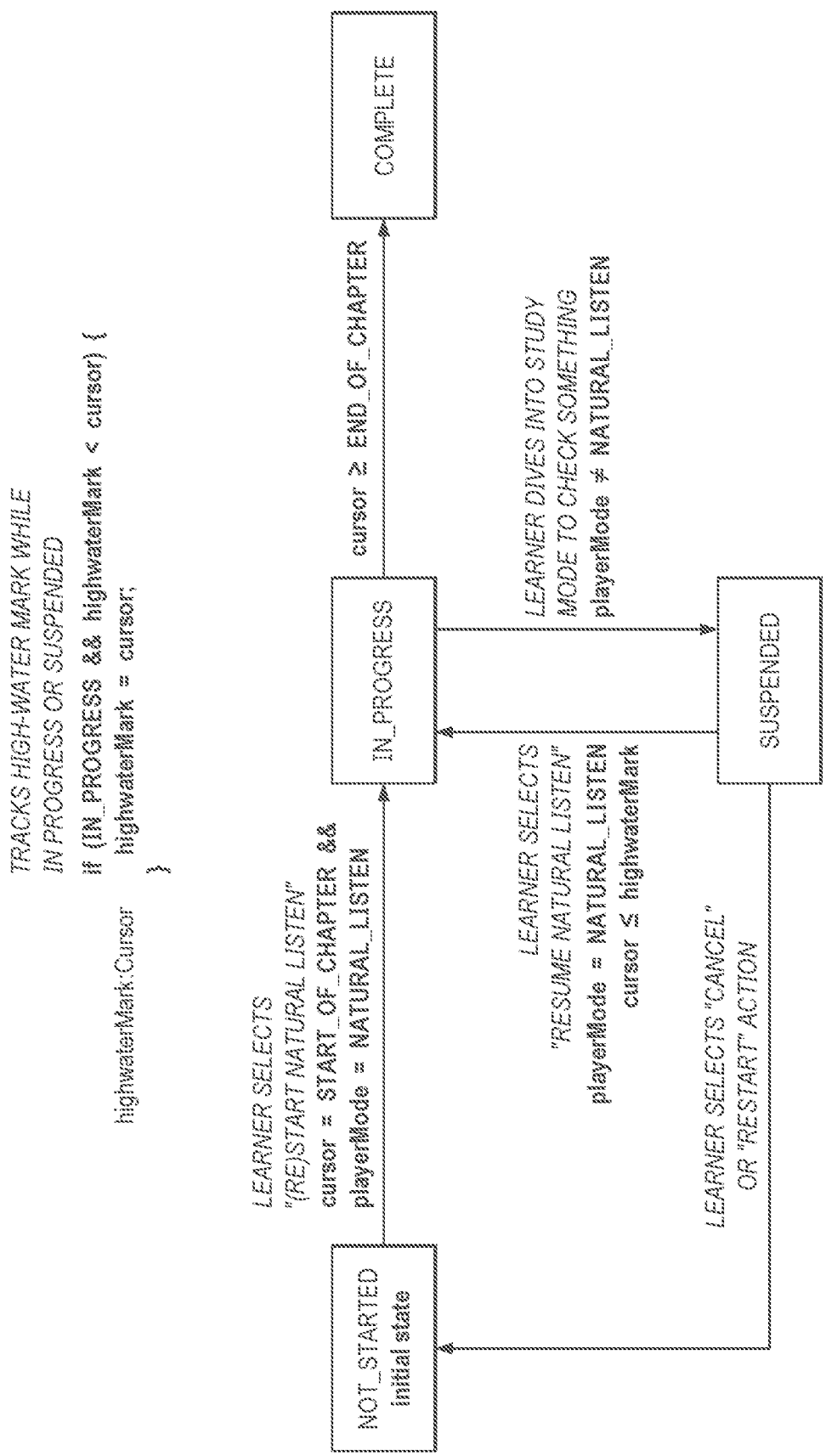
FIG. 36 is a state diagram depicting operation of one embodiment of a language learning system.

In certain embodiments, the Jiveworld application can track progress with the following data structure, with the corresponding state diagram of an embodiment shown in FIG. 36. The highwaterMark property stores the address of the cursor at the point that the learner switches away from the Natural Listen player, so that the cursor can be restored to that position in the story later on:

```
naturalListenProgress = struct {
    highwaterMark:Address; // e.g. 003.002.000.012
    status = enum {
        NOT_STARTED,
        IN_PROGRESS,
        SUSPENDED,
        COMPLETE // permanent state when reached
    }
};
```

As may be noted, for the study flow user interface there may be (at least) two seemingly contradictory goals: 1) a clear series of well-motivated, ordered tasks to process the chapter that the learner can follow, and 2) flexibility so that a learner has a path that suits their level and learning style.

Thus, in some embodiments there may be two possible flow types for a story or other chunk or passage—and at most, one can be active: first, study flow—how the user processes a chapter (or larger or smaller chunk) that they have not previously encountered, and second, a review flow—relistening or restudying chapter that the user has already processed in the study flow previously. This flow can, for example, span several chapters (or a whole story).

In some cases, the study flow may be the more complex of the two. Flows can be further broken down into tasks, which for the study flow comprise view listening notes, first listen, comprehension check, view spotlights, natural listen, spot study, explore, and mark chapter complete. "View listening notes" entails the reading of editorial notes related to input comprehension e.g. about the accents, vernacular, culture. These notes may be the very first task of the study flow. "First listen" entails initial listen through the chapter, in any player mode. "Guided listen" is a lean-back player experience with guides, aimed at general comprehension. "Listen and study" allows a user to explore the notations in study mode while they listen. "Comprehension check" may require a first listen complete which may entail "Question and Answer (Q&A)" at the passage level. "View spotlights" refers to the consumption of editorially chosen notes about useful language from within the chapter that the learner can incorporate into their speaking or writing (output/production). "Natural listen" may entail listening to whole chapter in the listen mode of the player (e.g., in dark mode), at normal speed, without access to notations. Ideally this could be a continuous listen—something rewarded in some manner (e.g., with extra points). "Spot study" may be in the study mode of the player and processing a list of marked sentences during a "mark-for-study" task. "Explore mode" may be after first listen complete where the content is played through in any of the modes as suits the user's interest. This can happen before or after comprehension check, or natural listen complete. Mark chapter complete is where a user explicitly ends the study flow for the current chapter. This may be after the natural listen complete.

Figure 37:
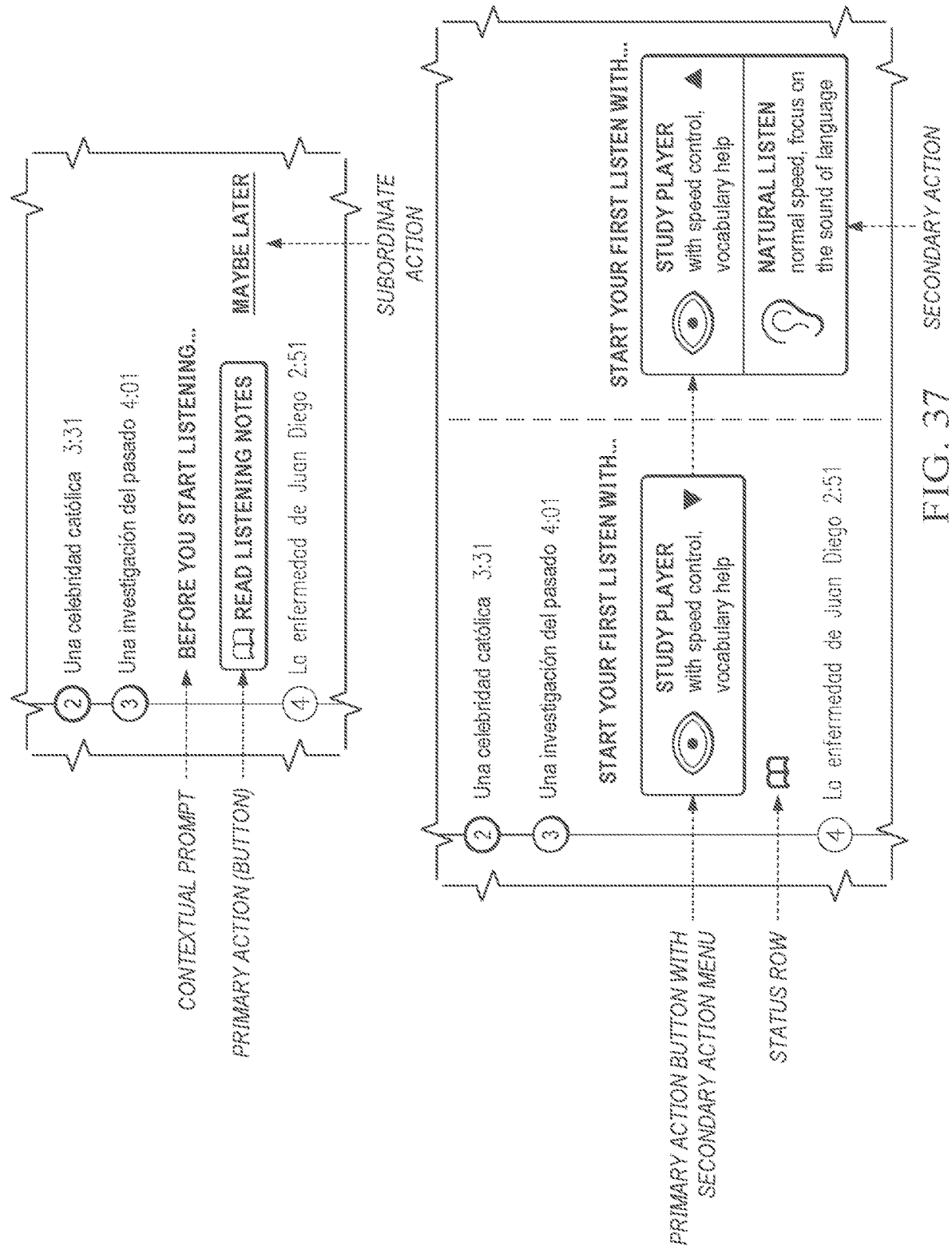
FIG. 37 is a flow for one embodiment of a user interface.

Turning to FIG. 37, a flow for one embodiment of a user interface is depicted. Such interfaces may address such questions, in the context of a chapter, such as how does the application create a meaningful linear path for the learner through the chapter (e.g., a chunk)? How does the application motivate (i.e. explain clearly) the purpose of each task? How does the application offer useful secondary paths to encourage exploration by the learner? How does the interface show the status of where the user is in the flow, and what meaningful tasks they have completed?

Accordingly, in certain embodiments, the elements that comprise an interface for an active chapter list row item may include a contextual prompt that motivates the action presented by presenting the functional context/purpose, a primary action button that generally is associated with one strongly recommended action, subordinate actions that relate to the primary action (e.g. skip, restart, reset, mark done), a primary action button with a secondary action menu that suggests an alternate path through the flow, without adding the extra choices upfront. Not only is this less noisy, but it scales to having any number of secondary actions. The interface may also include a status row that shows tasks that the user has completed, or skipped. The concept is that this row can be tapped to open up a nice large menu to access full descriptions and actions (e.g. View Spotlight again)

Figure 38:
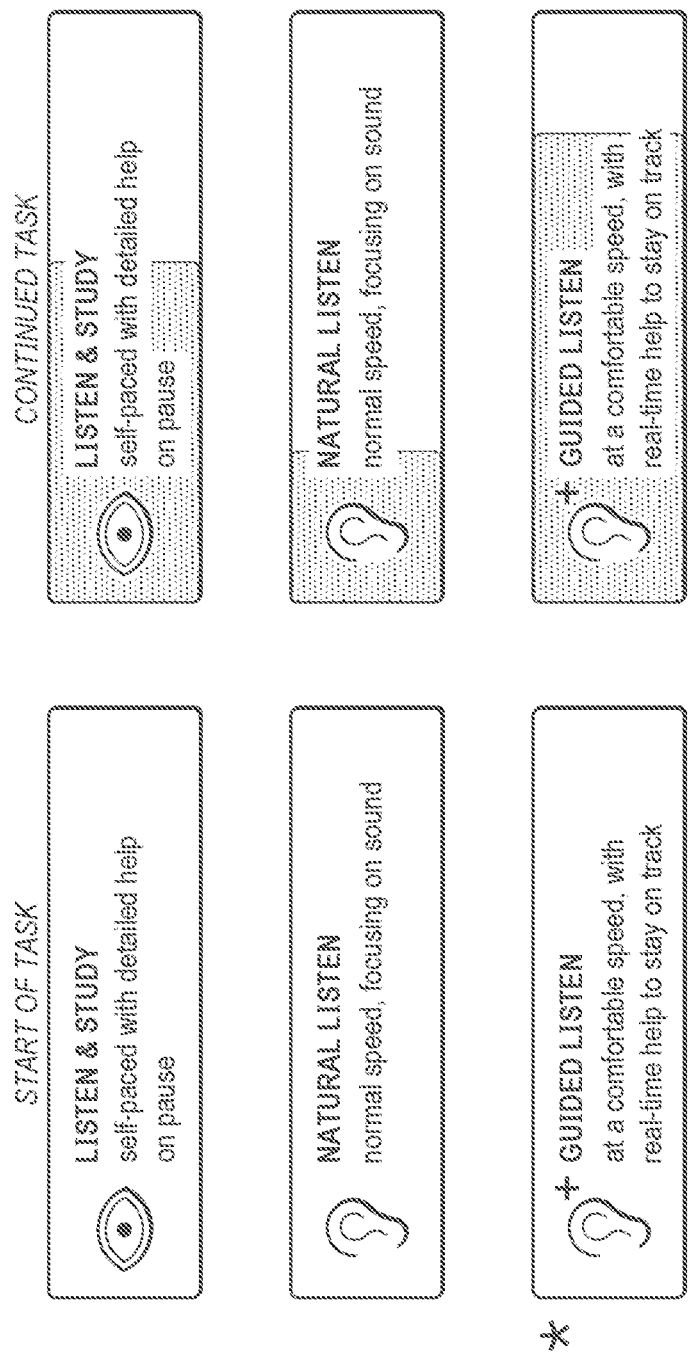
FIG. 38 depicts one embodiment of rendering of action buttons.

There are several tasks that may require the use of the player in one or several of the modes: first listen, natural listen, explore and spot study. FIG. 38 depicts one embodiment of how these action buttons can render.

The starting user interface for each of these tasks may be:

| Task & Player modes order at start of task | Starting prompt w. subordinate actions Continuing prompt w. subordinate actions |
| --- | --- |
| First_Listen | Start your first listen with . . . 1. Guided Listen (post v1) 2. Listen & Study 3. Natural Listen → Natural Listen task Continue your first listen Restart |
| Natural_Listen (always Natural Listen Mode) | Are you ready for listening without assistance? I'll study more first → Opens in Study Mode with taskInProgress = EXPLORE Complete your natural listen to improve your ear Restart Cancel |
| Explore | How do you want to explore this chapter? 1. Listen & Study 2. Natural Listen 3. Guided Listen (post v1) Cancel → default next task (see logic below) Continue where you were? Cancel → default next task (see logic below) |
| *Spot study (always Study Mode) | Check the sentences you marked for study (#)- Clear list → default next task (see logic below) |

As depicted in FIG. 39, in one embodiment non-player tasks may include view listening notes, view spotlights, comprehension check and mark chapter complete.

In some embodiments, a user state of the Jiveworld application driving a study flow may be maintained using a studyFlowState and studyFlowPreferences objects. These two objects determine the rendering of the chapter (or other chunk) under study in the chapter list view (i.e., what prompts, and actions (primary, subordinate, secondary display), and how the end-of-script inline actions render). Specifically studyFlowState can record the actions and progress of the learner for the chapter (chunk) under study. Once a chapter is marked complete this object is reset for the next chunk.

studyFlowPreferences maintains certain choices that the learner made for the previous study flow, so the user interface can adapt to their preferred learning style. For example if the user previously did their first listen as a natural listen mode (instead of the study mode of the player) that can be recorded and use that as the default suggestion next time. As we introduce proficiency levels, that can be used to set up the initial state of this object (or reset them).

In one embodiment, studyFlowPreferences can simply be just one persisted property:

```
firstListenDefaultPlayerMode = enum {
    STUDY_MODE, // initial value for v1
    NATURAL_LISTEN_MODE,
    GUIDED_LISTEN_MODE // initial value when supported
};
```

This value can be set whenever the user selects an interface for the first listen task, and this will be preselected for the next time they start that task (e.g., for the next chapter).

In some embodiment, the studyFlowState object may be in an "in progress" state (e.g., maintained by a taskInProgress:Enum variable). When one of these is active, the tasks in-progress state may be tracked by an in-progress state. The table below lists these tasks (e.g., a possible enum value) and the associated data structure:

| Enum value (task) | Progress tracker structure/subordinate actions |
| --- | --- |
| NONE | n/a |
| FIRST LISTEN | currentPlayerProgress (see definition below) restart →- currentPlayerProgress.mode = NONE currentPlayerProgress.position = BEGINNING_OF_CHAPTER |
| NATURAL_LISTEN | naturalListenProgress restart → naturalListenProgress.highwaterMark = BEGINNING_OF_CHAPTER naturalListenProgress.status = IN_PROGRESS cancel → taskInProgress = NONE naturalListenProgress.status = NOT_STARTED naturalListenProgress.highwaterMark = BEGINNING_OF_CHAPTER |

-continued

| Enum value (task) | Progress tracker structure/subordinate actions |
| --- | --- |
| EXPLORE | currentPlayerProgress<br>restart →<br>currentPlayerProgress.mode = NONE<br>currentPlayerProgress.position = BEGINNING_OF_CHAPTER |
| LISTENING_NOTES | listeningNotesTask<br>skip →<br>listeningNotesProgress.status = SKIPPED<br>taskInProgress = NONE |
| SPOTLIGHTS | spotlightsTask<br>skip →<br>spotlightsTask.status = SKIPPED<br>taskInProgress = NONE |
| COMPREHENSION | comprehensionTask<br>skip →<br>comprehensionTask.status = SKIPPED<br>taskInProgress = NONE |
| SPOT_STUDY | sentencesForStudy: List <SentenceEntity><br>clear →<br>sentencesForStudy.clear( )<br>taskInProgress = NONE |

In some embodiments, a structure that tracks where the learner is currently while midway in one of the player tasks (e.g., a currentPlayerProgress) may be used.

| mode:PlayerMode | NONE | STUDY_MODE | NATURAL_LISTEN | GUIDED_LISTEN |
| --- | --- |
| position:Cursor | Will take the value of furthestListened when the player is exited |
| completedListens | NONE | FIRST_ONLY | FIRST_AND_NATURAL |

The state may thus be reduced to one of three derived states for currentPlayer.status: AT_BEGINNING←position==BEGINNING_OF_CHAPTER, A_END←position>=CHAPTER_COMPLETE and else IN_PROGRESS. AT_END may be an impossible state when in the Chapter List view, since the position should be reset on exiting the player if furthestListened is at, or past, the CHAPTER_COMPLETE marker.

In particular instances, however, the natural listen task may have its own mini state machine tracked in the naturalListenProgress data structure as described above where:

| status | NOT_STARTED | IN_PROGRESS | SUSPENDED | COMPLETE |
| --- | --- |
| highwaterMark:Cursor | Tracks the furthest listened in the player in NATURAL_LISTEN mode |

| status | NOT_STARTED | SKIPPED | IN_PROGRESS | DONE |
| --- | --- |
| lastViewedIndex:int | Only relevant for status == SKIPPED | IN_PROGRESS |

One embodiment of logic for determining which task to show when taskInProgress==NONE may be as follows:
 // first match wins
 listeningNotesTask.status==NOT_STARTED
 =>VIEW_LISTENING NOTES
 currentPlayerProgress.completedListens==NONE
 =>FIRST_LISTEN;
 spotlightsTask.status==NOT_STARTED
 =>VIEW_SPOTLIGHTS
 !sentencesForStudy.isEmpty( )
 =>*SPOT_STUDY
 comprehensionTask.status==NOT_STARTED
 =>*COMPREHENSION_CHECK
 naturalListenProgress.status!=COMPLETE
 =>NATURAL_LISTEN
 default:
 MARK_CHAPTER_COMPLETE Note that the EXPLORE task may always be a result of the user choosing a subordinate action, postponing one of COMPREHENSION_CHECK, FLUENT_LISTEN, or MARK_CHAPTER_COMPLETE—therefore this can be tracked using transient (not persisted) state.

Figure 40:
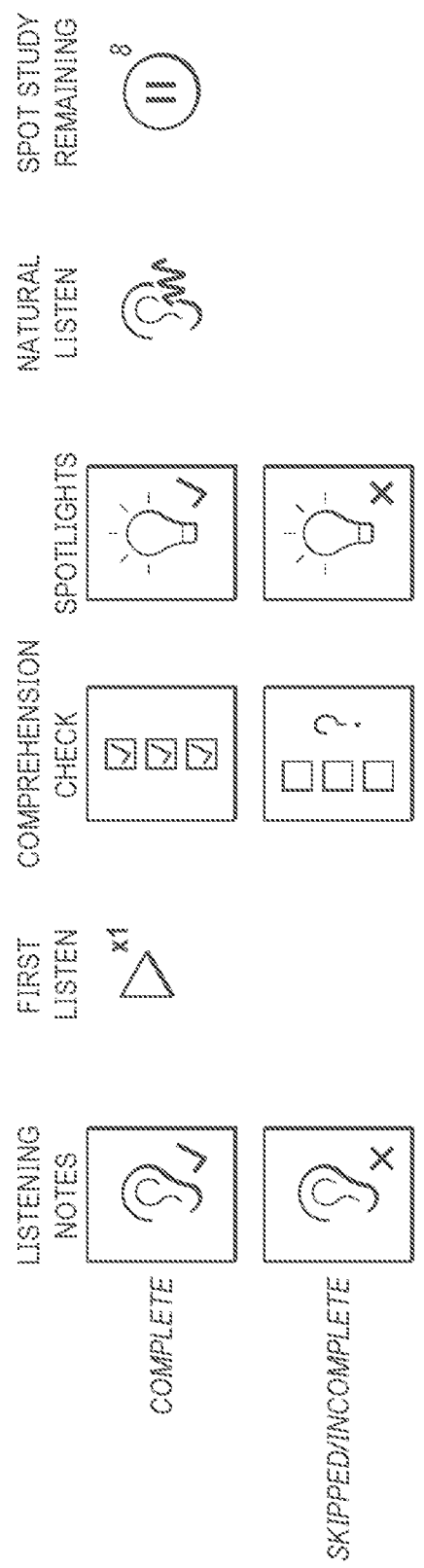
FIG. 40 depicts one embodiment of a status row.

FIG. 40 depicts one embodiment of a status row. Here there may be a breadcrumb trail showing key completed tasks and their status. In one embodiment then, there may be no icon shown if the task status is NOT_STARTED or IN_PROGRESS (e.g., except for spot study remaining which shows the list that needs servicing). For optional tasks there may be a rendering for the SKIPPED state. Tapping/clicking on the status row opens up a menu to access certain resources. The order of icons can be fixed, even if the tasks are completed in a different order.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard drive (HD)), hardware circuitry or the like, or any combination.

Embodiments of a hardware architecture for implementing certain embodiments is described herein. One embodiment can include one or more computers communicatively coupled to a network.

At least portions of the functionalities or processes described herein can be implemented in suitable computer-executable instructions. The computer-executable instructions may be stored as software code components or modules on one or more computer readable media (such as non-volatile memories, volatile memories, direct access storage drive (DASD) arrays, magnetic tapes, floppy diskettes, hard drives, optical storage devices, etc. or any other appropriate computer-readable medium or storage device). In one embodiment, the computer-executable instructions may include lines of compiled C++, Java, hypertext markup language (HTML), or any other programming or scripting code.

Additionally, the functions of the disclosed embodiments may be shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion.

For example, a process, product, article, or apparatus that comprises a list of elements is not necessarily limited only to those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

Appendix A

```
{
 "objectClass": "Chapter",
 "entityType": "chapter",
 "slug": "alias-el-condor-1/3",
 "position": 3,
 "title": "Un mal comienzo",
 "titleEnglish ": "A Bad Start ",
 "recap ": null,
 "normalAudioUrl ": "https://bucketeer-5004978c-f427-4c97-b0f8-32e3484395b1.s3.amazonaws.com/public/prod/chapter/normal_audio/22068-alias- el-condor-1-v11-ch3-trimmed-20200130-7-yecgj2.mp3",
 "noMusicAudioUrl": null,
```

```
"durationMillis": 169831,
"markCompleteMillis": 159831,
"notes": [],
"elements": [
 {
   "objectClass": "GenericElement",
   "entityType": "beginning_of_chapter",
   "address": "000."
 },
 {
   "objectClass": "Passage",
   "entityType": "passage",
   "address": "001.",
   "hint": "Returning to 1989: excitement leading up to the qualifiers",
   "audioStart": 0,
   "duration": 7350,
   "jumpToAddress": "001.000.000.",
   "elements": [
    {
      "objectClass": "Paragraph",
      "entityType": "paragraph",
      "address": "001.000.",
      "audioStart": 727,
      "speaker": "Daniel Alarcón",
      "isSpeakerLabelRequired": true,
      "elements": [
       {
         "objectClass": "Sentence",
         "entityType": "sentence",
         "address": "001.000.000.",
         "audioStart": 727,
         "translation": "Let's get back to the qualifying rounds.",
         "elements": [
          {
```

```
"address": "001.000.000.000.",
"objectClass": "WordGroup",
"entityType": "word_group",
"groupType": "normal",
"elements": [
 {
   "text": "Volvamos",
   "address": "001.000.000.000.000.",
   "audioStart": 727,
   "duration": 419,
   "navigationStop": true,
   "entityType": "word"
 },
 {
   "text": "a",
   "address": "001.000.000.000.001.",
   "audioStart": 1146,
   "duration": 126,
   "entityType": "word"
 },
 {
   "text": "las",
   "address": "001.000.000.000.002.",
   "audioStart": 1272,
   "duration": 210,
   "entityType": "word"
 },
 {
   "text": "eliminatorias.",
   "address": "001.000.000.000.003.",
   "audioStart": 1482,
   "duration": 671,
   "entityType": "word"
 }
```

```
    ],
    "chapterPosition": 3
   }
  ],
 },
 {
  "objectClass": "Gap",
  "entityType": "gap",
  "address": "001.000.001.",
  "audioStart": 2153,
  "duration": 74
 },
 {
  "objectClass": "Sentence",
  "entityType": "sentence",
  "address": "001.000.002.",
  "audioStart": 2227,
  "translation": "The expectation was enormous.",
  "elements": [
   {
    "address": "001.000.002.000.",
    "objectClass": "WordGroup",
    "entityType": "word_group",
    "groupType": "normal",
    "elements": [
     {
      "text": "La",
      "address": "001.000.002.000.000.",
      "audioStart": 2227,
      "duration": 161,
      "navigationStop": true,
      "entityType": "word"
     }
    ],
```

```
      "chapterPosition": 3
    },
    {
      "address": "001.000.002.001.",
      "id": "23-expectativa",
      "objectClass": "WordGroup",
      "entityType": "word_group",
      "groupType": "vocab",
      "elements": [
        {
          "text": "expectativa",
          "address": "001.000.002.001.000.",
          "audioStart": 2388,
          "duration": 523,
          "wordGroupId": "23-expectativa",
          "entityType": "word"
        }
      ],
      "text": "expectativa",
      "usage": "expectativa",
      "note": "expectation",
      "chapterPosition": 3
    },
    "address": "001.000.002.002.",
    "objectClass": "WordGroup",
    "entityType": "word_group",
    "groupType": "normal",
    "elements": [
      {
        "text": "era",
        "address": "001.000.002.002.000.",
        "audioStart": 2911,
        "duration": 201,
        "entityType": "word"
```

```
      },
      {
        "text": "gigante.",
        "address": "001.000.002.002.001.",
        "audioStart": 3112,
        "duration": 402,
        "entityType": "word"
      }
    ],
    "chapterPosition": 3
   }
  ],
 },
 {
  "objectClass": "Gap",
  "entityType": "gap",
  "address": "001.001.",
  "audioStart": 3514,
  "duration": 378
 },
 {
  "objectClass": "Paragraph",
  "entityType": "paragraph",
  "address": "001.002.",
  "audioStart": 3892,
  "speaker": "Jorge Hevia",
  "isSpeakerLabelRequired": true,
  "elements": [
   {
    "objectClass": "Sentence",
    "entityType": "sentence",
    "address": "001.002.000.",
```

```
    "audioStart": 3892,
    "translation": "I think there was a kind li— of... of... of shared madness that
fundamentally centered on... on the team, the Chilean National Team that could defeat Brazil.",
    "elements": [
      {
        "address": "001.002.000.000.",
        "objectClass": "WordGroup",
        "entityType": "word_group",
        "groupType": "normal",
        "elements": [
          {
            "text": "Yo",
            "address": "001.002.000.000.000.",
            "audioStart": 3892,
            "duration": 186,
            "navigationStop": true,
            "entityType": "word"
          }
        ],
        "chapterPosition": 3
      },
      {
        "address": "001.002.000.001.",
        "id": "40-creo",
        "objectClass": "WordGroup",
        "entityType": "word_group",
        "groupType": "tricky",
        "elements": [
          {
            "text": "creo",
            "address": "001.002.000.001.000.",
            "audioStart": 4078,
            "duration": 279,
            "wordGroupId": "40-creo",
```

```
          "entityType": "word"
        }
      ],
      "text": "creo",
      "usage": "creo",
      "chapterPosition": 3
    },
    "address": "001.002.000.002.",
    "objectClass": "WordGroup",
    "entityType": "word_group",
    "groupType": "normal",
    "elements": [
      {
        "text": "que",
        "address": "001.002.000.002.000.",
        "audioStart": 4357,
        "duration": 418,
        "entityType": "word"
      }
    ],
    "chapterPosition": 3
  },
  {
    "address": "001.002.000.003.",
    "id": "53-hubo",
    "objectClass": "WordGroup",
    "entityType": "word_group",
    "groupType": "tricky",
    "elements": [
      {
        "entityType": "gap",
        "audioStart": 4775,
        "duration": 598,
        "address": "001.002.000.003.000."
```

```
      },
      {
        "text": "hubo",
        "address": "001.002.000.003.001.",
        "audioStart": 5373,
        "duration": 223,
        "wordGroupId": "53-hubo",
        "navigationStop": true,
        "entityType": "word"
      }
    ],
    "text": "hubo",
    "usage": "hubo",
    "chapterPosition": 3
  },
  {
    "address": "001.002.000.004.",
    "objectClass": "WordGroup",
    " entityType ": "
word_group ",
    "groupType": "normal",
    "elements": [
      {
        "text": "una",
        "address": "001.002.000.004.000.",
        "audioStart": 5596,
        "duration": 186,
        "entityType": "word"
      }
    ],
    "chapterPosition": 3
  },
  {
    "address": "001.002.000.005.",
```

```
"id": "57-especie",
"objectClass": "WordGroup",
"entityType": "word_group",
"groupType": "vocab",
"elements": [
  {
    "text": "especie",
    "address": "001.002.000.005.000.",
    "audioStart": 5782,
    "duration": 335,
    "wordGroupId": "57-especie",
    "entityType": "word"
  }
],
"text": "especie",
"usage": "especie",
"note": "kind, type",
"chapterPosition": 3
},
{
"address": "001.002.000.006.",
"objectClass": "WordGroup",
"entityType": "word_group",
"groupType": "normal",
"elements": [
  {
    "text": "co—",
    "address": "001.002.000.006.000.",
    "audioStart": 6117,
    "duration": 186,
    "entityType": "word"
  },
  {
    "text": "de...",
```

```
      "address": "001.002.000.006.001.",
      "audioStart": 6303,
      "duration": 261,
      "entityType": "word"
    },
    {
      "text": "de...",
      "address": "001.002.000.006.002.",
      "audioStart": 6564,
      "duration": 261,
      "entityType": "word"
    },
    {
      "text": "de",
      "address": "001.002.000.006.003.",
      "audioStart": 6825,
      "duration": 149,
      "entityType": "word"
    }
  ],
  "chapterPosition": 3
},
{
  "address": "001.002.000.007.",
  "id": "69-locura",
  "objectClass": "WordGroup",
  "entityType": "word_group",
  "groupType": "vocab",
  "elements": [
    {
      "text": "locura",
      "address": "001.002.000.007.000.",
      "audioStart": 6974,
      "duration": 298,
```

```
      "wordGroupId": "69-locura",
      "entityType": "word"
    },
    {
      "text": "colectiva",
      "address": "001.002.000.007.001.",
      "audioStart": 7272,
      "duration": 410,
      "wordGroupId": "69-locura",
      "entityType": "word"
    }
  ],
  "text": "locura colectiva",
  "usage": "locura colectiva",
  "note": "shared madness",
  "chapterPosition": 3
},
{
  "address": "001.002.000.008.",
  "objectClass": "WordGroup",
  "entityType": "word_group",
  "groupType": "normal",
  "elements": [
    {
      "entityType": "gap",
      "audioStart": 7682,
      "duration": 423,
      "address": "001.002.000.008.000."
    },
    {
      "text": "que",
      "address": "001.002.000.008.001.",
      "audioStart": 8105,
      "duration": 173,
```

```
      "navigationStop": true,
      "entityType": "word"
    },
    {
      "text": "se",
      "address": "001.002.000.008.002.",
      "audioStart": 8278,
      "duration": 139,
      "entityType": "word"
    },
    {
      "text": "centró",
      "address": "001.002.000.008.003.",
      "audioStart": 8417,
      "duration": 277,
      "entityType": "word"
    }
  ],
  "chapterPosition": 3
},
{
  "address": "001.002.000.009.",
  "id": "86-fundamentalmente",
  "objectClass": "WordGroup",
  "entityType": "word_group",
  "groupType": "tricky",
  "elements": [
    {
      "text": "fundamentalmente",
      "address": "001.002.000.009.000.",
      "audioStart": 8694,
      "duration": 623,
      "wordGroupId": "86-fundamentalmente",
      "entityType": "word"
```

```
      }
    ],
    "text": "fundamentalmente",
    "usage": "fundamentalmente",
    "chapterPosition": 3
  },
  {
    "address": "001.002.000.010.",
    "objectClass": "WordGroup",
    "entityType": "word_group",
    "groupType": "normal",
    "elements": [
      {
        "text": "en...",
        "address": "001.002.000.010.000.",
        "audioStart": 9317,
        "duration": 242,
        "entityType": "word"
      },
      {
        "text": "en",
        "address": "001.002.000.010.001.",
        "audioStart": 9559,
        "duration": 139,
        "entityType": "word"
      },
      {
        "text": "el",
        "address": "001.002.000.010.002.",
        "audioStart": 9698,
        "duration": 139,
        "entityType": "word"
      },
      {
```

```
  "text": "equipo,",
  "address": "001.002.000.010.003.",
  "audioStart": 9837,
  "duration": 312,
  "entityType": "word"
},
{
  "text": "en",
  "address": "001.002.000.010.004.",
  "audioStart": 10149,
  "duration": 139,
  "entityType": "word"
},
{
  "text": "esa",
  "address": "001.002.000.010.005.",
  "audioStart": 10288,
  "duration": 173,
  "entityType": "word"
},
{
  "text": "selección",
  "address": "001.002.000.010.006.",
  "audioStart": 10461,
  "duration": 381,
  "entityType": "word"
},
{
  "text": "chilena,",
  "address": "001.002.000.010.007.",
  "audioStart": 10842,
  "duration": 346,
  "entityType": "word"
}
```

```
  ],
  "chapterPosition": 3
},
{
  "address": "001.002.000.011.",
  "objectClass": "WordGroup",
  "entityType": "word_group",
  "groupType": "normal",
  "elements": [
    {
      "entityType": "gap",
      "audioStart": 11187,
      "duration": 368,
      "address": "001.002.000.011.000."
    },
    {
      "text": "de",
      "address": "001.002.000.011.001.",
      "audioStart": 11555,
      "duration": 144,
      "navigationStop": true,
      "entityType": "word"
    },
    {
      "text": "que",
      "address": "001.002.000.011.002.",
      "audioStart": 11699,
      "duration": 180,
      "entityType": "word"
    },
    {
      "text": "se",
      "address": "001.002.000.011.003.",
      "audioStart": 11879,
```

```
    "duration": 144,
    "entityType": "word"
},
{
    "text": "le",
    "address": "001.002.000.011.004.",
    "audioStart": 12023,
    "duration": 144,
    "entityType": "word"
},
{
    " text ": " podí a ",
    "address": "001.002.000.011.005.",
    "audioStart": 12167,
    "duration": 252,
    "entityType": "word"
},
{
    "text": "vencer",
    "address": "001.002.000.011.006.",
    "audioStart": 12419,
    "duration": 288,
    "entityType": "word"
},
{
    "text": "a",
    "address": "001.002.000.011.007.",
    "audioStart": 12707,
    "duration": 108,
    "entityType": "word"
},
{
    "text": "Brasil.",
```

```
      "address": "001.002.000.011.008.",
      "audioStart": 12815,
      "duration": 324,
      "entityType": "word"
    }
   ],
   "chapterPosition": 3
  }
 ],
},
{
 "objectClass": "Gap",
 "entityType": "gap",
 "address": "001.002.001.",
 "audioStart": 13137,
 "duration": 561
},
{
 "objectClass": "Sentence",
 "entityType": "sentence",
 "address": "001.002.002.",
 "audioStart": 13698,
 "translation": "And that would be historic.",
 "elements": [
  {
   "address": "001.002.002.000.",
   "objectClass": "WordGroup",
   "entityType": "word_group",
   "groupType": "normal",
   "elements": [
    {
     "text": "Y",
     "address": "001.002.002.000.000.",
     "audioStart": 13698,
```

```
      "duration": 82,
      "navigationStop": true,
      "entityType": "word"
    },
    {
      "text": "eso",
      "address": "001.002.002.000.001.",
      "audioStart": 13780,
      "duration": 136,
      "entityType": "word"
    },
    {
      "text": "era",
      "address": "001.002.002.000.002.",
      "audioStart": 13916,
      "duration": 136,
      "entityType": "word"
    },
    {
      "text": "historia.",
      "address": "001.002.002.000.003.",
      "audioStart": 14052,
      "duration": 549,
      "entityType": "word"
    }
   ],
   "chapterPosition": 3
  }
 ],
}
],
}
```

Appendix B
Data Models:
Example static models used for episodes and chapters:

| Models | Key Properties | Desc |
|---|---|---|
| Episode | title<br>description<br>speakers (with bios etc.) | Represents a podcast. Divided into one or more chapters (formerly: Track) |
| Chapter | title<br>translated_title<br>normal_audio_url<br>no_music_audio_url<br>elements<br>vocab_sentence_map | Core playable entity (formerly: Dialog) (translated_title moved up from elements) |
| Element | address | Sequenced pieces of the study view |

Example models for script elements:

| Element Type | Key Properties | |
|---|---|---|
| passage | hint<br>duration | |
| paragraph | speaker<br>isSpeakerLabelRequired | isSpeakerLabelRequired-true if the speaker is different from the previous paragraph, or if the firs tparagraph in a passage. Precalculated for convenience. |
| sentence | translation<br>markers<br>wordGroups<br>previousSentence | markers are Word addresses, used for the rewind logic on long sentences<br>vocabs are a list of WordGroup ids that are found within the sentence.<br>previousSentence-address of the Sentence before this one. This is useful to have precalculated for rewind behavior |
| word | text<br>wordGroupId (opt)<br>audioStart<br>duration | |
| note | head<br>body<br>duration | |
| music_or_silence | audioStart<br>duration | |
| gap | audioStart<br>duration | |
| start_chapter | | |
| finish_chapter | | |

What is claimed is:

1. A system for language learning, comprising:
a device, including a processor and an application comprising instructions to:
obtain an audio file and a corresponding transcript and timing file, wherein the transcript and timing file corresponds to the audio file and comprises words of a transcript of content of the audio file and associated word level timestamp for words of the transcript of the content of the audio file;
auditorily present the content of the audio file using an audio player at the device;
simultaneously with the auditory presentation of the content of the audio file, dynamically generate an interface using the transcript and timing file, the interface including a visual display associated with the content of the audio file in a target language, wherein:
the application is adapted to operate in a structural comprehension mode for auditory presentation of the content of the audio file in synchronization with a first type of visual presentation of the transcript of the content, the first type of visual presentation comprising a first level of redaction of words of the transcript of the content, and
a detailed comprehension mode adapted for increased interaction with the presentation of the content by presenting the content of the audio file in synchronization with a second type of visual presentation of the transcript of the content comprising a second level of redaction of words of the transcript,
wherein the application is adapted to transition between the structural comprehension mode and the detailed comprehension mode during presentation of the content to:
in the structural comprehension mode, auditorily present a portion of the content in synchronization with the first type of visual presentation of the transcript of that portion of content having the first level of redaction in association with a first level of controls, and,
when a transition between the modes is made, to auditorily present the portion of the content in synchronization with the second type of visual presentation of the transcript of that portion of content having the second level of redaction in association with a second level of controls in the detailed comprehension mode, the second level of controls is greater than the first level of controls.

2. The system of claim 1, wherein the structural comprehension mode is dark themed and the detailed comprehension mode is light themed.

3. The system of claim 1, wherein in the detailed comprehension mode the interface includes a delayed pause button, and the application is adapted to, in response to a first interaction with the delayed pause button, continue to auditorily present the content of the audio file until the end of a portion of the content.

4. The system of claim 3, wherein the portion of the content is specified in the transcript and timing file.

5. The system of claim 3, wherein the application is adapted to, in response to a second interaction with the delayed pause button, immediately pause the auditory presentation of the content of the audio file.

6. The system of claim 1, wherein the structural comprehension mode includes a guided listen mode and in the guided listen mode the application is adapted to present a set of guides in the interface by dynamically generating the guides in the interface in synchronization with the auditory presentation of the content.

7. The system of claim 1, wherein in the structural comprehension mode the application is adapted to mark a set of portions for study based on interaction with the interface without pausing the auditory presentation of the content of the audio file, and in the detailed comprehension mode the application is adapted to iterate over the marked set of portions based on interaction with the interface.

8. A method for language learning, comprising:
obtaining an audio file and a corresponding transcript and timing file, wherein the transcript and timing file corresponds to the audio file and comprises words of a transcript of content of the audio file and associated word level timestamp for words of the transcript of the content of the audio file;
auditorily present the content of the audio file using an audio player at a client device in a structural comprehension mode or a detailed comprehension mode;
simultaneously with the auditory presentation of the content of the audio file, dynamically generating an interface using the transcript and timing file, the interface including a visual display associated with the content of the audio file in a target language, wherein
the structural comprehension mode is adapted for auditory presentation of the content of the audio file in synchronization with a first type of visual presentation of the transcript of the content, the first type of visual presentation comprising a first level of redaction of words of the transcript of the content, and
the detailed comprehension mode is adapted for increased interaction with the presentation of the content by presenting the content of the audio file in synchronization with a second type of visual presentation of the transcript of the content comprising a second level of redaction of words of the transcript; and
transitioning between the structural comprehension mode and the detailed comprehension mode during presentation of the content to, in the structural comprehension mode, auditorily present a portion of the content in synchronization with the first type of visual presentation of the transcript of that portion of content having the first level of redaction in association with a first level of controls, and
when a transition between the modes is made, to auditorily present the portion of the content in synchronization with the second type of visual presentation of the transcript of that portion of content having the second level of redaction in association with a second level of controls in the detailed comprehension mode, the second level of controls is greater than the first level of controls.

9. The method of claim 8, wherein the structural comprehension mode is dark themed and the detailed comprehension mode is light themed.

10. The method of claim 8, wherein in the detailed comprehension mode the interface includes a delayed pause button and, in response to a first interaction with the delayed pause button, the presentation of the content of the audio file is continued until the end of a portion of the content.

11. The method of claim 10, wherein the portion of the content is specified in the transcript and timing file.

12. The method of claim 10, wherein in response to a second interaction with the delayed pause button, the auditory presentation of the content of the audio file is immediately paused.

13. The method of claim 8, wherein the structural comprehension mode includes a guided listen mode and in the guided listen mode a set of guides is presented in the interface by dynamically generating the guides in the interface in synchronization with the auditory presentation of the content.

14. The method of claim 8, wherein in the structural comprehension mode a set of portions is marked for study based on interaction with the interface without pausing the auditory presentation of the content of the audio file, and in the detailed comprehension mode the marked set of portions is iterated over based on interaction with the interface.

15. A non-transitory computer readable medium, comprising instructions for:
obtaining an audio file and a corresponding transcript and timing file, wherein the transcript and timing file corresponds to the audio file and comprises words of a transcript of content of the audio file and associated word level timestamp for words of the transcript of the content of the audio file;
auditorily present the content of the audio file using an audio player at a client device in a structural comprehension mode or a detailed comprehension mode;
simultaneously with the auditory presentation of the content of the audio file, dynamically generating an interface using the transcript and timing file, the interface including a visual display associated with the content of the audio file in a target language, wherein
the structural comprehension mode is adapted for auditory presentation of the content of the audio file in synchronization with a first type of visual presentation of the transcript of the content, the first type of visual presentation comprising a first level of redaction of words of the transcript of the content, and
the detailed comprehension mode is adapted for increased interaction with the presentation of the content by presenting the content of the audio file in synchronization with a second type of visual presentation of the transcript of the content comprising a second level of redaction of words of the transcript; and
transitioning between the structural comprehension mode and the detailed comprehension mode during presentation of the content to, in the structural comprehension mode, auditorily present a portion of the content in synchronization with the first type of visual presentation of the transcript of that portion of content having the first level of redaction in association with a first level of controls, and
when a transition between the modes is made, to auditorily present the portion of the content in synchronization with the second type of visual presentation of the transcript of that portion of content having the second level of redaction in association with a second level of controls in the detailed comprehension mode, the second level of controls is greater than the first level of controls.

16. The non-transitory computer readable medium of claim 15, wherein the structural comprehension mode is dark themed and the detailed comprehension mode is light themed.

17. The non-transitory computer readable medium of claim 15, wherein in the detailed comprehension mode the interface includes a delayed pause button and, in response to a first interaction with the delayed pause button, the presentation of the content of the audio file is continued until the end of a portion of the content.

18. The non-transitory computer readable medium of claim 17, wherein the portion of the content is specified in the transcript and timing file.

19. The non-transitory computer readable medium of claim 17, wherein in response to a second interaction with the delayed pause button, the auditory presentation of the content of the audio file is immediately paused.

20. The non-transitory computer readable medium of claim 15, wherein the structural comprehension mode includes a guided listen mode and in the guided listen mode a set of guides is presented in the interface by dynamically generating the guides in the interface in synchronization with the auditory presentation of the content.

21. The non-transitory computer readable medium of claim 15, wherein in the structural comprehension mode a set of portions is marked for study based on interaction with the interface without pausing the auditory presentation of the content of the audio file, and in the detailed comprehension mode the marked set of portions is iterated over based on interaction with the interface.

* * * * *